(12) United States Patent
Prakash et al.

(10) Patent No.: US 11,157,564 B2
(45) Date of Patent: Oct. 26, 2021

(54) NATURAL LANGUAGE QUESTION ANSWERING SYSTEMS

(71) Applicant: ThoughtSpot, Inc., Palo Alto, CA (US)

(72) Inventors: Amit Prakash, Saratoga, CA (US); Ravi Tandon, Sunnyvale, CA (US); Manikanta Balakavi, Mountain View, CA (US); Pavan Ram Piratla, Campbell, CA (US); Ashish Shubham, Mountain View, CA (US); Alonzo Canada, Menlo Park, CA (US); Rakesh Kothari, San Jose, CA (US); Maneesh Apte, Redwood City, CA (US); Amitabh Singhal, Palo Alto, CA (US); Aditya Viswanathan, Redwood City, CA (US); Ajeet Singh, Saratoga, CA (US)

(73) Assignee: ThoughtSpot, Inc., Sunnyvale, CA (US)

(*) Notice: Subject to any disclaimer, the term of this patent is extended or adjusted under 35 U.S.C. 154(b) by 243 days.

(21) Appl. No.: 16/262,796

(22) Filed: Jan. 30, 2019

(65) Prior Publication Data

US 2019/0272296 A1 Sep. 5, 2019

Related U.S. Application Data

(60) Provisional application No. 62/760,563, filed on Nov. 13, 2018, provisional application No. 62/637,823, filed on Mar. 2, 2018.

(51) Int. Cl.
*G06F 17/30* (2006.01)
*G06F 16/903* (2019.01)
(Continued)

(52) U.S. Cl.
CPC ...... *G06F 16/90335* (2019.01); *G06F 16/243* (2019.01); *G06F 16/24534* (2019.01); *G06N 5/04* (2013.01); *G06N 7/005* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 5,987,409 A 11/1999 Tran et al.
8,275,803 B2 * 9/2012 Brown .................. G06F 16/334
707/802

(Continued)

FOREIGN PATENT DOCUMENTS

EP 268367 A2 5/1988
EP 1587011 A1 10/2005
(Continued)

OTHER PUBLICATIONS

Sayyadian et al., "Efficient Keyword Search Across Heterogeneous Relational Databases", 2007, IEEE, 346-355 (10 pp).

(Continued)

*Primary Examiner* — Hung D Le
(74) *Attorney, Agent, or Firm* — Young Basile Hanlon & MacFarlane, P.C.

(57) ABSTRACT

Systems and methods for natural language question answering are described. For example, methods may include determining a set of candidate database queries, including respective sequences of tokens of a database syntax, based on a string; determining a first score for a first candidate database query from the set of candidate database queries, wherein the first score is based on a match between one or more words of the string and a token of the respective sequence of tokens of the first candidate database query; determining a second score for the first candidate database query, wherein (Continued)

the second score is based on natural language syntax data determined for words of the string; selecting, based on the first score and the second score, the first candidate database query from the set of candidate database queries; and invoking a search of the database using the first candidate database query to obtain search results.

20 Claims, 20 Drawing Sheets

(51) Int. Cl.
*G06N 5/04* (2006.01)
*G06N 7/00* (2006.01)
*G06F 16/2453* (2019.01)
*G06F 16/242* (2019.01)

(56) References Cited

U.S. PATENT DOCUMENTS

| | | | |
|---|---|---|---|
| 8,370,821 | B2 | 2/2013 | Haber et al. |
| 8,577,913 | B1 | 11/2013 | Hansson et al. |
| 8,738,617 | B2* | 5/2014 | Brown ............... F16H 3/54 707/731 |
| 9,275,132 | B2 | 3/2016 | Roberts et al. |
| 9,405,794 | B2 | 8/2016 | Prakash et al. |
| 2004/0267730 | A1 | 12/2004 | Dumais et al. |
| 2005/0027717 | A1 | 2/2005 | Koudas et al. |
| 2005/0289124 | A1 | 12/2005 | Kaiser et al. |
| 2007/0192300 | A1 | 8/2007 | Reuther et al. |
| 2007/0192306 | A1 | 8/2007 | Papakonstantinou et al. |
| 2007/0219974 | A1 | 9/2007 | Chickering et al. |
| 2008/0109422 | A1 | 5/2008 | Dedhia |
| 2009/0019019 | A1 | 1/2009 | Jones et al. |
| 2009/0019022 | A1 | 1/2009 | Schallert et al. |
| 2011/0113048 | A1 | 5/2011 | Njemanze |
| 2012/0066217 | A1 | 3/2012 | Eder |
| 2012/0078890 | A1* | 3/2012 | Fan ............... G09B 7/00 707/723 |
| 2012/0079464 | A1 | 3/2012 | De Smet et al. |
| 2012/0330990 | A1* | 12/2012 | Chen ............... G06F 16/3322 707/761 |
| 2013/0077033 | A1* | 3/2013 | Li ............... G02F 1/133305 349/122 |
| 2013/0339370 | A1 | 12/2013 | Holstege et al. |
| 2014/0201241 | A1 | 7/2014 | Wood et al. |
| 2014/0337371 | A1 | 11/2014 | Li |
| 2017/0193095 | A1 | 7/2017 | Ben-Tzur et al. |
| 2017/0270159 | A1 | 9/2017 | Wang et al. |
| 2018/0004751 | A1 | 1/2018 | Vikhe et al. |
| 2018/0032930 | A1 | 2/2018 | Kolb et al. |
| 2018/0039693 | A1 | 2/2018 | Singh et al. |
| 2018/0367557 | A1 | 12/2018 | Brown et al. |
| 2019/0163745 | A1* | 5/2019 | Beller ............... G06F 40/51 |
| 2019/0171646 | A1* | 6/2019 | Chu-Carroll ........ G06F 16/248 |
| 2019/0213601 | A1 | 7/2019 | Hackman et al. |

FOREIGN PATENT DOCUMENTS

| | | |
|---|---|---|
| EP | 2202658 A2 | 6/2010 |
| EP | 2207106 A2 | 7/2010 |
| WO | 0141002 A1 | 6/2001 |
| WO | 2015009353 A1 | 1/2015 |

OTHER PUBLICATIONS

Wu et al: "Towards Keyword-Driven Analytical Processing", Proceedings of the 2007 ACM Sigmod International Conference on Management of Data, Sigmo '07, Jun. 12, 2007, (12 pp).

Anonymous: "File System Permission—Wikipedia, The Free Encyclopedia." Jun. 11, 2013, http://en.wikipedia.org/w/index/php?title.sub.-File.sub.-system.sub.-permissions&oldid=559455322 [retrieved on May 11, 2014]; (8 pp).

Shi et al.: "50x Faster: Speeding Up An SQL-Based Legacy System With Few Changes", Oct. 4, 2011 Retrieved from Internet: URL: http://www.user.tu-berline.de/komm/CD/paper/040221.pdf [retrieved on Jun. 11, 2014]. (12 pp).

Li et al.: "Efficient Type-Ahead Search on Relational Data: a TASTIER Approach", Sigmod-Pods '09: Compilation Proceedings of the International Conference on Management Data & 28th Symposium on Principles of Database Systems; Providence, RI,USA, Association for Computing Machines, New York NY Jun. 29, 2009, pp. 695-706 (12 pp).

Blunschi et al.: "SODA: Generating SQL for Business Users", Proceedings of the VLDB Endowment, vol. 5, No. 10, Aug. 27, 2012 pp. 932-935 (12 pp).

Baid et al: "Toward Scalable Keyword Search over Relational Data", Proceedings of the VLDS Endowment, vol. 3, No. 1-2, Sep. 1, 2010, pp. 140-149 (10 pp).

Jajodia et al., "Flexible Support for Multiple Access Control Policies", ACM Transactions on Database Systems, ACM New York, NY, USA, vol. 26, No. 2, Jun. 1, 2001, pp. 217-228 (48 pp).

Anonymous, "Natural Language Processing", Wikipedia, Downloaded Jan. 30, 2019, https://en.wikipedia.org/wiki/Natural_language_processing, (8 pp).

Seif, G., "An Easy Introduction to Natural Language Processing—Using Computers to Understand Human Language", Oct. 1, 2018 (Downloaded Jan. 30, 2019), https://towardsdatascience.com/an-easy-introduction-to-natural-language-processing-b1e2801291c1, (11 pp).

International Search Report and Written Opinion for PCT/US14/39230; dated Nov. 24, 2014 (16 pp).

Avrach, A., thoughtspot.com, "What the Bleep is a Chasm Trap?", https://www.thoughtspot.com/fact-and-dimension/what-bleep-chasm-trap 9/, Date Unknown, Downloaded Apr. 2, 2019 (9 pp).

Sisense, "Chasm and Fan Traps", https://documentation.sisense.com/latest/managing-data/working-with-data/chasm-fan-traps.htm, Date Unknown, Downloaded Apr. 2, 2019 (8 pp).

Thoughtspot, "Chasm Traps", https://docs.thoughtspot.com/4.4/admin/loading/chasm-trap.html, Version 4.4 Guides, Date Unknown, Downloaded Apr. 2, 2019 (4 pp).

Morton, K., et al., "Dynamic Workload Driven Data Integration In Tableau", Proceedings of the 2012 International Conference on Management of Data, SIGMOD '12, Jan. 1, 2012, p. 807 (9 pp).

Extended European Search Report dated Jul. 26, 2019, issued in co-pending EP Application No. 19166422.6 (11 pp).

Wikipedia, "Consistent hashing", https://en.wikipedia.org/wiki/Consistent_hashing, Date Unknown, Downloaded Aug. 15, 2019, (5 pp).

Eades, Peter, et al., "A Fast & Effective Heuristic for the Feedback Arc Set Problem," Information Processing Letters, vol. 47, Issue 6, Oct. 18, 1993, pp. 319-323.

Wikipedia, "Dijkstra's algorithm", Date Unknown, downloaded Jul. 16, 2019, https://en.wikipedia.org/wiki/Dijkstra%27s_algorithm (11 pp).

Extended European Search Report received in co-pending Application No. EP 19160657.3 dated Apr. 4, 2019 (11 pp).

Sonewar, D. K. et al., "Algorithm for Finding Shortest Path in All Tours of a TSP Using Pheromone Genetic Factor", Jul. 2017, IJIRSET, vol. 6, Issue 7, http://www.ijirset.com/upload/2017/july/73_dinesh%20sonewar%20_1_.pdf, p. 1-7 (Year: 2017) (7 pp).

* cited by examiner

NATURAL LANGUAGE QUESTION ANSWERING SYSTEMS

CROSS-REFERENCE TO RELATED APPLICATION(S)

This application claims the benefit of U.S. Provisional Application No. 62/637,823, filed Mar. 2, 2018, which is incorporated herein by reference in its entirety. This application claims the benefit of U.S. Provisional Application No. 62/760,563, filed Nov. 13, 2018, which is incorporated herein by reference in its entirety.

TECHNICAL FIELD

This disclosure relates to natural language question answering systems.

BACKGROUND

Natural language processing is used to by digital personal assistant agents to respond verbal commands or questions from users. These digital personal assistant agents give answers of uneven quality to a user. Misunderstandings are common and they can be difficult to remedy when you are limited to simply re-asking questions as many ways as you can think of This can make the interactions with a digital personal assistant agents using natural language processing confusing and difficult to improve.

SUMMARY

Disclosed herein are implementations of natural language question answering systems.

In an implementation, a system is provided for providing a search interface for databases. The system may include a memory, a processor, and a network interface. The memory may store instructions executable by the processor to receive a string entered via a user interface; determine a set of candidate database queries, each including a respective sequence of tokens of a database syntax, based on the string; determine a first score for a first candidate database query from the set of candidate database queries, wherein the first score is based on a match between one or more words of the string and a token of the respective sequence of tokens of the first candidate database query; determine a second score for the first candidate database query, wherein the second score is based on natural language syntax data determined for words of the string; select, based on the first score and the second score, the first candidate database query from the set of candidate database queries; invoke a search of the database using a query based on the first candidate database query to obtain search results; and present data based on the search results in the user interface.

In an implementation, a method is provided for providing a search interface for databases. The method may include receiving a string entered via a user interface; determining a set of candidate database queries, each including a respective sequence of tokens of a database syntax, based on the string; determining a first score for a first candidate database query from the set of candidate database queries, wherein the first score is based on a match between one or more words of the string and a token of the respective sequence of tokens of the first candidate database query; determining a second score for the first candidate database query, wherein the second score is based on natural language syntax data determined for words of the string; selecting, based on the first score and the second score, the first candidate database query from the set of candidate database queries; invoking a search of the database using a query based on the first candidate database query to obtain search results; and presenting data based on the search results in the user interface.

In an implementation, a non-transitory computer-readable storage medium is provided for providing a search interface for databases. The non-transitory computer-readable storage medium may include executable instructions that, when executed by a processor, facilitate performance of operations, including receiving a string entered via a user interface; determining a set of candidate database queries, each including a respective sequence of tokens of a database syntax, based on the string; determining a first score for a first candidate database query from the set of candidate database queries, wherein the first score is based on a match between one or more words of the string and a token of the respective sequence of tokens of the first candidate database query; determining a second score for the first candidate database query, wherein the second score is based on natural language syntax data determined for words of the string; selecting, based on the first score and the second score, the first candidate database query from the set of candidate database queries; invoking a search of the database using a query based on the first candidate database query to obtain search results; and presenting data based on the search results in the user interface.

In an implementation, a system is provided for providing a search interface for databases. The system may include a memory, a processor, and a network interface. The memory may store instructions executable by the processor to receive, via a user interface, an indication that a string entered via the user interface matches a database query, wherein the database query includes a sequence of tokens of a database syntax; responsive to the indication, determine a pattern based on the string and the database query, wherein the pattern includes a collection of token constraints, a rewrite rule that maps one or more input tokens to a sequence of output tokens, and a ranking score adjustment that can be applied to a ranking score for a candidate database query; and store the pattern.

In an implementation, a method is provided for providing a search interface for databases. The method may include receiving, via a user interface, an indication that a string entered via the user interface matches a database query, wherein the database query includes a sequence of tokens of a database syntax; responsive to the indication, determining a pattern based on the string and the database query, wherein the pattern includes a collection of token constraints, a rewrite rule that maps one or more input tokens to a sequence of output tokens, and a ranking score adjustment that can be applied to a ranking score for a candidate database query; and storing the pattern.

In an implementation, a non-transitory computer-readable storage medium is provided for providing a search interface for databases. The non-transitory computer-readable storage medium may include executable instructions that, when executed by a processor, facilitate performance of operations, including receiving, via a user interface, an indication that a string entered via the user interface matches a database query, wherein the database query includes a sequence of tokens of a database syntax; responsive to the indication, determining a pattern based on the string and the database query, wherein the pattern includes a collection of token constraints, a rewrite rule that maps one or more input tokens to a sequence of output tokens, and a ranking score adjustment that can be applied to a ranking score for a candidate database query; and storing the pattern.

In an implementation, a system is provided for providing a search interface for databases. The system may include a memory, a processor, and a network interface. The memory may store instructions executable by the processor to receive a string entered via a user interface; determine a database query, including a sequence of tokens of a database syntax, based on the string, wherein determining the database query includes applying natural language processing to the string; present, via the user interface, respective text representations for tokens in the sequence of tokens; receiving feedback data concerning the database query via the user interface; modify the database query based on the feedback data; invoke a search of a database using a query based on the modified database query to obtain search results; and present data based on the search results in the user interface.

In an implementation, a method is provided for providing a search interface for databases. The method may include receiving a string entered via a user interface; determining a database query, including a sequence of tokens of a database syntax, based on the string, wherein determining the database query includes applying natural language processing to the string; presenting, via the user interface, respective text representations for tokens in the sequence of tokens; receiving feedback data concerning the database query via the user interface; modifying the database query based on the feedback data; invoking a search of a database using a query based on the modified database query to obtain search results; and presenting data based on the search results in the user interface.

In an implementation, a non-transitory computer-readable storage medium is provided for providing a search interface for databases. The non-transitory computer-readable storage medium may include executable instructions that, when executed by a processor, facilitate performance of operations, including receiving a string entered via a user interface; determining a database query, including a sequence of tokens of a database syntax, based on the string, wherein determining the database query includes applying natural language processing to the string; presenting, via the user interface, respective text representations for tokens in the sequence of tokens; receiving feedback data concerning the database query via the user interface; modifying the database query based on the feedback data; invoking a search of a database using a query based on the modified database query to obtain search results; and presenting data based on the search results in the user interface.

In an implementation, a system is provided that may include a memory, a processor, and a network interface. The memory may store instructions executable by the processor to determine a set of candidate database queries, each including a respective sequence of tokens of a database syntax, based on a string; determine a first score for a first candidate database query from the set of candidate database queries, wherein the first score is based on a match between one or more words of the string and a token of the respective sequence of tokens of the first candidate database query; determine a second score for the first candidate database query, wherein the second score is based on natural language syntax data determined for words of the string; select, based on the first score and the second score, the first candidate database query from the set of candidate database queries; and invoke a search of the database using a query based on the first candidate database query to obtain search results.

In an implementation, a method that may include determining a set of candidate database queries, each including a respective sequence of tokens of a database syntax, based on a string; determining a first score for a first candidate database query from the set of candidate database queries, wherein the first score is based on a match between one or more words of the string and a token of the respective sequence of tokens of the first candidate database query; determining a second score for the first candidate database query, wherein the second score is based on natural language syntax data determined for words of the string; selecting, based on the first score and the second score, the first candidate database query from the set of candidate database queries; and invoking a search of the database using a query based on the first candidate database query to obtain search results.

In an implementation, a non-transitory computer-readable storage medium is provided. The non-transitory computer-readable storage medium may include executable instructions that, when executed by a processor, facilitate performance of operations, including determining a set of candidate database queries, each including a respective sequence of tokens of a database syntax, based on a string; determining a first score for a first candidate database query from the set of candidate database queries, wherein the first score is based on a match between one or more words of the string and a token of the respective sequence of tokens of the first candidate database query; determining a second score for the first candidate database query, wherein the second score is based on natural language syntax data determined for words of the string; selecting, based on the first score and the second score, the first candidate database query from the set of candidate database queries; and invoking a search of the database using a query based on the first candidate database query to obtain search results.

In an implementation, a system is provided the may include a memory, a processor, and a network interface. The memory may store instructions executable by the processor to extract an inference pattern from a string and a database query, wherein the database query includes a sequence of tokens of a database syntax; classify the inference pattern to determine an inference type; determining a resolution, wherein the resolution includes one or more tokens of a database syntax; identify a set of context features for the inference pattern, wherein the set of context features includes words from the string and tokens from the database query; determine a confidence score based on the set of context features; and store an inference record in an inference store, wherein the inference record includes the set of context features, the resolution, and the confidence score.

In an implementation, a method is provided the may include extracting an inference pattern from a string and a database query, wherein the database query includes a sequence of tokens of a database syntax; classifying the inference pattern to determine an inference type; determining a resolution, wherein the resolution includes one or more tokens of a database syntax; identifying a set of context features for the inference pattern, wherein the set of context features includes words from the string and tokens from the database query; determining a confidence score based on the set of context features; and storing an inference record in an inference store, wherein the inference record includes the set of context features, the resolution, and the confidence score.

In an implementation, a non-transitory computer-readable storage medium is provided. The non-transitory computer-readable storage medium may include executable instructions that, when executed by a processor, facilitate performance of operations, including extracting an inference pattern from a string and a database query, wherein the database query includes a sequence of tokens of a database syntax; classifying the inference pattern to determine an inference type; determining a resolution, wherein the resolution includes one or more tokens of a database syntax; identifying a set of context features for the inference pattern, wherein the set of context features includes words from the string and tokens from the database query; determining a confidence score based on the set of context features; and storing an inference record in an inference store, wherein the inference record includes the set of context features, the resolution, and the confidence score.

In an implementation, a system is provided that may include a memory, a processor, and a network interface. The memory may store instructions executable by the processor to identify a current set of context features for a database query that is associated with a string, wherein the database query includes a sequence of tokens of a database syntax, and the current set of context features includes words from the string and tokens from the database query; select a first inference record from an inference store based on comparison of the current set of context features to context features of inference records in the inference store; modify the database query using a resolution of the first inference record to obtain an inferred database query, wherein the resolution includes one or more tokens of the database syntax; and invoke a search of the database using a query based on the inferred database query to obtain search results.

In an implementation, a method is provided that may include identifying a current set of context features for a database query that is associated with a string, wherein the database query includes a sequence of tokens of a database syntax, and the current set of context features includes words from the string and tokens from the database query; selecting a first inference record from an inference store based on comparison of the current set of context features to context features of inference records in the inference store; modifying the database query using a resolution of the first inference record to obtain an inferred database query, wherein the resolution includes one or more tokens of the database syntax; and invoking a search of the database using a query based on the inferred database query to obtain search results.

In an implementation, a non-transitory computer-readable storage medium is provided. The non-transitory computer-readable storage medium may include executable instructions that, when executed by a processor, facilitate performance of operations, including identifying a current set of context features for a database query that is associated with a string, wherein the database query includes a sequence of tokens of a database syntax, and the current set of context features includes words from the string and tokens from the database query; selecting a first inference record from an inference store based on comparison of the current set of context features to context features of inference records in the inference store; modifying the database query using a resolution of the first inference record to obtain an inferred database query, wherein the resolution includes one or more tokens of the database syntax; and invoking a search of the database using a query based on the inferred database query to obtain search results.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
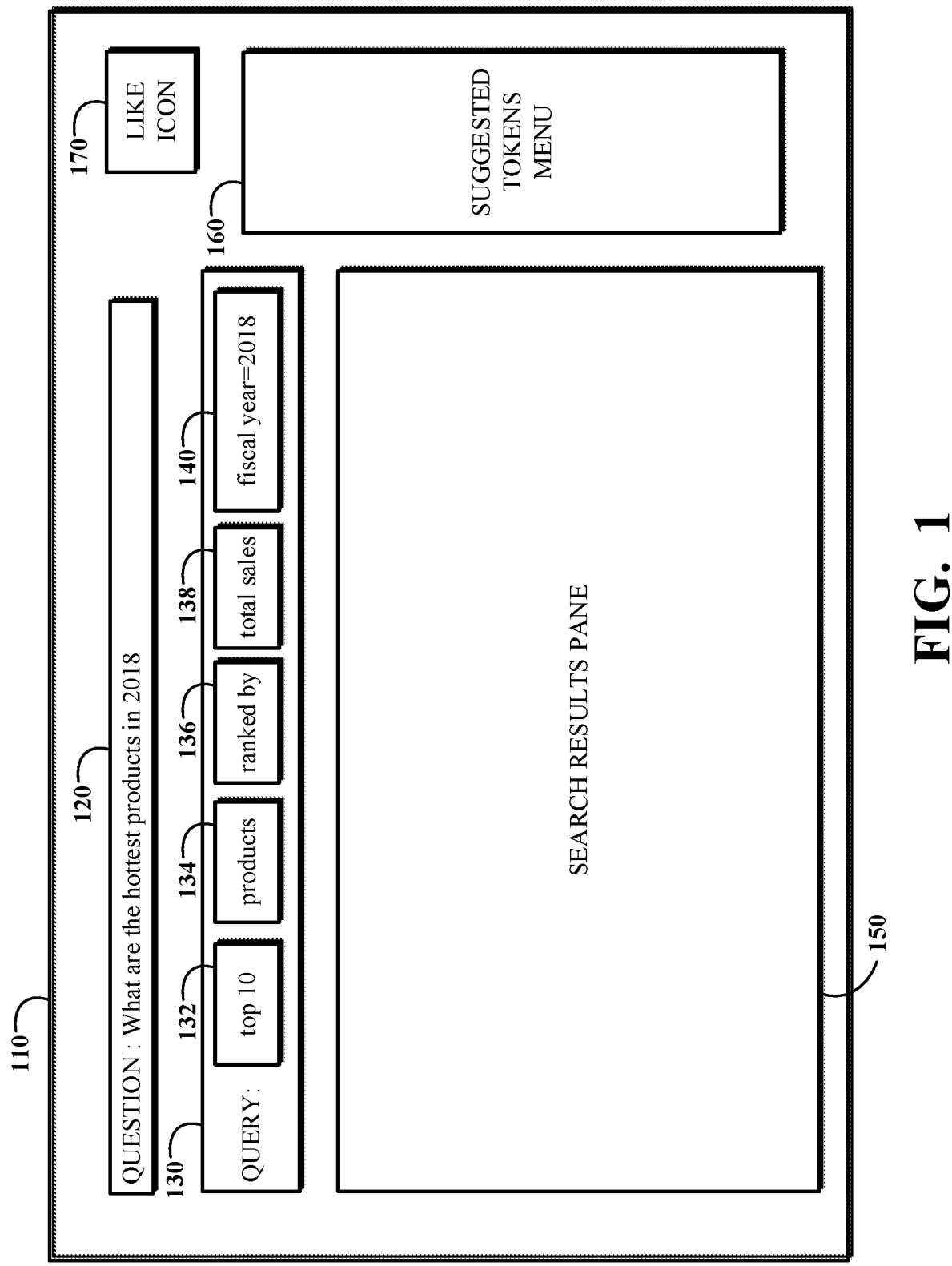
FIG. 1 is diagram of an example of a display region generated for presenting a user interface to facilitate search of one or more databases.

Described herein are systems and techniques for providing useful data in response to natural language requests concerning information stored in one or more databases. A translation layer may be implemented that can take a string of text (e.g., corresponding to a natural language question) and translate it into a query in a language or syntax for describing queries on databases (e.g., relational databases). The generated query is a sequence of tokens, where a token is an element in the database language or syntax (e.g., analogous to a word in a natural language, which allows the composition of phrases and sentences from words). A token may represent an entity or another concept meaningful in the context of a database, such as, for example, a measure (e.g., a column storing values of a metric); an attribute (e.g., a column storing categorical information); a value (e.g., a value from any column, such as, 'California' from a state column); a keyword (a language specific keyword, such as, "sum"); an operator (e.g., language specific operators, such as, "<" or "before"); a positive integer, a date bucket (e.g., monthly or Weekly); or a constant (e.g., numeric/string/Boolean constants, such as, −100.2 or 'john' or true). A token may have an associated data structure that includes data describing the token, storing data, such as descriptive text in a natural language, a token type, and/or an identifier or pointer for an entity in a database. The translated query may specify a query on a database. A translated query may then be further translated to a particular compatible syntax applicable a particular underlying database in order to apply the query to that database to obtain search results that can be presented in response to the string. For example, the system may determine the query from the string based in part on information derived from matching fragments of text from the string to tokens of a database, and also based in part on analysis of natural language syntax data (e.g., part-of-speech tags or syntax tree data) determined for words of the string.

The query generated based on the string may be presented to a user to provide visibility into how a natural language question of the string has been interpreted by the system, and to enable the user to provide feedback on the translation that can be used to correct or fine-tune the query to match the user's intent when entering the string. For example, natural text representations of the tokens of the query may be presented to the user to help the user more easily read and understand the structure of the query. The user may select one or more tokens of the query and modify the token(s) via a user interface. In some implementations, suggested alternatives for token may be presented to the user (e.g., in side panel or drop-down menu) to facilitate user editing of the query. In this manner, the system may provide transparency and control of the translated query to the user while aiding a user to form the query in a database syntax starting from a string that may be entered as natural language text. In some implementations, the string may be entered by a voice command using a user interface including a microphone with a speech recognition module. In some implementations, the string may be entered by typing the string in a dialog box using a keyboard or other text entry device.

By receiving implicit and explicit feedback on the translations of strings into database queries, a system can learn over examples in order to better translate future strings. For example, patterns for questions applicable to a particular database or typical of a particular user may be learned over time by storing and/or generalizing examples of string to query mappings that have been implicitly or explicitly approved by a user. These patterns may take the form of collections of token constraints that, when satisfied are used to modify and/or select a candidate query generated based on a string. For example, the system can learn to make context specific inferences to fill in missing information for a query that is not explicitly stated in a string. In some implementations, the context for such an inference includes words from a string and tokens from an associated query. When the applicable context is matched, a generated query may be modified to fill in missing information based on data stored in a corresponding inference record.

The systems and techniques described herein may offer advantages over prior systems for interrogating databases. For example, users may be enabled to enter (e.g., type) questions in natural language (e.g., English) to cause a query in a database syntax to be formed, which can be used (possibly with additional translation) to access data in one or more databases. For example, the systems may present a generated query to the user to help guide the user towards a proper query in the database syntax. For example, these systems and techniques may prevent a new user from becoming stuck or frustrated because they are not familiar with a database language or syntax. For example, these systems and techniques may provide a teaching tool so that users quickly learn the database language that can be used to rigorously interrogate a database. For example, these systems and techniques may simplify the posing of analytical questions that can be expressed simply in English (or another natural language), but a corresponding question in the database syntax involves creating a formula or nested query. For example, these systems and techniques may provide an accurate, flexible, and transparent natural language interpretation layer on top of a robust database search engine. By providing transparency and control of the translation to a user, a wealth of feedback data may be accessed and used to improve the performance of these systems over time.

FIG. 1 is diagram of an example of a display region 110 generated for presenting a user interface to facilitate search of one or more databases. For example, display region 110 may be a webpage that includes HTML and/or flash data. For example, a server may generate and present the display region 110 by transmitting (e.g., via an electronic communications network) the display region 110 to a user who receives and views the display region 110 using a client computing device configured to receive and display (e.g., using web browser application) the display region 110. For example, the display region 110 may be part of a user interface that enables a user to access data in one or more databases. The display region 110 includes a search bar 120 that enables a user to enter a string of text; a database query pane 130 that displays a representation of a database query including a sequence of tokens represented by respective token icons (132, 134, 136, 138, and 140) that is initially generated based on the string, and enables editing of the database query; a search results pane 150 that includes data based on search results obtained using the database query; a suggested tokens menu 160 that lists suggested tokens for use in the database query to facilitate editing of the database query; and a like icon 170 that enables a user to express approval of the database query. For example, the display region 110 may be generated and presented by the database analysis server 1830 of FIG. 18. For example, the display region 110 may be generated and presented using the computing device 1900 of FIG. 19.

The display region 110 includes a search bar 120 that enables a user to enter a string of text. For example, the string may include text in a natural language (e.g., English or Chinese). For example, the text of the string may represent a question or a command for a database analysis system (e.g., a system including the database analysis server 1830). In some implementations, a user selects the search bar 120 and types text of the string to enter the string. In some implementations, a user selects the search bar 120 or a voice icon portion (not shown in FIG. 1) of the search bar 120 and enters the text of string by speaking. The string may then be processed by a database analysis system that presents the display region 110 to determine a database query based on the string. For example, the technique 500 of FIG. 5 may be implemented to determine the database query based on the string.

The display region 110 includes a database query pane 130 that displays a representation of a database query including a sequence of tokens represented by respective token icons (132, 134, 136, 138, and 140) that is initially generated based on the string. The database query pane 130 may enable a user to select tokens by interacting with their respective token icons (132, 134, 136, 138, and 140) and edit the tokens. For example, clicking on or hovering over the token icon 140 with a cursor may cause a list of suggested alternative tokens of a database syntax to be displayed in the suggested tokens menu 160 and/or in a drop-down menu appearing near the token icon 140 (not shown in FIG. 1). For example, a user may select an alternative token to edit the database query and the token icon 140 may be removed or replaced with a token icon for the selected token.

The display region 110 includes a search results pane 150 that includes data based on search results obtained using the database query. For example, the search results pane 150 may include raw data (e.g., represented as text) retrieved from a database using the database query before and/or after modification of the database query by the user. For example, the search results pane 150 may include processed data (e.g., represented plots and/or summary text) based on data retrieved from a database using the database query before and/or after modification of the database query by the user.

The display region 110 includes a suggested tokens menu 160 lists suggested tokens for use in the database query to facilitate editing of the database query. For example, the suggested tokens may include tokens from highly ranked candidate queries, generated by the process for determining the database query based on the string, that were not initially selected for presentation to the user. In some implementations, the suggested tokens menu 160 enables a user to select a token to be added to the database query or to replace a current token of the database query. In some implementations, the suggested tokens menu 160 includes a text entry option that enables a user to search the space of available tokens of the database syntax.

The display region 110 includes a like icon 170 that enables a user to express approval of the database query. For example, a user may click the like icon 170 when they are pleased with the presented database query as an accurate representation of their intent when entering the string. This interaction with the like icon 170 may provide a signal for the system to learn from this example pairing of string and database query. For example, one or more patterns may be generated based on the string the database query and stored by implementing the technique 700 of FIG. 7. For example, one or more inferences may be generated based on the string the database query and stored by implementing the technique 900 of FIG. 9.

Figure 2:
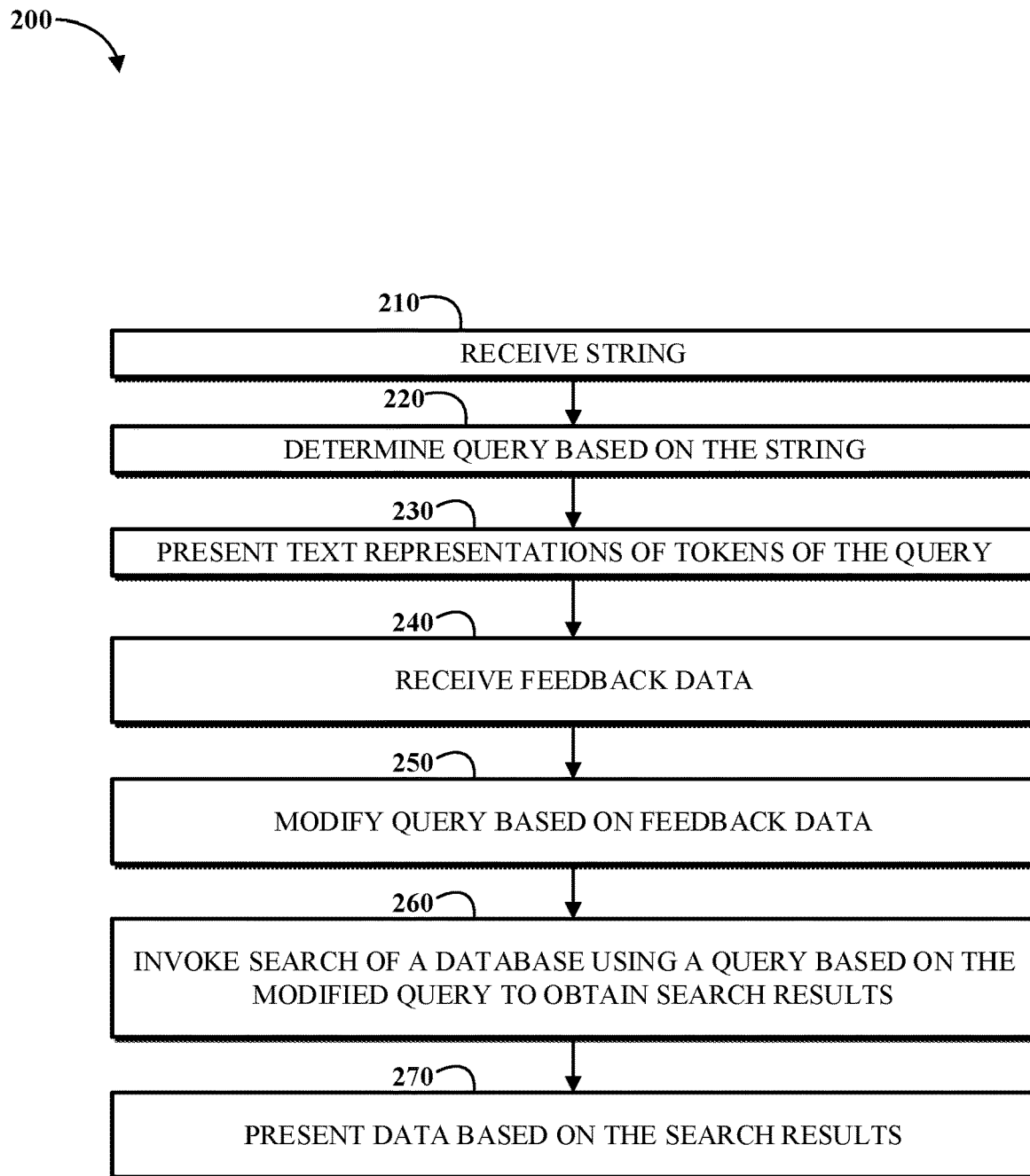
FIG. 2 is a flowchart illustrating an example of a technique for providing a search interface for databases.

FIG. 2 is a flowchart illustrating an example of a technique 200 for providing a search interface for databases. The technique 200 includes receiving 210 a string entered via a user interface; determining 220 a database query, including a sequence of tokens of a database syntax, based on the string; presenting 230, via the user interface, respective text representations for tokens in the sequence of tokens; receiving 240 feedback data concerning the database query via the user interface; modifying 250 the database query based on the feedback data; invoking 260 a search of a database using a query based on the modified database query to obtain search results; and presenting 270 data based on the search results in the user interface. For example, the technique 200 may be implemented by the database analysis server 1830 of FIG. 18. For example, the technique 200 may be implemented using the computing device 1900 of FIG. 19.

The technique 200 includes receiving 210 a string entered via a user interface. For example, the string may include text in a natural language (e.g., English or Chinese). For example, the text of the string may represent a question or a command for a database analysis system (e.g., a system including the database analysis server 1830). For example, the string may be received 210 by a server that is presenting a user interface (e.g., a webpage) to a user who is located at a remote location via communication messages over an electronic communications network (e.g., a wide area network). For example, the user interface may include the display region 110 of FIG. 1. For example, the string may be received 210 by a server presenting the display region 110 when a user types in the search bar 120 and causes a message including the string to be transmitted to the server. For example, a user may have entered the string in the user interface (e.g., a web page) by typing (e.g., using a keyboard) or by speaking (e.g., using a microphone and speech recognition module).

The technique 200 includes determining 220 a database query, including a sequence of tokens of a database syntax, based on the string. Determining 220 the database query may include applying natural language processing to the string. For example, natural language processing may be applied to the string to parse the string into words and determine natural language syntax data (e.g., part-of-speech tags and/or syntax tree data) for the words of the string. For example, the natural language syntax data for words of the string may be compared to known patterns corresponding to database query syntax. When patterns are matched to the string and/or tokens of the database syntax that have been matched to fragments of the string, then the database query may be generated, modified, ranked, and/or selected based on the match with the pattern. For example, the technique 500 of FIG. 5 may be implemented to determine 220 the database query based on the string.

The technique 200 includes presenting 230, via the user interface (e.g. a webpage), respective text representations for tokens in the sequence of tokens (of the database syntax). For example, the text representation for a token of the database query may include descriptive text in a natural language that is stored as part of data structure corresponding to the token. For example, the text representations of the tokens may be presented as part of the user interface (e.g., in the token icons (132, 134, 136, 138, and 140) of FIG. 1.) Presenting 230 (e.g., transmitting) the text representations of the tokens in the sequence of tokens of the database query to the user may provide for transparency of a translation process and enable collection of feedback on translations of strings to database queries to correct or improve the database query and/or to improve the translation system for better translating future strings to respective database queries. A user may interact with the user interface to edit the database query by adding, deleting, or replacing tokens in the database query.

In some implementations (not shown in FIG. 2), the an initial version of the database query that is generated and/or selected based on the string may be used to invoke a search of one or more databases in parallel with presenting 230 the data query for review and/or editing by a user, and results of this initial search may be presented automatically and provisionally in a portion of the user interface (e.g., in the search results pane 150) in response to entry of the string. These initial results can be updated in response to modifications (at operation 250) of the database query.

The technique 200 includes receiving 240 feedback data concerning the database query via the user interface. For example, the feedback data may include a selection, which was made using a menu of the user interface (e.g., the suggested tokens menu 160), of a token from a list of suggested alternatives for a token of the database query. For example, the feedback data may include a selection (e.g., made by a user interacting with the suggested tokens menu 160) of a suggested alternative token of the database syntax for inclusion in a modification of the database query. For example, the feedback data may be received 240 by a server that presents the user interface using a websocket. In some implementations, the server receives 240 the feedback data in one or more messages of a websocket of the user interface that are sent from a client device to the server. For example, the feedback data may be sent in one or more messages generated in response to user interactions with the user interface that are carried out using a client device including user interface hardware (e.g., touchscreen display, a mouse, and/or a keyboard). For example, the technique 300 of FIG. 3 may be implemented to receive 240 feedback data concerning the database query via the user interface.

The technique 200 includes modifying 250 the database query based on the feedback data. For example, a selected token of the database query (e.g., selected using a token icon (132, 134, 136, 138, or 140) may be replaced by a suggested token of the database syntax that is selected by a user (e.g., by interacting with the suggested tokens menu 160), where these selections are reflected in the received 240 feedback data. For example, a selected token of the database query (e.g., selected using a token icon (132, 134, 136, 138, or 140) a may be deleted from the database query based on the feedback data. For example, a suggested token of the database syntax that is selected by a user (e.g., by interacting with the suggested tokens menu 160) may be added to the database query based on the feedback data.

The technique 200 includes invoking 260 a search of a database using a query based on the modified database query to obtain search results. The modified database query, including the sequence of tokens of the database syntax, may specify a logical set of operations for accessing and/or processing data available in one or more databases. In some implementations, the search is invoked 260 by transmitting (e.g., via an electronic communications network) a request or command message including the query based on the modified database query to an external database server that in turn executes a search specified by the query on the database and returns the search results. In some implementations, the search is invoked 260 by executing a search specified by the query on the database, which may have data stored or cached locally (e.g., in high-speed volatile memory), to generate the search results locally. For example, the query may be encoded in the same format as the modified database query. In some implementations, the query may be encoded in different format than the modified database query in order to match the syntax requirements of a database server managing the database (e.g., an external database or a locally stored database). For example, the query may be in the SQL query format, and may be determined based on the sequence of tokens of the database syntax of the modified database query. For example, the query may be in another query format supported by a local or remote database server, and may be determined based on the sequence of tokens of the database syntax of the modified database query. For example, search results may include raw data (e.g., a table of search hits) retrieved from the database and/or summary data (e.g., aggregations or plots) determined by processing data accessed in the database.

The technique 200 includes presenting 270 data based on the search results in the user interface. For example, raw data, summary data, and/or plots or charts of the search results may be presented 270 in the user interface (e.g. a webpage). In some implementations, a summary and/or visual formatting of the data may be determined based on a configuration record (e.g., including user preferences) of the user interface and/or the search results by a machine learning module (e.g., including a neural network) that is trained to identify relevant aspects of data in the context of one or more databases and use cases, and select an appropriate display format. For example, data based on the search results may be presented 270 in the search results pane 150 of FIG. 1. For example, the data based on the search results may be presented 270 by transmitting the data as part of the user interface in messages sent via an electronic communications network (e.g., as part of a websocket over a wide area network). In some implementations, the data based on the search results may be presented 270 in signals passed a directly connected display for viewing by a user co-located with a computing device implementing the technique 200.

Figure 3:
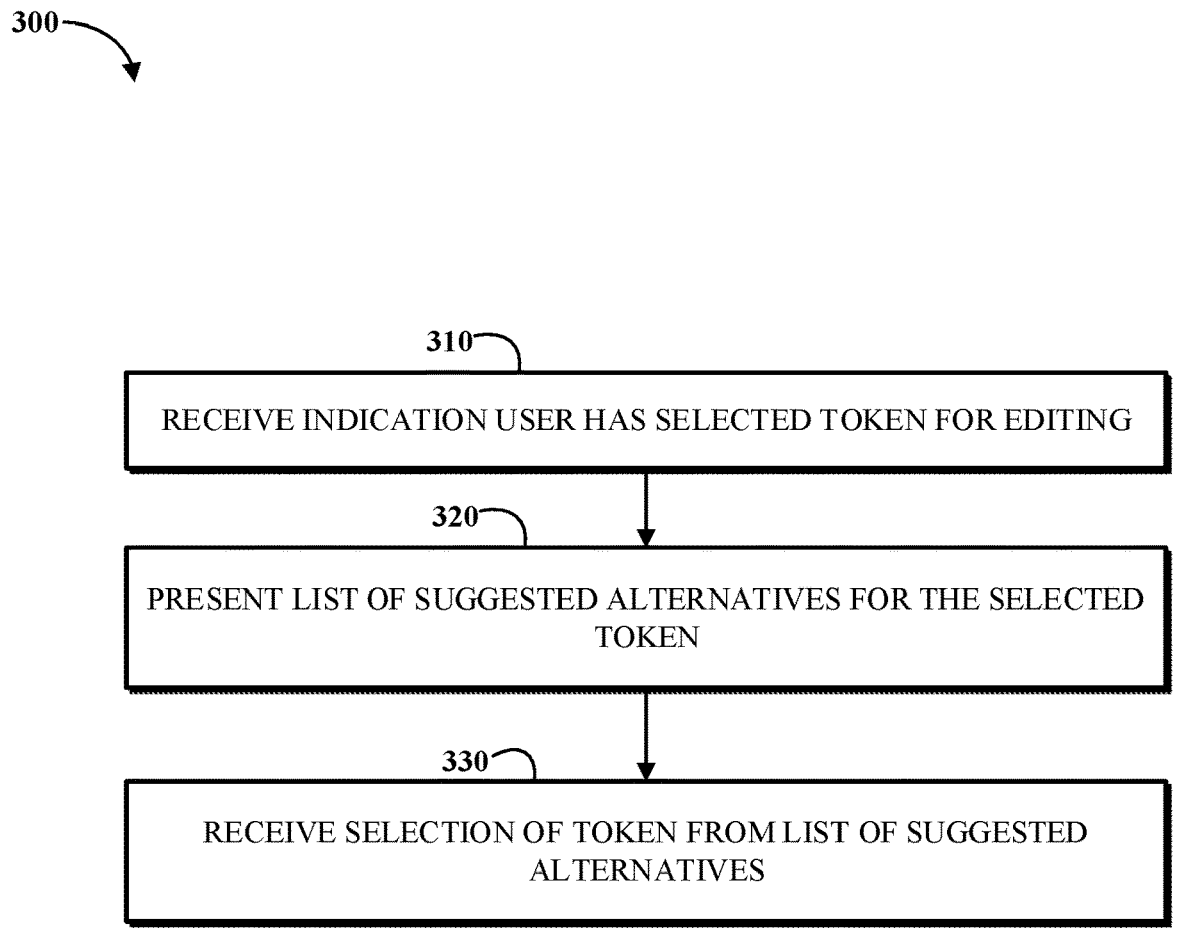
FIG. 3 is a flowchart illustrating an example of a technique for receiving feedback data concerning a database query via a user interface.

FIG. 3 is a flowchart illustrating an example of a technique 300 for receiving feedback data concerning a database query via a user interface. The technique 300 includes receiving 310 and indication that a user has selected a token of the database syntax for editing; presenting 320 a list of suggested alternative tokens for the selected token; and receiving 330 a selection of a token from the list of suggested alternative tokens. For example, the technique 300 may be implemented by the database analysis server 1830 of FIG. 18. For example, the technique 300 may be implemented using the computing device 1900 of FIG. 19.

The technique 300 includes receiving 310 an indication that a user has selected a token of the database syntax for editing of the database query. For example, the indication may be generated responsive to the user interacting with (e.g., by using a mouse to control a cursor and click) a token icon (132, 134, 136, 138, or 140). In some implementations, the indication may be received 310 in a message of a websocket of the user interface that is generated in response to user input.

The technique 300 includes presenting 320 a list of suggested alternative tokens for the selected token. For example, the list of suggested alternative tokens may be presented 320 (e.g., transmitted) as part of a user interface (e.g., in the suggested tokens menu 160) in response to the indication. In some implementations, a drop-down menu including the list of suggested alternative tokens may be generated and presented 320 as part of a user interface, appearing near a selected token icon (132, 134, 136, 138, or 140) that is identified by the received 310 indication.

The technique 300 includes receiving 330 a selection of a token from the list of suggested alternative tokens. For example, the selection of a token from the list of suggested alternative tokens may be received 330 as part of message sent in a websocket of the user interface. For example, the user may have made the selection by interacting with (e.g., by using a mouse to control a cursor and click) the suggested tokens menu 160 or a drop-down menu that was used to present 320 the list of suggested alternative tokens.

Figure 4:
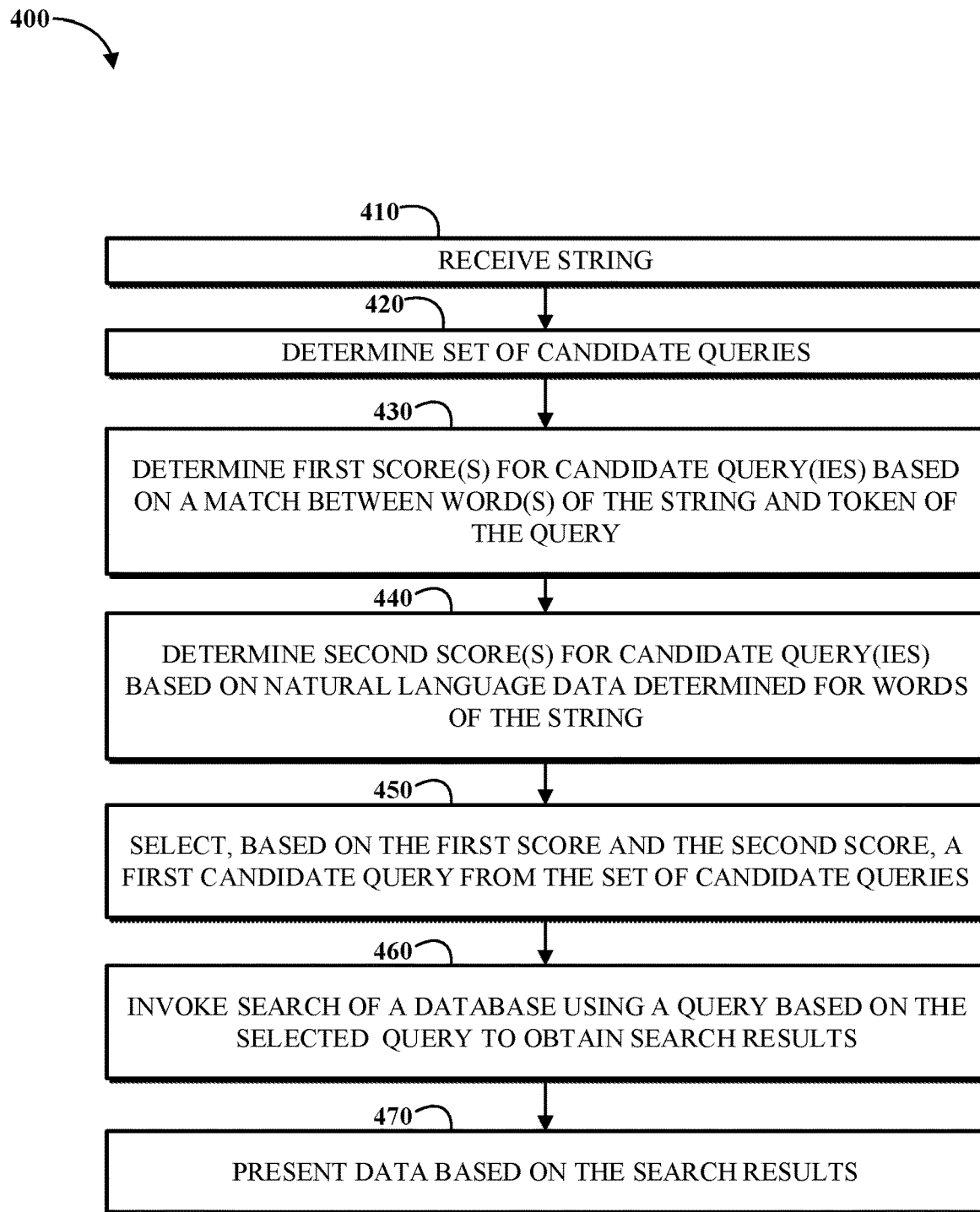
FIG. 4 is a flowchart illustrating an example of a technique for providing a search interface for databases that generates a database query based on a string.

FIG. 4 is a flowchart illustrating an example of a technique 400 for providing a search interface for databases that generates a database query based on a string. The technique 400 includes receiving 410 a string; determining 420 a set of candidate database queries based on the string; determining 430 a first score, for a candidate database query from the set of candidate database queries, based on a match between one or more words of the string and a token of the candidate database query; determining 440 a second score, for the candidate database query, based on natural language syntax data determined for words of the string; selecting 450, based on the first score and the second score, the candidate database query from the set of candidate database queries; invoking 460 a search of the database using a query based on the selected candidate database query to obtain search results; and presenting 470 data based on the search results in the user interface. For example, the technique 400 may be implemented by the database analysis server 1830 of FIG. 18. For example, the technique 400 may be implemented using the computing device 1900 of FIG. 19.

The technique 400 includes receiving 410 a string entered via a user interface. For example, the string may include text in a natural language (e.g., English or Chinese). For example, the text of the string may represent a question or a command for a database analysis system (e.g., a system including the database analysis server 1830). For example, the string may be received 410 by a server that is presenting a user interface (e.g., a webpage) to a user who is located at a remote location via communication messages over an electronic communications network (e.g., a wide area network). For example, the user interface may include the display region 110 of FIG. 1. For example, the string may be received 410 by a server presenting the display region 110 when a user types in the search bar 120 and causes a message including the string to be transmitted to the server. For example, a user may have entered the string in the user interface (e.g., a web page) by typing (e.g., using a keyboard) or by speaking (e.g., using a microphone and speech recognition module).

The technique 400 includes determining 420 a set of candidate database queries, each including a respective sequence of tokens of a database syntax, based on the string. For example, determining 420 the candidate database queries may include matching fragments (e.g., including one or more words) of the string to tokens of the database syntax to which they could relate, and then generating candidate queries as permutations of matched tokens with corresponding sentence fragments that span the string. For example, a set of tokens of the database syntax may be searched for matches to a fragment of the string, where the set of tokens may include tokens representing metadata from a metadata index (e.g., database column names and their synonyms and associations), tokens representing data in a data index (e.g., cells in the columns of a database containing strings), tokens representing keywords and operators of the database syntax, and tokens representing constants. In some implementations, matches between a fragment of the string and text of a token may be exact, partial, phonetic, stemmed, or based on abbreviations or known associations. In some implementations, all spanning permutations of matched tokens are generated as candidate database queries. In some implementations, dynamic programming is used to select a subset of the possible spanning permutations of matched tokens for generation as candidate database queries. For example, techniques described in relation to the technique 500 of FIG. 5 may be used to determine 420 the set of candidate database queries based on the string. The resulting candidate database queries in the set of candidate queries may include respective sequences of tokens of the database syntax.

The technique 400 includes determining 430 a first score for a first candidate database query from the set of candidate database queries. The first score may be based on a match between one or more words of the string and a token of the respective sequence of tokens of the candidate database query. For example, the first score may be determined 430 based on a type of the match (e.g., exact match, partial match, phonetic match, stemmed match, abbreviation, or association). For example, the first score may be determined 430 based on a fraction of a token string length that is covered by a matched fragment of the string. For example, the first score may be determined 430 based on a fraction of total inverse document frequency for words in token text is covered by a matched fragment of the string. In some implementations, the first score is determined 430 based on a first inverse document frequency of an unmatched word of the string and a second inverse document frequency of a matched word of the string (e.g., the first score may be proportional to a ratio of the first inverse document frequency to the second inverse document frequency). In some implementations, the first score is determined based on usage data for the token of the respective sequence of tokens of the first candidate database query. For example, a usage score may be determined based on usage data indexed by the matched token (e.g., as a weighted average of occurrence counter values for different intervals of time), and the first score may be determined 430 based in part on the usage score for the matched token. For example, a usage score may be determined as described in relation to the technique 2000 of FIG. 20.

The technique 400 includes determining 440 a second score for the first candidate database query. The second score may be determined 440 based on natural language syntax data determined for words of the string. For example, natural language processing may be applied to the string to parse the string into words and determine natural language syntax data (e.g., part-of-speech tags and/or syntax tree data) for the words of the string. For example, the natural language syntax data for words of the string may be compared to known patterns corresponding to database query syntax. When patterns are matched, then the second score for the first candidate database query may be determined 440 based on this match of the pattern. For example, the second score may be determined 440 based on a ranking score adjustment for the matched pattern that is stored in an associated pattern record (e.g., the pattern record 1710).

The technique 400 includes selecting 450, based on the first score and the second score, the first candidate database query from the set of candidate database queries. For example, a ranking score for the first candidate database query may be determined (e.g., as described in relation to the technique 500 of FIG. 5) based on the first score and the second score. This ranking score may be compared to ranking scores for other candidate database queries from the set of candidate database queries and/or to a threshold, and, based on these comparisons, the first candidate database query may be selected 450.

The technique 400 includes invoking 460 a search of the database using a query based on the first candidate database query to obtain search results. The first candidate database query, including the sequence of tokens of the database syntax, may specify a logical set of operations for accessing and/or processing data available in one or more databases. In some implementations, the search is invoked 460 by transmitting (e.g., via an electronic communications network) a request or command message including the query based on the selected 450 database query to an external database server that in turn executes a search specified by the query on the database and returns the search results. In some implementations, the search is invoked 460 by executing a search specified by the query on the database, which may have data stored or cached locally (e.g., in high-speed volatile memory), to generate the search results locally. For example, the query may be encoded in the same format as the first candidate database query. In some implementations, the query may be encoded in different format than the first candidate database query in order to match the syntax requirements of a database server managing the database (e.g., an external database or a locally stored database). For example, the query may be in the SQL query format, and may be determined based on the sequence of tokens of the database syntax of the first candidate database query. For example, the query may be in another query format supported by a local or remote database server, and may be determined based on the sequence of tokens of the database syntax of the first candidate database query. In some implementations, the first candidate database query is modified by applying an inference (e.g., as described in relation to the operation 560 of FIG. 6), and the query used to search the database is based on this modified version of the first candidate query. For example, search results may include raw data (e.g., a table of search hits) retrieved from the database and/or summary data (e.g., aggregations or plots) determined by processing data accessed in the database.

The technique 400 includes presenting 470 data based on the search results in the user interface. For example, raw data, summary data, and/or plots or charts of the search results may be presented 470 in the user interface (e.g. a webpage). In some implementations, a summary and/or visual formatting of the data may be determined based on a configuration record (e.g., including user preferences) of the user interface and/or the search results by a machine learning module (e.g., including a neural network) that is trained to identify relevant aspects of data in the context of one or more databases and use cases, and select an appropriate display format. For example, data based on the search results may be presented 470 in the search results pane 150 of FIG. 1. For example, the data based on the search results may be presented 470 by transmitting the data as part of the user interface in messages sent via an electronic communications network (e.g., as part of a websocket over a wide area network). In some implementations, the data based on the search results may be presented 470 in signals passed to a directly connected display for viewing by a user co-located with a computing device implementing the technique 400.

Although the technique 400 is shown as a series of operations for clarity, implementations of the technique 400 or any other technique or algorithm described in connection with the implementations disclosed herein can be performed in various orders or concurrently. Additionally, operations in accordance with this disclosure can be performed with other operations not presented and described herein. For example, aspects of the technique 200 of FIG. 2 may be used to obtain user feedback data concerning the first candidate database query and to modify the first candidate database query based on the feedback data. In some implementations, the technique 400 may be augmented to include presenting, via the user interface, respective text representations for tokens in the sequence of tokens; receiving feedback data concerning the first candidate database query via the user interface; modifying the first candidate database query based on the feedback data; invoking a search of a database using a query based on the modified first candidate database query to obtain modified search results; and presenting data based on the modified search results in the user interface. Furthermore, one or more aspects of the systems and techniques described herein can be omitted. For example, in some implementations, the operations of receiving 410 the string receiving 410 a string entered via a user interface, and presenting 470 data based on the search results in the user interface may be omitted from the technique 400.

Data Model

The data stored in one or more databases to be searched may have an abstraction of a single table or worksheet. The underlying data may be more complex, it can often be accurately modeled as a single table, i.e. a flat list of columns. For example, columns may be classified into two classes: (1) measures—columns where there is some numeric data which represents a metric and can be aggregated across rows; and (2) attributes: columns that provide some property of the row, but are not necessarily aggregatable across rows. For example, attributes could be non-numeric data such as state name, or numeric such as error codes or zipcodes. In addition columns may have a few other relevant properties: (1) EntityType (e.g., a person, place, date/time, currency, or other); and (2) Data Type (e.g., integer, float/double, string, date/time, or Boolean).

Synonyms and User Friendly Names

Quite often column names come from transactional source systems, and these things don't mean the same thing to the users. For example, one column may be named yrs service (years of service), whereas the users may expect the column to be named "tenure". If the columns are not named in a way that a user can understand or use to express their question, the system may fail to locate desired information in the database. Also, often different users may refer to the same column with different names. For example, some may call it sales, others may call it revenue. It may be advantageous for columns to be reasonably named and common synonyms for the column to be provided by a modeling layer. However in some circumstances, these conditions do not pertain. Thus techniques that are good at handling the gap between what has been provided and what the user types may be useful. Some of these techniques that may be used are described herein.

Language Model

A database language or syntax may be built of tokens. Tokens may be assembled into phrases and a collection of one or more phrases may be combined to form a database query.

These tokens can be of many types. Below is the list of some examples of token types relevant for this discussion.

Tokens
- MEASURE—metrics
- ATTRIBUTE—categorical information
- VALUE—value from any column, e.g., 'California' from state.
- KEYWORD—Language specific keywords, e.g. "sum".
- OPERATOR—Language specific operators, e.g. "<" or "before".
- POSITIVE_INT—Represents a positive integer used in top N.
- DATE_BUCKET—Monthly, Weekly etc.
- CONSTANT—numeric/string/boolean constants, e.g., −100.2 or 'john' or true
- STOP_WORD—fixed list of words that occur in language so often that they don't mean anything (e.g., "the" and "an").

SKIP_TOKEN—any token that we could not resolve and skipped.

Phrases

A database language or syntax may consist of collections of tokens called phrases. Below is an example of a rough grammar of an example of a database syntax in BNF form. There are nuances in the grammar that have been skipped for simplicity.

Columns

<Measure>::=<Any of the columns that represent metrics>
    <Numeric Attribute>::=<Categorical columns with int or double/float data types>
    <Date Attribute>::=<Columns with date/time/date-time data type>
    <String Attribute>::=<Columns with data type string>
    <Bool attribute>::=<Columns with Boolean data type>
    <Attribute>::=<Numeric Attribute>|<Date Attribute>|<String Attribute>|<Bool Attribute>
    <Column>::=<Attribute>|<Measure>

Aggregated Column Phrase

<Aggregated Column Phrase>:=<Measure>| <Sum|Average|Count|Unique Count|Variance|Std Dev|Min|Max><Measure|Numeric Attribute><Count|Unique Count|Min|Max><Column>|<Sum|Average|Variance|Std Dev><Numeric Attribute>

Group by Phrase

<Group By Phrase>::=[by]<Attribute>|by <Measure>|[by]<Monthly|Daily|Weekly . . . >

Filter Phrase

<Filter Phrase>::=[for]<Column Value>|<Column><compare operator><Value|Constant>|<Date Filter>

Having Filter Phrase

<Filter Phrase>::=[for]<Aggregate Column Phrase><compare operator><Value|Constant>

Sort by Phrase

<sort by phrase>::=<sort by|ranked by><Aggregated Column Phrase>[ascending|descending]

Top Phrase

<Top Phrase>::=<top|bottom>[positive integer]

Growth Phrase

<Growth Phrase>::=growth of <aggregated column phrase>by<date attribute>[daily|weekly|monthly . . . ] [year-over-year]

Query on Query and Formula

There may be a class of questions that have no direct translation into the database language or syntax. For example, a question may require creating a formula (mathematical expression) or composition of multiple queries. For example, "What percentage of English movies had a loss?" requires building formula for percentage of lost movies. For example, "among top 10 products by revenue which one has the best profit margin" may require first doing a top 10 query and then doing another top 1 on the result.

Search Workflow

For example, a goal of the system for providing a database interface may be to, given a string (full or partial natural language question), produce the following: (1) Context sensitive suggestions; (2) Possible N translations of the question into a database query (e.g., possibly generating a formula and/or query on query workflows); (3) Confidence Score around how confident the system is that the question has properly translated to a database query; and (4) Clarifying questions that provide a way to take input from the user about what they mean. For example, the question may be "top product by profit" but the data set may not contain profit column and contain an "item" column instead. Or, the profit column may not be defined and may require someone to define it as revenue−cost.

CrowdSourced Metadata

In addition we want to enable the Feedback UX which allows users to incrementally build the necessary metadata in a crowd-sourced manner. The key idea here is that if we do not understand parts of the query, we prompt the user to define it for us and as they do, it becomes part of the metadata for future usage. In some implementations, user generated metadata could be limited to: (1) Synonyms: Sales→Revenue; (2) Formula: profit→sales−cost; and (3. Superlatives: costliest→sort by budget. For example, workflows may be supported to Save, Edit, Delete, and/or Bless these user generated pieces of metadata.

Feedback

A database interface system may be configured to be constantly learning from implicit and explicit feedback from a user. Based on what the user saves/shares/likes we get our golden answers and in those cases we can adjust parameters of our translation to do better in future. This may result in better prior and transition probabilities (see later description of ranking candidate database queries).

Modeling

If the data is not properly modelled, it may make it difficult to answer reasonable questions. Here are some examples of poorly modeled data: (1) Unfriendly column names: If a column is named "rev_cln_1" while for users it represents the column revenue, we may never be able to do the bridge the gap. (2) Poor schema: One example in a movies data set is where since each movie has multiple actors, instead of having another table with movie_actor, it is modeled in multiple columns as actor_1_name, actor_2_name, actor_3_name. This makes can make it difficult to ask a question across actors. For example, users may be discouraged from using such a data model. In some implementations problem #1 can be addressed by building a readable column classifier that looks for words with low inverse document frequency and/or lack of too many numbers. If a column name does not pass this test, the user loading this table may be prompted to rename the columns.

Algorithm

An example of a technique for translating a input string into a database query can be split into primarily five steps:

1. Matching: In this part we try and match fragments of input string to known tokens. Each string fragment may match multiple tokens, including no token at all.

2. Parts of Speech, Syntax Tree Generation: the input string may be input into a natural language processing system (e.g., SyntaxNet) to get both part-of-speech tags and syntax tree data for the input string. This may happen in parallel with #1 above. The resulting natural language syntax data may be useful for Pattern Matching (described below).

3. Candidate Generation: Using the matched tokens, a sequence of one or more (could be very large number) tokens may be generated that span the input string.

4. Pattern Matching: For example, Pattern Matching may have three distinct goals: (a) find a sequence of fragments from the candidates that has a structural meaning (e.g., "age more than 10", "most common english movie") (b) replace these patterns with a sequence of tokens that will be recognized by the database language/syntax; and (c) adjust ranking of candidates based on the Patterns.

5. Ranking: In some implementations, all the candidates are ranked based on the individual match scores of tokens, overall coverage, and patterns matched.

In some implementations, after the step 4 above, we expect to generate tokens that are compatible with the database language/syntax, and, after step 5, we send the top 5 candidates as potential translations of the string into a database query.

Figure 5:
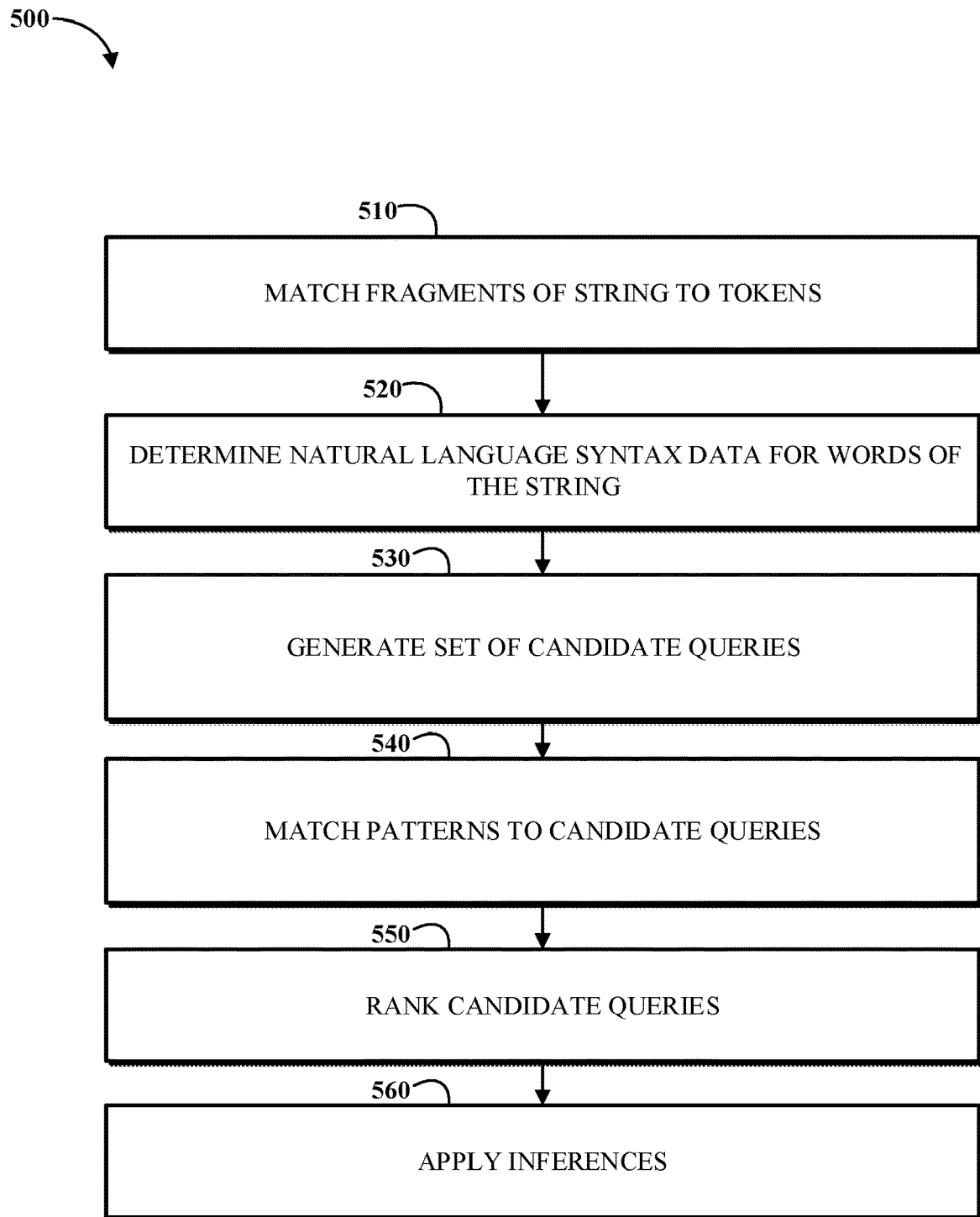
FIG. 5 is a flowchart illustrating an example of a technique for generating a database query based on a string.

FIG. 5 is a flowchart illustrating an example of a technique 500 for generating a database query based on a string. The technique 500 includes matching 510 fragments of a string to tokens of a database syntax; determining 520 natural language syntax data for words of the string; generating 530 a set of candidate database queries, including respective sequences of tokens of the database syntax; matching 540 patterns to candidate queries of the set of candidate queries; ranking 550 the candidate queries; and applying 560 inferences to modify one or more selected candidate queries. For example, the technique 500 may be implemented by the database analysis server 1830 of FIG. 18. For example, the technique 500 may be implemented using the computing device 1900 of FIG. 19.

The technique 500 includes matching 510 fragments of a string to tokens of a database syntax. For example, if the input string has N words, we iterate through every possible sequence of words within it up to a maximum fragment length (e.g., 4 words). For example, if the string was "A B C D E F", the fragments "A", "A B", "A B C", "A B C D", "B", "B C". . . , and "C D E F" may considered. For each fragment, a system may try to match 510 the fragment against different Token Types (e.g., against all possible Token Types).

For example, a string fragment may be matched 510 to the following:
- Metadata index: this contains all columns and their synonyms and associations
- Data Index: This contains all cells in the columns representing strings
- Keywords and Operators: This may contain all possible language keywords and mathematical operators
- Constants: Here we try and parse the string as a possible constant such as "100" or "true"
- Positive Int Index: This index contains English representation of numbers up to 1 Million. For example, "one hundred and twenty eight".
- Date Filter: Things like last 2 weeks. The string being matched may or may not be the same as the retrieved Token. There can be several types of matches"
- Exact Matches: After case normalization and space normalization (all whitespace sequences replaced by a single space) the token text and search text match exactly.
- Partial Matches: The search text is either a prefix or substring of the Token Text.
- Spell/phonetic matches: The search text is 1-edit distance away from Token Text, or they have the same phonetic projection using Metaphone engine.
- Stemmed Match: in this case, the token text and search text have the same stemmed root.
- Abbreviations: There are some common techniques people use to abbreviate columns names. This may include things like, using initial letters of a multi-column word. Sometimes all vowels are removed, e.g., yrs for years.
- Associations: In some implementations, word associations are only used for matching column names. Words that co-occur often may represent similar concepts. The relationship between search text and Token (column name) could be many:
  Synonyms: revenue→sales
  Hypernyms: red→color
  Verb-form s: played→actor
  comparative adjective forms: longer→duration
  Superlative adjective forms: longest→duration Many different techniques could be used to learn associations. For example, techniques based on co-occurrence may be used, and in some implementations, topic filters may be introduced while looking for co-occurrence.

Match Scoring

In some implementations, each match is assigned a score based on the following:
1. Match Type: Exact>Prefix>Word Prefix>Sub String>spell/phonetic/stemmed match
2. Associations come with their own score
3. Inverse document frequency (IDF) coverage: In case of partial match, the match may be scored based on what fraction of IDFs of the token text was covered by the search text. For example, where only very common words are missed, it may be considered a good quality match. But if we missed a rare word, then it may be considered a poor match.
4. Text Coverage: We look at what fraction of a token string length was covered by a corresponding fragment of the input string.

Based on these factors a heuristic may be used use to score each match.

The technique 500 includes determining 520 natural language syntax data for words of the string. For example, the natural language syntax data for words of the string may be determined 520 using a machine learning module (e.g., including a neural network) that has been trained to parse and classify words of a natural language phrases in a string. In some implementations, the natural language syntax data for words of the string may be determined 520 by submitting the string as part of request to server providing natural language processing and receiving the natural language syntax data in response to the request. For example, the natural language syntax data may include part-of-speech tags for words of the string and/or syntax tree data for words of the string.

Parts of Speech, Syntax Tree Generation

For example, the natural language syntax data for words of the string may be determined 520 by sending an remote procedure call to a server running natural language processing system (e.g., SyntaxNet). A remote procedure call may be made to the natural language processing server which has SyntaxNet to get back part-of-speech Tags and a syntax tree for the string. The remote procedure call may incur significant delay (e.g., it may take ~1 second to process). Hence, in some implementations, the remote procedure call to the natural language processing server may be made in parallel with the matching 510 phase processing. The generated part-of-speech tags may then be used to do pattern matching 540 and ranking 550. An example of an input string and corresponding natural language syntax data is shown below:
input="which director is the most popular"
+—director NOUN nsubj
|+—Which IGNORE det
+—is VERB cop
+—the IGNORE det
+—most ADVERB SUPERLATIVE advmod This gives us both part-of-speech tags and some structure to break the sentence into phrases which may be used in pattern matching 540.

The technique 500 includes generating 530 a set of candidate database queries, including respective sequences of tokens of the database syntax. For example, the set of candidate database queries may be generated 530 as permutations of matched 510 tokens and/or corresponding fragments of the string that span the string.

Candidate Generation

In some implementations, during a candidate generation phase, all possible sequences of matched 510 tokens for this string may be generated for consideration as potential database queries. For example, if the input is "who directed titanic". We may have the following matches:

Who:
    Director_name
    Actor_1_name
    Actor_2_name
    Actor_3_name
Directed
    Director_name
    Director_facebook_likes
    <skip word>
Titanic
    Titanic <Value from movie_title>
    "Raise the titanic <Vale from movie_title>

This generates 530 potentially 4×3×2=24 candidates. For example, these candidates may be ranked 550 and then the top K of the candidates may be selected to advance for further processing.

In some implementations, the number of candidate database queries may be managed by using a dynamic programming approaches to selectively generate only a top K candidates based on a ranking function which is amenable to dynamic programming. For this we annotate each token with the top K scores we can get by using that token and all the tokens to its right. Once we have that, we can use recurrence relationship to get all top K matches for all the tokens that start at position i and then choose the top K from there. With each of the top K candidates we may also leave a backtracking link to generate the paths. The recurrence relationship used for generating matches is as follows:

$$TopK(i)=\max(\max\_\{j=1:k\} (match\_i, hypothesis\_j), (null\_i, hypothesis\_j))$$

where: i=index within the set of tokens, K=number of matches to be generated, N=number of tokens in the query, hypothesis_j=hypothesis at rank j with n-k remaining tokens, match_i=match with rank 1 for the token at index i, null_i=null hypothesis for the token at index i.

The above example does not demonstrate multi-word matching. To consider another example, if the input string contains "pirates of the caribbean" each possible substring of that string will match all the movies in that movie franchise. For example, "pirates", "pirates of", "pirates of the", will all match all 3 pirates movies. In some implementations, before throwing all possible tokenizations that may bring in multiple tokens representing different pirates movie, the system may be configured to default to the longest match for a given token.

The technique 500 includes matching 540 patterns to candidate queries of the set of candidate queries. For example, the patterns may be associated with respective pattern records, such as the pattern record 1710 of FIG. 17. For example, portions of the technique 800 of FIG. 8 may be implemented to match 540 patterns to candidate queries of the set of candidate queries.

Pattern Matching

Pattern matching may be performed independently for each of the candidate database queries generated 530. After pattern matching 540, the sequence of tokens of a candidate query may be rewritten differently based on a match with a pattern. For example, a goal of Patterns is to find a set of words and/or tokens that together form a structural unit that can expresses some facet of a database query. Once such a set of tokens is identified, the identified set of tokens may be replaced with another set of tokens that are understood by the database language/syntax. Here are a few examples:

In order to convert things like "age more than ten years" to "age>10" we look for a sequence of tokens <numeric column><more than><number>. Relaxing it a bit, we can replace <more than> by any comparative-adv PosTag. Also we can relax the ordering constraint because this can be expressed as "10 or more age", "more than 10 of age", "higher age than 10".

Input: "Most common english actors" needs to be translated to "top 1 actor by count movies for (language =) english". We can replace most by <Adj-superlative>. Word "common" can be a set of words for example, popular, frequent, dominant. Word "english" can be pretty much any value token to filter down the interesting set rows. Hence, the pattern becomes something like <PosTag: superlative> <common|popular|dominant|frequent><TokenType: Value><Attribute>.

Yet another example could be something that requires building a formula. For example, "of top 10 products by revenue which one has the best profit margin" is a query on query secnario. If we look at the syntax tree, we will see a structure where "of <subtree1> which has <subtree2>" can always be interepreted as query for <subtree 1> results in a table that is used to build query 2 from <subtree2>.

A candidate database query may be a sequence of tokens. Patterns may be built of constraints for individual tokens. Token Constraints can be a combination of:

Token text match: For example, token text matches "more than"

Token Type: For example, token_type must be Attribute.

Data Type: For example, data type of the token must be DATE or DATE_TIME

Match type: For example, PREFIX, APPROXIMATE etc.

PoS Tag: For example, The PoS tag must be Adj -Superlative or Adv-Superlative

For example, a pattern may include three parts:

A collection of Token constraints

A way to compose them, e.g, a sequence or a loose AND rule across all tokens.

A rewrite rule that that upon match asks us to rewrite the input tokens with another set of tokens, An adjustment to overall ranking of the candidate.

Once a sequence of tokens matches a particular pattern, the next step is to translate the tokens into a composable structure, which can either be used to serialize to determine a query for an underlying database, or be used as one of the parts in another pattern. For example: for a question like—"Who directed movies with highest average budget?", we can have a pattern which picks the aggregate phrase "average budget". Once that is picked, it can be used as one of the building blocks of a TOP_BOTTOM phrase, which results in top 10 <director> average budget.

The technique 500 includes ranking 550 the candidate database queries. For example, the candidate database queries may be ranked using scores based on (1) matching scores for tokens in a respective sequence of tokens of a candidate database query, and (2) pattern matching scores for a candidate queries that are based on natural language syntax data determined 520 for the string.

Ranking

In some implementations, there are three dimensions to ranking: (1) At the match level; (2) At the pattern match level; and (3) At the interpretation level I. At the match level: Matches are first sorted by their type; that is exact, prefix, suffix, substring, approximate_prefix, approximate and within each type, sorted by their score. In some implementations, the match type may be a categorical feature and a weight associated with a match type may be learned independently. For example, the match type may be weighted as a feature. In some implementations, the match score is determined as a weighted function of the following:

A. Text Overlap—Relative text overlap of search string to match. For example, [search text: movie], [match:movie_name] yields relative overlap is 5/9.

B. Query Word Overlap—Relative word overlap of search string to query. For example, [query: Which director had the most_facebook_likes?], [search text:_facebook_likes], [match:director_facebook_likes] yields relative word overlap of 1/7. Contrast this to [match:actor_facebook_likes] with the same query which yields a relative word overlap of 0/7.

C. Log IDF Overlap—relative log idf of the coverage. For example, [search text:movie], [match:the_movie_name] yields log idf overlap calculated as: 'log(idf(movie))/(log(idf(the))+log(idf(movie))+log(idf(name)))'

D. Log IDF Query Overlap—[query: Which director had the most facebook likes?], [search text: facebook_likes], [match:director_facebook_likes] yields a score calculated as 'log(idf(director))/\sum_i{log(idf(query[i]))}'

II. At the pattern match level: For example, score may be a weight given to each pattern that was matched.

III. At the interpretation level: For example, interpretations may be scored in a weighted linear model based on feature extraction. The features extracted can be conceptualized across two dimensions, (1) token type (e.g., attribute, measure, value, keyword, or stop word) and (2) number of matches of a certainv type (e.g., number of exact matches, number of prefix matches, etc.). In addition to these features, the interpretations incorporate the downstream pattern score and may also be ranked by the fraction of tokens that are covered in the matches.

This approach have two limitations: (1) We do not look at the context while picking a match for token. For example, if the input is "how much pipeline I have for this quarter?" "pipeline" matches a value token as exact match (stage) and matches as substring for a measure column ("all pipeline"). In isolation we should prefer the exact match, but since it is preceded by "how much" we should give more weight to the Measure column. (2) When we look at match scores in isolation, we do not look at which other bindings for the same fragment is possible.

In order to fix this, a probabilistic graphical model may be implemented where a node is built from each match found in the matching 510 phase. These nodes are assigned some prior probabilities based on the relative match scores. In some implementations, the scores are normalized so that they add up to 1.0 and can be treated as probabilities. For example, the probabilistic graphical model 1200 of FIG. 12 may be used for ranking 550.

The technique 500 includes applying 560 inferences to modify one or more selected candidate queries. After ranking 550 the candidate database queries, the best N (e.g., the best one, the best, or the best five) candidate database queries may be selected for further processing and/or use to search a database to obtain search results. The selected candidate database queries may be subject to one or more inferences associated with inference records (e.g., the inference record 1610 of FIG. 16) that may be applied 560 to a candidate database query to modify the candidate database query by filling in missing tokens of the candidate database query that can be inferred from the context of the candidate database query and the string. For example, portions of the technique 1000 of FIG. 10 may be implemented to apply 560 inferences to a to modify one or more selected candidate queries.

Matching

The objective of the matching 510 phase is the identification of relevant tokens from the data/metadata/language/association index for each of the words in the input string. In some implementations, the matching 510 phase may be further divided into the following three stages: (1) Match Generation; (2) Match Classification; and (3) Match Ranking.

Figure 6:
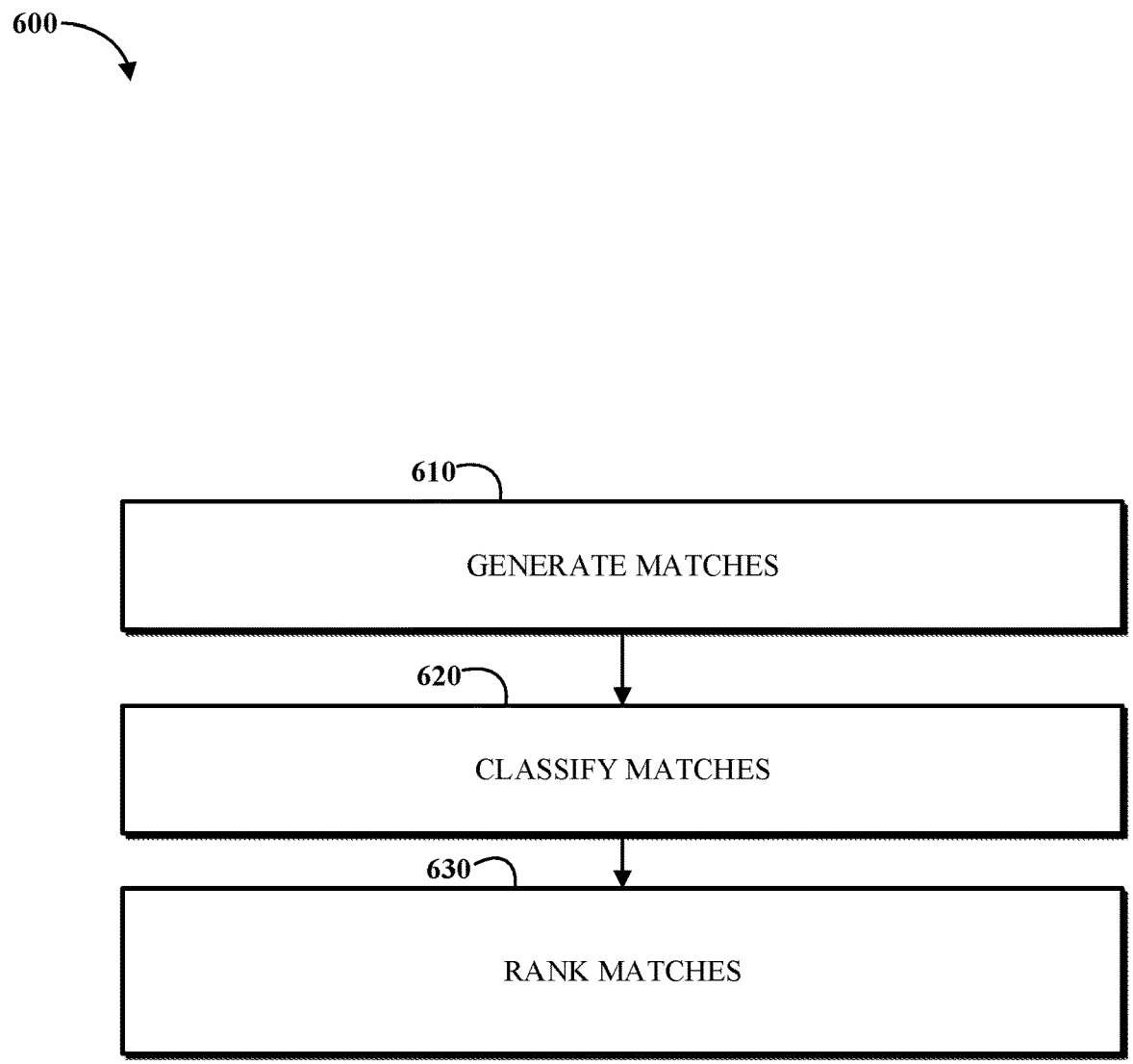
FIG. 6 is a flowchart illustrating an example of a technique for matching fragments of a string to tokens of a database syntax.

FIG. 6 is a flowchart illustrating an example of a technique 600 for matching fragments of a string to tokens of a database syntax. The technique 600 includes generating 610 matches; classifying 620 the matches; and ranking 630 the matches. For example, the technique 600 may be implemented by the database analysis server 1830 of FIG. 18. For example, the technique 600 may be implemented using the computing device 1900 of FIG. 19.

The technique 600 includes generating 610 matches. In some implementations, if the input string has N words, we iterate through at every possible sequence of words within it up to the length of K words (e.g., 4 words), where K may be configurable. For example, if the string was "A B C D E F" We will look at the following possible sequences: "A", "A B", "A B C", "A B C D", "B", "B C" "C D E F". For example, for each sequence of words, we may try to match it against all possible TokenTypes.

Stemmed space matching: The matches are done in the stemmed space. The sequence that is to be matched is transformed with a two stepped process. The first step strips out characters that are not accepted by the sage bar. This removes special characters such as "_", ",", "$" etc. from the input string and replaces them with an empty space. The second step stems each of these words. This transformed string may be used for lookup against the data/metadata index.

Unconstrained matching: Since the input string is not constrained to any underlying language structure, there are no constraints place on the token type, data type or column binding that a given word can match to.

Query Rewrites: The matching phase includes query rewrites for matching alternatives of input. The following two use cases are good examples of query rewrites: (1) Data synonyms: People usually use common abbreviations for data values, such as, geographic abbreviations (e.g., TX for Texas)) The match generation phase looks for words that can be mapped with abbreviations and finds matches for those; (2) Bag of words matching.

In some implementations, each string fragment may be matched to the following types of tokens:

Metadata index: This contains all columns and their synonyms and associations.

Data Index: This contains all cells in the columns representing strings

Keywords and Operators: This contains all possible language keywords and mathematical operators Constants: Here we try and parse the string as a possible constant such as "100" or "true"

Positive Int Index: This index contains english representation of numbers up to 1 Million. For example, "one hundred and twenty eight".

Date Filter: Things like last 2 weeks.

Matches from the tokens are categorized as following:

MEASURE—metrics

ATTRIBUTE—categorical information

VALUE—value from any column, e.g., 'california' from state.

KEYWORD—Language specific keywords, e.g. "sum".

OPERATOR—Language specific operators, e.g. "<" or "before".

POSITIVE INT—

DATE_BUCKET—Monthly, Weekly etc.

CONSTANT—numeric/string/boolean constants, e.g, −100.2 or 'john' or true

STOP_WORD—fixed list of words that occur in language so often that they don't mean anything, e.g., "the", "an" etc.

SKIP_TOKEN—any token that we could not resolve and skipped.

The string being matched may or may not be the same as a string of the retrieved token. There can be several types of matches, such as:

Exact Matches: After case normalization and space normalization (all whitespace sequences replaced by a single space) the token text and search text match exactly.

Partial Matches: The search text is either a prefix or substring of the Token Text.

Abbreviations: These can be abbreviations of words such as US states (TX for Texas), standard abbreviations (USD for US Dollar) etc.

Associations: Associations can include different match types such as synonyms, hypernyms, associated measures etc.

The technique 600 includes classifying 620 the matches. In some implementations, a large number of spurious matches, in addition to the relevant matches, may be generated 610 for the data/metadata that the user is looking for. The classification phase may consist of a large number of heuristics that demarcate a match as relevant or spurious based on different signals. Following are primary functions of the classification phase:

Drop spurious looking matches.

Add skip token matches for tokens with no good match.

Disambiguate "wh" words based on the query context.

Compress filter value matches into a single match if they are candidates for "contains" filter.

Compress date filter matches into a single match.

Some of these signals are as follows:

Part-of-speech Tag from a natural language processing system (e.g., determined using SyntaxNet)

Inverse Document Frequency of the lookup and matched word

Length of the lookup word and matched word etc.

Some of the classifiers that may be used are as follows:

Ambiguity Classifier: The ambiguity classifier is used to correctly match "wh" words like who, where, when etc. to the appropriate attribute column based on the query context. For example, if the query is "Who directed Titanic?" the word "who" could potentially match any person entity. The verb "directed" may be used to match it to director.

Approximate Match Classifier: The approximate match classifier may be used to mark approximate matches on columns as spurious or relevant. In some implementations, a heuristic used in this classifier drops matches on words that are smaller than 4 characters long.

Filter Classifier: The search space on filters is usually very large and it results in a large number of spurious matches getting generated. The filter classifier may classify the filter matches into spurious or relevant matches based on the following heuristics, such as:

In case of a partial match the following heuristics may be applied:

Matches on words smaller than 4 characters long are dropped.

In case the overlap ratio of length between the lookup text and the match is greater than 90% it is not dropped.

In case the overlap ratio of length between the lookup text and the match is less than 50% it is dropped.

In case the average ratio of average IDF of lookup text and the matching text is less than 90%, it is dropped.

Other heuristics that may be applied use the following set of signals:

Filter matches on high cardinality columns and on low IDF words are dropped.

Determinants are dropped as filters.

Integers that follow keywords such as "top" are dropped.

Keyword Classifier: The keyword classifier marks certain date bucket keywords as spurious based on whether they are followed by the "by" keyword.

Null Hypothesis Classifier: The null hypothesis classifier may add a SKIP_TOKEN match for tokens based on the following heuristics:

If the word is a table stop word.

If the word is a preposition match.

Semantic Match Classifier: In some implementations, a semantic match classifier filters out semantic matches on measures iff the following conditions hold:

If a larger span of words has an EXACT match on a column name.

The technique 600 includes ranking 630 the matches. After the matches have been classified they are ranked by a ranking layer. For example, the ranking 630 may be done in two phases. The first phase takes match features into account for scoring each of the matches. The second phase re-ranks tokens based on certain boosting heuristics. These heuristics are primarily based on the query context.

The phase first phase of ranking has the following components:

1. Featurizer: The featurizer extracts features from each of the matches. The features may be categorized as follows:

Match function features: These features score each features based on a function that is applied on different properties of the match. Some of these scores are described below:

A. Text Overlap—Relative text overlap of search string to match. For example, [search text: movie], [match:movie_name] yields relative overlap is 5/9.

B. Query Word Overlap—Relative word overlap of search string to query. For example, [query: Which director had the most_facebook_likes?], [search text: facebook_likes], [match:director_facebook_likes] yields relative word overlap of 1/7. Contrast this to [match:actor_facebook_likes] with the same query which yields a relative word overlap of 0/7.

C. Log IDF Overlap—relative log idf of the coverage. For example, [search text:movie], [match:the_movie_name] yields log idf overlap calculated as: 'log(idf(movie))/(log(idf(the))+log(idf(movie))+log(idf(name)))'

D. Log IDF Query Overlap—[query: Which director had the most facebook likes?], [search text: facebook_likes], [match:director_facebook_likes] yields a score calculated as 'log(idf(director))/\sum_i{log(idf(query[i]))}'

Token property features: These features score each feature based on the match type, token type and data type of the match. These features may ensure that column matches are scored higher than data value matches, exact matches are ranked higher than partial matches and dates buckets are ranked higher than varchar matches. Each of these features along with their individual scores may then be passed to a scoring function and are then used to compute an aggregate, normalized score on the match.

2. Scorer: The scorer uses the following function for scoring individual tokens: Token.wordLength^2*MatchTypeMultiplier[Token.MatchType]*TokenTypeMultiplier[Token.TokenType]*(Token.MatchPenalty)^TextOverlapExponent*(IdFCoverage)^IdfCoverageExponent 3. Aggregator: The individual matches with their scores may then be passed to an aggregator, which collects the matches and normalizes them. The second phase (re-ranking) phase may use the following heuristics for boosting the score of tokens:

Neighborhood heuristics: Scores for matches that are present for different words usually refer to a context in which words are used. For example, "Show me the title for the highest grossing movie". Here both movie and title generate a match for movie title and can be used to promote that match.

Demotion of certain token types: Stop words that occur within the span of other tokens are demoted. For example, for the match "this week" the stop word match for "this" is demoted. Date column matches usually have a low probability of match and may be demoted over other column matches.

Dynamic Patterns

A user interface for a database access system may enable a user to specify certain patterns by indicating that a string including natural language text correctly corresponds to a database query that includes a sequence of tokens of a database syntax. A of a system supporting dynamic patterns is that a user can take a fully resolved database query in terms of recognized tokens, and give possible natural language version of those questions. Some objectives of the system include:

1. If another request comes with the exact match for a previous natural language string, the translation system returns the corresponding result.

2. If another string contains the recorded string as a substring, we try to translate the substring using recorded tokens as parts of candidate database queries.

3. If we find clear mapping between token words and words in the tokens, we templetize that instance and build a sequence pattern out of it so that we can substitute other similar strings. For example, "who directed titanic" pattern can also help "who directed Avatar".

Persistence

For example, these patterns may be stored 730 in such a way as to persist in a cluster of database servers until deleted by a user. In some implementations. For example, these patterns may become part of dataless and full backups so that when clusters replicated, the new cluster includes this information.

For example, a system may record patterns with the following information:

1. NL query
2. NL query translated into Sage query in form of recognized tokens
3. UserName.

When a Record remote procedure call request comes to an AutoComplete server, it may be configured to do the following:

1. Strip the query of any stopwords or stop phrases ("give me", "show me" etc.)
2. Create a pattern that maps the stripped NL query to the tokens.
3. Search for matches in the Token Search Cache that matches tokens in the translated query. If we find high confidence matches that are unique and match a unique token in the target query, we create a wild card match for that class of tokens. Here are some generalizations that may be made in some implementations:
   a. A measure can match any measure from same table
   b. An Attribute can match any attribute in that table.
   c. A constant of a data type can match any other constant of same data type
   d. A value from a given column can match any other value from the same column.
   e. A comparison operator can match any other comparison operator
   f. Aggregation Keyword
   g. Date bucket
4. Based on matches in the search cache, we create a sequence pattern that takes these wild cards and sends this pattern to the UBR server for recording.

Figure 7:
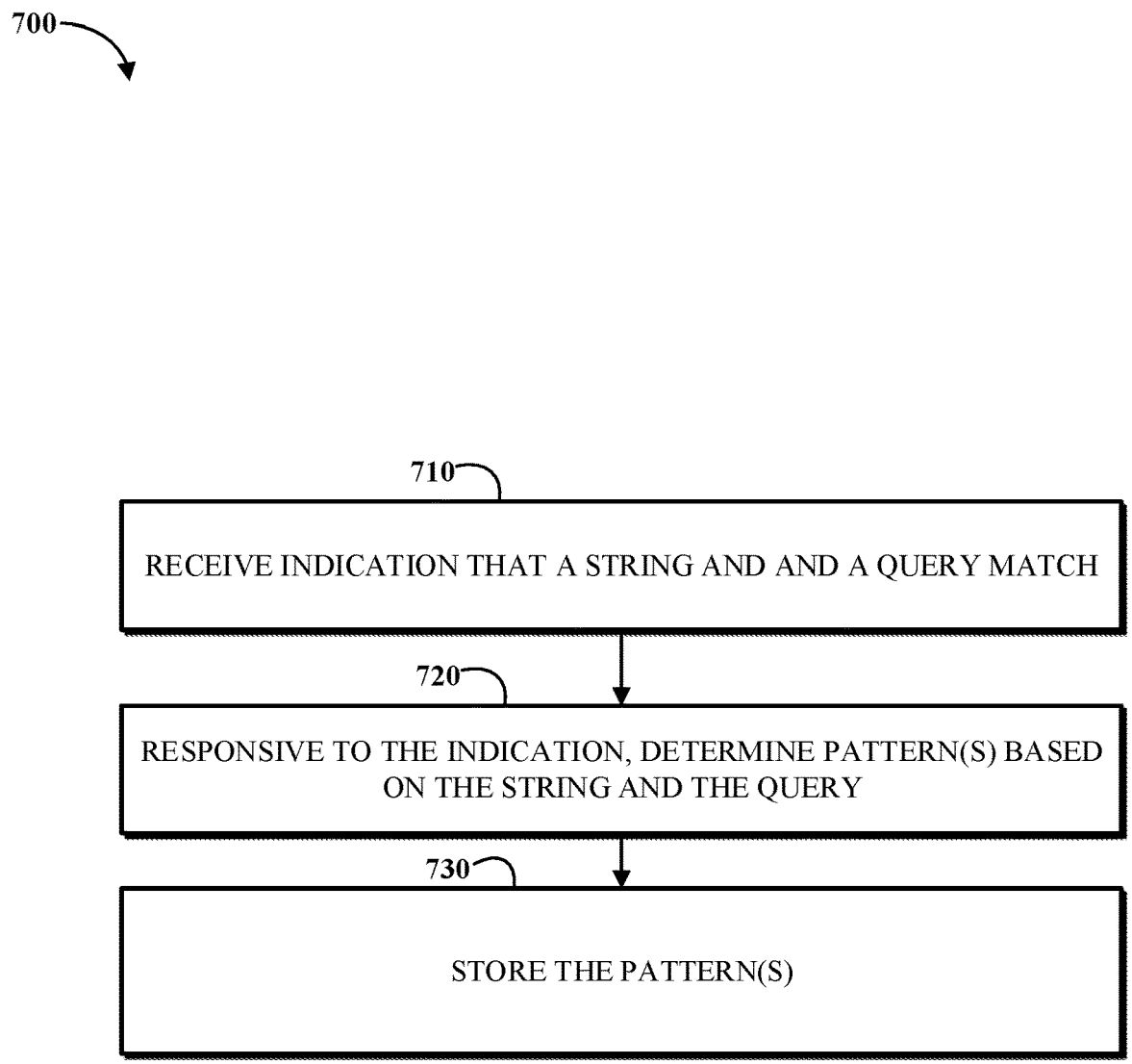
FIG. 7 is a flowchart illustrating an example of a technique for dynamically generating patterns to be used for pattern matching on candidate queries.

FIG. 7 is a flowchart illustrating an example of a technique 700 for dynamically generating patterns to be used for pattern matching on candidate queries. The technique 700 includes receiving 710 an indication that a string and a database query match; responsive to the indication, determining 720 one or more patterns based on the string and the database query; and storing 730 the one or more patterns for use with future strings that are to be translated into a database query. For example, the technique 700 may be implemented by the database analysis server 1830 of FIG. 18. For example, the technique 700 may be implemented using the computing device 1900 of FIG. 19.

The technique 700 includes receiving 710, via a user interface (e.g., a webpage), an indication that a string entered via the user interface matches a database query. The database query includes a sequence of tokens of a database syntax. For example, the indication may be based on a user interaction with a like icon (e.g., the like icon 170) in the user interface while the user interface includes representations of the string (e.g., in the search bar 120) and the database query (e.g., in the database query pane 130). For example, the indication may include feedback data concerning the database query (e.g., feedback data based on user interactions with the token icons (132, 134, 136, 138, or 140) and/or the suggested tokens menu 160) received via the user interface that was used to modify the database query. In some implementations, the indication includes receiving the string via the user interface in response to a prompt presented in the user interface, wherein the prompt requested a natural language translation of the database query.

The technique 700 includes, responsive to the indication, determining 720 a pattern based on the string and the database query. For example, the pattern may include a collection of token constraints, a rewrite rule that maps one or more input tokens to a sequence of output tokens, and a ranking score adjustment that can be applied to a ranking score for a candidate database query. For example, the collection of token constraints may be a sequence of token constraints. For example, the collection of token constraints may be a logical AND condition across all of the tokens of database query.

The technique 700 includes storing 730 the pattern. The pattern may be stored for later use in pattern matching for determining a database query based on a future string (e.g., a string including natural language text). For example, the pattern may be stored 730 as a pattern record (e.g., the pattern record 1710 of FIG. 17).

For example, when we are parsing a natural language question:
1. AutoComplete server sends the Natural language Question to UBR server, along with the table of the data scope.
2. The UBR server scans through all recorded patterns for matches:
   a. For exact patterns, we just look for substring matches (on word boundaries)
   b. For wild card patterns, since UBR server may not have information about whether a wild-card part of pattern matches a column name or value from a column or not, it simply treats it as a .* pattern in a regular expression. All matching patterns are sent back to AutoComplete server where we further examine if the wildcards can be matched with appropriate tokens or not.
3. Once AutoComplete server gets a matching pattern from the usage based ranking (UBR) server, it validates the list of matching patterns for which we have matching tokens.
4. All valid matching patterns are then appended to the token search cache as a virtual token.
5. We let Hypothesis generation work from there to resume the regular flow and any time a hypothesis has a virtual token, we replace it with the actual string of tokens from the pattern.

Following example may clarify a workflow.
1. User tells us "best movie of 2011"→top movie ranked by max imdb_score title_year=2011"
2. We record two patterns. First pattern is the literal pattern as above. The second one is a wild card:
   a. "%superlative% movie of %title_year%"→"% superlative% movie ranked by max imdb_score title_year=%title year".
   b. The UBR may store this pattern as "{list of superlative} movie of *".
3. A user asks "worst movie of 2017 in horror". This goes to the UBR server, which returns the stored pattern.
4. Hypothesis generator gets a virtual token matching "worst movie of 2017", which translates to "bottom movie_Title ranked by max imdb_score 2017"
5. One of the highest ranking hypothesis becomes " bottom movie_Title ranked by max imdb_score 2017 genres contains 'horror'".

Figure 8:
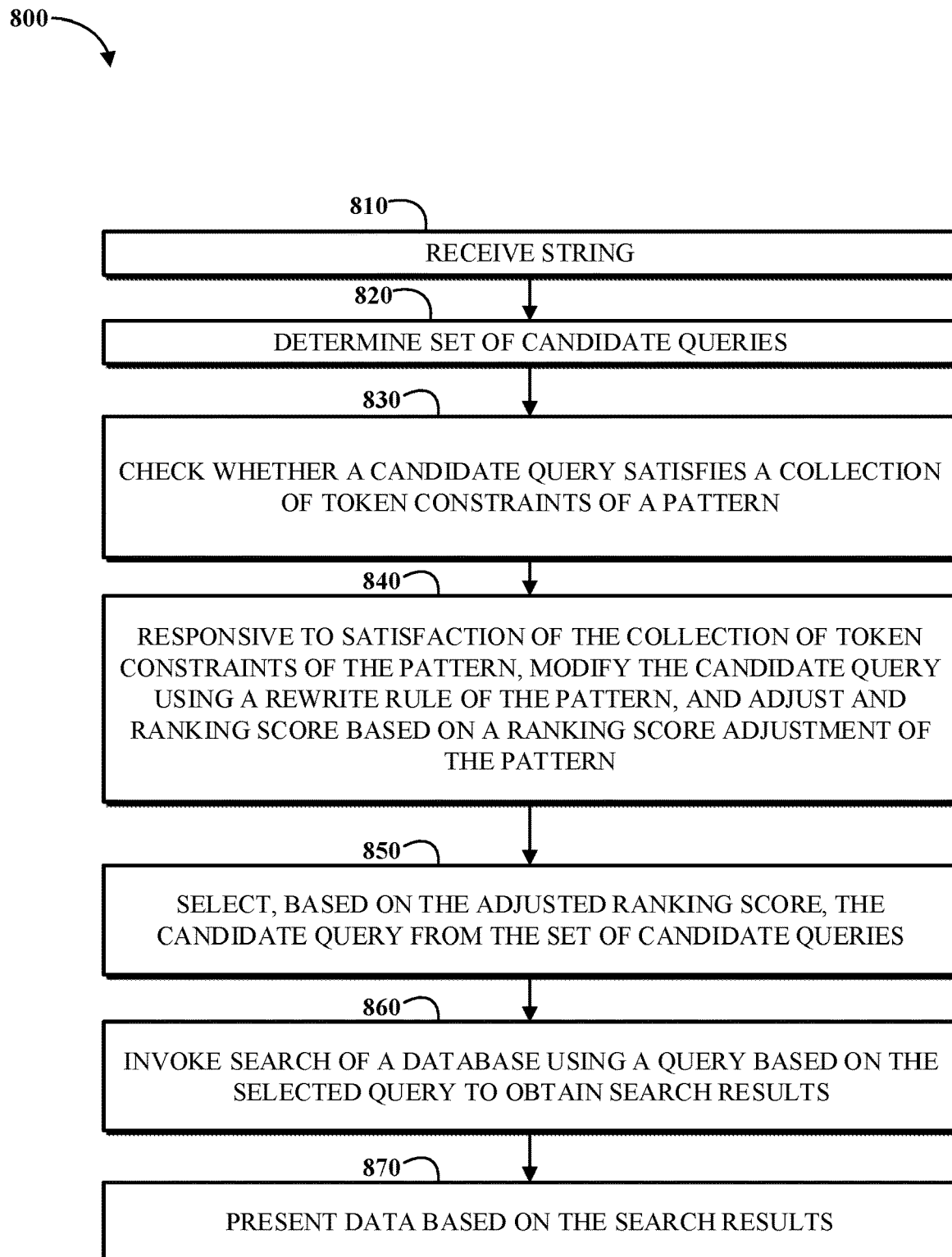
FIG. 8 is a flowchart illustrating an example of a technique for providing a search interface for databases that performs pattern matching on candidate queries generated based on a string.

FIG. 8 is a flowchart illustrating an example of a technique 800 for providing a search interface for databases that performs pattern matching on candidate queries generated based on a string. The technique 800 includes receiving 810 a second string entered via the user interface; determining 820 a set of candidate database queries based on the second string; checking 830 whether a first candidate database query from the set of candidate database queries satisfies the collection of token constraints of the pattern; responsive to satisfaction of the collection of token constraints of the pattern, modifying 840 the first candidate database query using the rewrite rule of the pattern, and adjusting a ranking score of the first candidate database query based on the ranking score adjustment of the pattern; selecting 850, based on the adjusted ranking score, the first candidate database query from the set of candidate database queries; invoking 860 a search of the database using a query based on the first candidate database query to obtain search results; and presenting 870 data based on the search results in the user interface. For example, the technique 800 may be implemented by the database analysis server 1830 of FIG. 18. For example, the technique 800 may be implemented using the computing device 1900 of FIG. 19.

The technique 800 includes receiving 810 a string entered via the user interface. For example, the string may include text in a natural language (e.g., English or Chinese). For example, the text of the string may represent a question or a command for a database analysis system (e.g., a system including the database analysis server 1830). For example, the string may be received 810 by a server that is presenting a user interface (e.g., a webpage) to a user who is located at a remote location via communication messages over an electronic communications network (e.g., a wide area network). For example, the user interface may include the display region 110 of FIG. 1. For example, the string may be received 810 by a server presenting the display region 110 when a user types in the search bar 120 and causes a message including the string to be transmitted to the server. For example, a user may have entered the string in the user interface (e.g., a web page) by typing (e.g., using a keyboard) or by speaking (e.g., using a microphone and speech recognition module).

The technique 800 includes determining 820 a set of candidate database queries, each including a respective sequence of tokens of a database syntax, based on the string. For example, determining 820 the candidate database queries may include matching fragments (e.g., including one or more words) of the string to tokens of the database syntax to which they could relate, and then generating candidate queries as permutations of matched tokens with corresponding sentence fragments that span the string. For example, a set of tokens of the database syntax may be searched for matches to a fragment of the string, where the set of tokens may include tokens representing metadata from a metadata index (e.g., database column names and and their synonyms and associations), tokens representing data in a data index (e.g., cells in the columns of a database containing strings), tokens representing keywords and operators of the database syntax, and tokens representing constants. In some implementations, matches between a fragment of the string and text of a token may be exact, partial, phonetic, stemmed, or based on abbreviations or known associations. In some implementations, all spanning permutations of matched tokens are generated as candidate database queries. In some implementations, dynamic programming is used to select a subset of the possible spanning permutations of matched tokens for generation as candidate database queries. For example, techniques described in relation to the technique 500 of FIG. 5 may be used to determine 820 the set of candidate database queries based on the string. The resulting candidate database queries in the set of candidate queries may include respective sequences of tokens of the database syntax.

The technique 800 includes checking 830 whether a first candidate database query from the set of candidate database queries satisfies a collection of token constraints of a pattern. For example, the collection of token constraints may be read from a pattern record (e.g., the pattern record 1710 of FIG. 17). For example, the pattern record may have generated and stored using the technique 700 of FIG. 7 applied to a previous string and a database query associated with the previous string. For example, the collection of token constraints may be a sequence of token constraints. For example, the collection of token constraints may be a logical AND condition across all of the tokens of database query.

The technique 800 includes, responsive to satisfaction of the collection of token constraints of the pattern, modifying 840 the first candidate database query using a rewrite rule (e.g., the rewrite rule 1714) of the pattern, and adjusting a ranking score of the first candidate database query based on a ranking score adjustment (e.g., the ranking score adjustment 1716) of the pattern. For example, the ranking score adjustment may be added to an intermediate value of a ranking score for a candidate database query.

The technique 800 includes selecting 850, based on the adjusted ranking score, the first candidate database query from the set of candidate database queries. For example, this adjusted ranking score may be compared to ranking scores for other candidate database queries from the set of candidate database queries and/or to a threshold, and, based on these comparisons, the first candidate database query may be selected 850.

The technique 800 includes invoking 860 a search of the database using a query based on the first candidate database query to obtain search results. The first candidate database query, including the sequence of tokens of the database syntax, may specify a logical set of operations for accessing and/or processing data available in one or more databases. In some implementations, the search is invoked 860 by transmitting (e.g., via an electronic communications network) a request or command message including the query based on the modified database query to an external database server that in turn executes a search specified by the query on the database and returns the search results. In some implementations, the search is invoked 860 by executing a search specified by the query on the database, which may have data stored or cached locally (e.g., in high-speed volatile memory), to generate the search results locally. For example, the query may be encoded in the same format as the first candidate database query. In some implementations, the query may be encoded in different format than the first candidate database query in order to match the syntax requirements of a database server managing the database (e.g., an external database or a locally stored database). For example, the query may be in the SQL query format, and may be determined based on the sequence of tokens of the database syntax of the first candidate database query. For example, the query may be in another query format supported by a local or remote database server, and may be determined based on the sequence of tokens of the database syntax of the first candidate database query. In some implementations, the first candidate database query is modified by applying an inference (e.g., as described in relation to the operation 560 of FIG. 6), and the query used to search the database is based on this modified version of the first candidate query. For example, search results may include raw data (e.g., a table of search hits) retrieved from the database and/or summary data (e.g., aggregations or plots) determined by processing data accessed in the database.

The technique 800 includes presenting 870 data based on the search results in the user interface. For example, raw data, summary data, and/or plots or charts of the search results may be presented 870 in the user interface (e.g. a webpage). In some implementations, a summary and/or visual formatting of the data may be determined based on a configuration record (e.g., including user preferences) of the user interface and/or the search results by a machine learning module (e.g., including a neural network) that is trained to identify relevant aspects of data in the context of one or more databases and use cases, and select an appropriate display format. For example, data based on the search results may be presented 870 in the search results pane 150 of FIG. 1. For example, the data based on the search results may be presented 870 by transmitting the data as part of the user interface in messages sent via an electronic communications network (e.g., as part of a websocket over a wide area network). In some implementations, the data based on the search results may be presented 870 in signals passed to a directly connected display for viewing by a user co-located with a computing device implementing the technique 800.

Inference Engine

In some implementations, a database interface system is configured to derive learnings and applying refinements that the users have added in the past. The re-application of refinements may pose challenges of whether the refinement is applicable in a certain context or not. Techniques for extracting learnings from the inputs (e.g., natural language strings and/or the explicit feedback) that the users provide. For example, there may be three different primary modes of sources for learning from the user's usage of the system. These modes may include refinements, queries, and objects. These are further discussed in the section on Sources below.

Sources

There are several sources from which inferences about the dataset can be derived. For example, the set of sources may include:

1. Refinements: The refinements can come from different sources, such as, (a) natural language string to database query translation refinements (e.g., captured through interactions with the like icon 170, or through answers to questions posed to the user in a prompt of the user interface); or (b) refinements used to edit a database query that has generated based on a string (e.g., edits to a translated database query that are entered using the token icons (132, 134, 136, 138, or 140) and/or the suggested tokens menu 160).

2. Queries: Implicit inferences may be derived from pairs of strings and corresponding database queries translated from those queries in the past.

3. Objects: Inferences derived from saved answers to questions about translated queries posed to a user via a prompt of the user interface, and Pinboards, which may be collections of saved answers from a user.

In some implementations, additional inferences may be learned from external sources, such as Web documents (e.g. Wikipedia pages).

Terminology

Type: The type of an inference specifies the decision that the inference tries to resolve. Inferences can be of different types such as superlative disambiguations or date disambiguations. For example, the inference used in the aforementioned inference is of type SUPERLATIVE_SORT. It tries to answer what is the entity (measure or attribute) which should be used to sort the query.

Context: The context in which the inference is defined. The context consists of different features encoding information when can the inference be reused. For example, the context for the aforementioned inference may be Superlative: Best, Attribute: Movie_Title.

Resolution: The resolution specifies the value which is used to resolve the decision. For the aforementioned example the resolution would be the column "imdb_score". This would consist of a collection of recognized tokens.

Objectives

The objectives of the inference engine may include:

Reusability: The overarching objective of the inference engine is to facilitate that all decisions that have been taken in the past should be taken correctly in all subsequent queries. An example of this is as follows: Let's say the user creates a query: "best movie". The database interface system may attempt to decide what is the sorting entity on which the movie should be sorted. For example, the signals may be learnt in the following manner:

The user creates a mapping for "best" to "sort by imdb_score" from the Refinements Panel.

The user adds a natural language string to database query mapping from "best movie" to "top movie ranked by imdb_score".

The user has done a query in the past "best movie sort by imdb_score". Based on one of the above inputs, the inference engine may be able to decide that, for the superlative "best" on "movies", the sorting column should be "imdb_score".

Precision: In case an inference has already been recorded, any subsequent reuse of the inference should be highly accurate. The precision of an inference may decrease rapidly (e.g., exponentially) as the number of context parameters that match reduces.

Generalization: Inferences may be generalizable.

The knowledge from one of the inferences could be used for similar types of decisions even though the context features do not match exactly.

Knowledge transfer:

The knowledge extracted from the inferences can also be applicable to contexts that are similar to the current context. For example, let's say an administrator trains a worksheet (called Master Worksheet) with some inferences. He then creates a copy of the worksheet (due to the original worksheet being broken). It will be highly beneficial if the inferences learnt on Master Worksheet can also be used within the context of the derived worksheet.

The users may test out the database interface on their development environment. Once the system is ready, they might want to transfer the learnings onto their production environment.

As database interface system is deployed across different clusters, there might be some common synonyms and phrases that are applicable across different systems. A mechanism to learn those and reapply across different clusters may be useful.

Some of these learnings may be useful in resolving ambiguities and in the relevance determination in the regular sage workflow as well.

Use Cases

Following are some of the use cases of the InferenceEngine:

1. Token resolution
2. Auto-disambiguation
3. Search suggestions
4. Refinement suggestions Workflows There are primarily two workflows that are established to for build the Inference Engine. These are:

Learning Inferences (Record): This consists of the workflow that records inferences into an inference store.

Interpreting Inferences (Learn): This consists of the workflow that involves lookup on the inferences from the inference store for a specific type of disambiguation.

Learning Inferences

The following steps describe the workflow of the extracting inferences from a resolved query mapping:

1. Extracting inference patterns from the input & resolved query pair.
2. Classifying each of the inference patterns into one of the inferences types.
3. Extracting context from each of the inference.
4. Generalizing the inferences by associating confidence with each inference.
5. Persisting the inferences in an Inference Store.

Inputs

The inputs that are received from the system may be as follows:

SentenceProto: Contains the dependency parse and part-of-speech Tag(s) for each of the words in the input string.

string: The natural language question that is asked by the user.

Database query: The interpretation of the string (e.g., a natural language question) in the database language/syntax.

LineageMap: Encapsulates the mapping from the database query tokens to fragments of the string. For example, the LineageMap may include a key-value map. For example, the LineageMap may be used to determine the correspondence between fragments (e.g., words) of the string and the tokens of a data database query derived from the string. Essentially, this would help identify the words in string that led to the derivation of the resolved tokens in the database query.

Context: The name of the table/worksheet for which the inference is being learned.

User: The identifier of the user for which the inference is learned.

Outputs

The outputs may be as follows:

A ranked list of all the generated inferences from the dataset that get ingested in the Inference Store.

Figure 9:
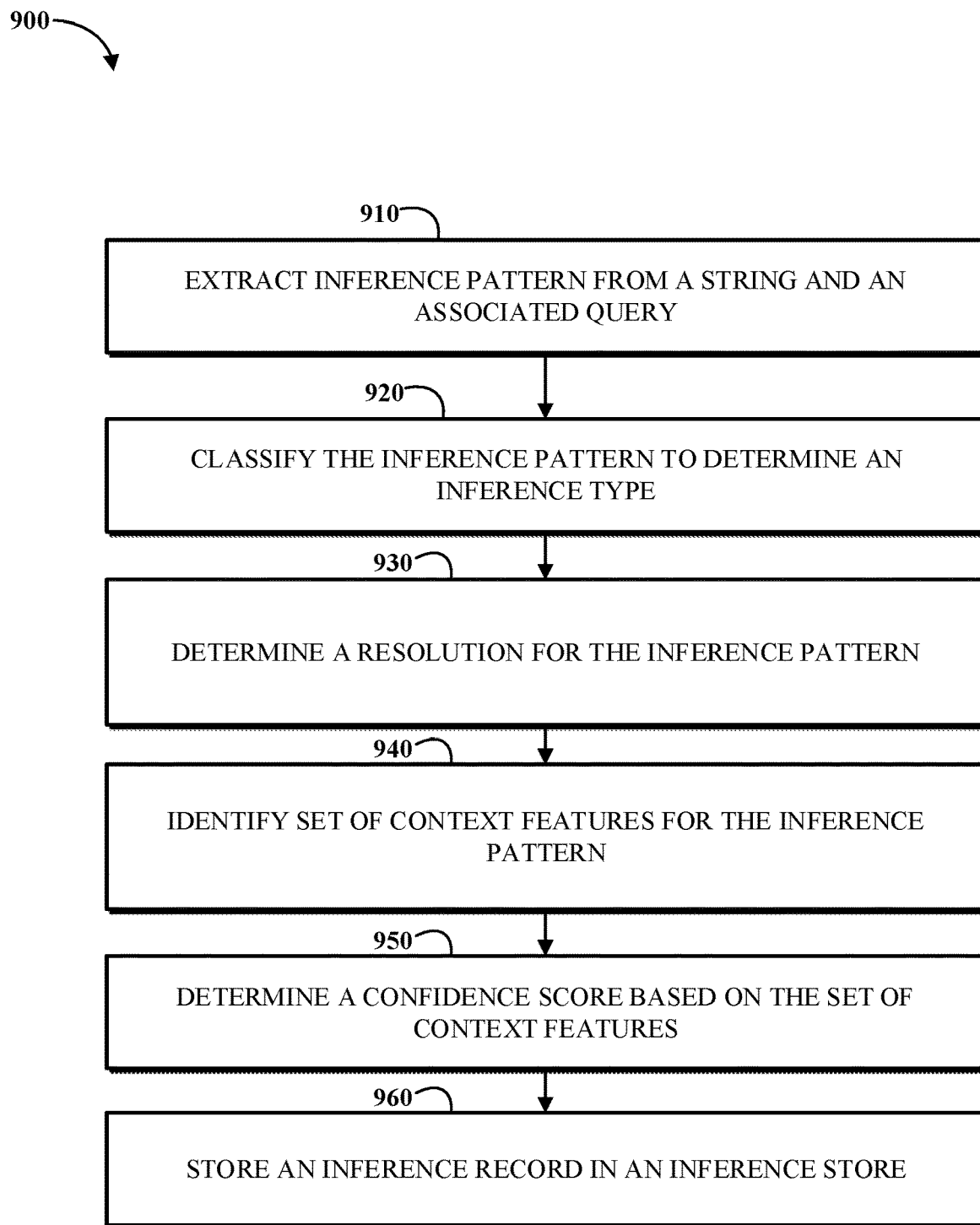
FIG. 9 is a flowchart illustrating an example of a technique for learning inferences from a string and an associated query.

FIG. 9 is a flowchart illustrating an example of a technique 900 for learning inferences from a string and an associated query. The technique 900 includes extracting 910 an inference pattern from a string and a database query; classifying 920 the inference pattern to determine an inference type; determining 930 a resolution, wherein the resolution includes one or more tokens of a database syntax; identifying 940 a set of context features for the inference pattern, wherein the set of context features includes words from the string and tokens from the database query; determining 950 a confidence score based on the set of context features; and storing 960 an inference record in an inference store, wherein the inference record includes the set of context features, the resolution, and the confidence score. For example, the technique 900 may be implemented by the database analysis server 1830 of FIG. 18. For example, the technique 900 may be implemented using the computing device 1900 of FIG. 19.

The technique 900 includes extracting 910 an inference pattern from a string and a database query. The database query includes a sequence of tokens of a database syntax.

The technique 900 includes classifying 920 the inference pattern to determine an inference type.

The technique 900 includes determining 930 a resolution, wherein the resolution includes one or more tokens of a database syntax. For example, the resolution may be determined as portion (e.g., a token or sequence of tokens) from the current database query. In some implementations, a contains probability score associated with a column of a relational database may be maintained. For example, the contains probability score may be based on a count of times the column has been used to filter data with a contains query. For example, the contains probability score for a column to determine the resolution of the inference.

The technique 900 includes identifying 940 a set of context features for the inference pattern. The set of context features may include words from the string and tokens from the database query. For example, the context features may include identification of a worksheet or database. In some implementations, the context features may be generalized by allowing in exact match of certain context features and/or allowing application to related worksheets (e.g., worksheets derived from a master or parent worksheet).

The technique 900 includes determining 950 a confidence score based on the set of context features. For example, the confidence score may be determined 950 based in part upon the feedback data. In some implementations, the confidence score is determined 950 based in part upon receiving feedback via a user interface that was used modify the database query. For example, the confidence score may be determined 950 based in part upon receiving a feedback representing user interaction with a like icon (e.g., the like icon 170) in a user interface while the user interface includes representations of the string and the database query.

The technique 900 includes storing 960 an inference record in an inference store. The inference record may include the set of context features, the resolution, and the confidence score. For example, the inference record may be stored 960 in format similar to the inference record 1610 of FIG. 16.

Figure 10:
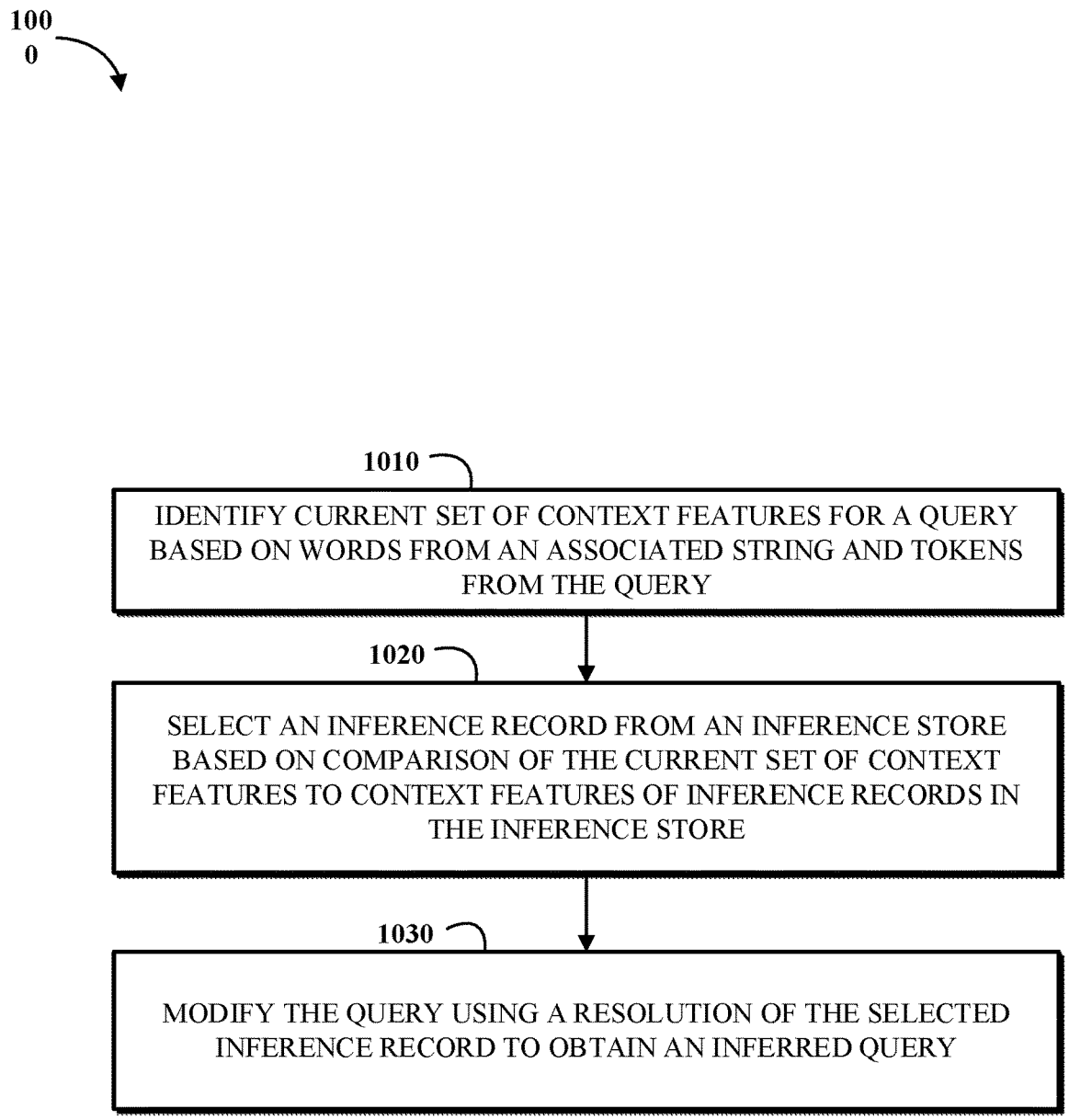
FIG. 10 is a flowchart illustrating an example of a technique for applying inferences to modify a query generated based on a string.

Interpreting Inferences
Inputs
  SentenceProto: Contains the dependency parse and POSTag(s) for the NL question.
  string: The natural language question that is asked by the user.
  Context: The name of the table/worksheet for which the inference is being looked up.
  Inference Features: This includes all the features that are required to lookup the inference from the Inference Index.
Output
  Collection of inferences: Each inference may include:
    Collection of tokens
    Confidence score FIG. 10 is a flowchart illustrating an example of a technique 1000 for applying inferences to modify a query generated based on a string. The technique 1000 includes identifying 1010 a current set of context features for a database query that is associated with a string; selecting 1020 a first inference record from an inference store based on comparison of the current set of context features to context features of inference records in the inference store; and modifying 1030 the database query using a resolution of the first inference record to obtain an inferred database query. For example, the technique 1000 may be implemented by the database analysis server 1830 of FIG. 18. For example, the technique 1000 may be implemented using the computing device 1900 of FIG. 19.

The technique 1000 includes identifying 1010 a current set of context features for a database query that is associated with a string. The database query may include a sequence of tokens of a database syntax. For example, the current set of context features may include words from the string and tokens from the database query. For example, the current set of context features may include an identifier of a current worksheet.

The technique 1000 includes selecting 1020 a first inference record (e.g., the inference record 1610 of FIG. 16) from an inference store based on comparison of the current set of context features to context features of inference records in the inference store. In some implementations, the first inference record includes a confidence score and the first inference record is selected 1020 based on the confidence score. In some implementations, the current set of context features include part-of-speech tags for words of the string, and the technique 1000 includes comparing the part-of-speech tags of the current set of context features to part-of-speech tags of inference records in the inference store. For example, the first inference record may be selected 1020 based on a match of part-of-speech tags of the first inference record to the part-of-speech tags of the current set of context features.

The technique 1000 includes modifying 1030 the database query using a resolution of the first inference record to obtain an inferred database query. The resolution may include one or more tokens of the database syntax.

In some implementations (not shown in FIG. 10), the technique 1000 is augmented to include invoking a search of the database using a query based on the inferred database query to obtain a search result.

Approach to Inference Engine

An idea underlying the current approach is that inferences can be reliably learnt from the usage of the system by understanding the context of the usage where the decisions were made in the past. To understand this in detail, let's take the following running example: A user asks the query: "Best Comedy" and maps it to "Top Movies Sort by Imdb Score genre=comedy". The inference engine learns the context that when "best" is applied to "comedy" (from the column genre in a dataset), the user's intent is to sort the on the imdb_score column and group by movies . Using the above defined inferences, the query "Best Documentary" could be interpreted as "top movies sort by imdb_score genre=documentary". The inference generated for this query is: "Movies are ranked by their imdb_scores".

Inference Categories

This section outlines the types of inferences that we would want to derive out of the usage from queries.

1. Modifiers: The modifiers include characteristics on how should certain attributes be modified. These include superlatives, sorting keywords, filters (like "good", "bad" etc.). These are discussed in detail below:

Superlative sort: These include all the queries wherein one of the attributes is filtered on. The context consists of the superlative and the attribute/filter on which the superlative is applied on. An example of this query is as following:
    The user maps the query "best movie" to the query "top movie sort by imdb_score" and the engine learns that the best movies have high imdb_score.
    The user maps the query "best comedies" to the query "top movie comedy sort by imdb_score" and the engine learns that the best comedy movies have high imdb_score.

The user creates a sage query "top movie sort by imdb_score" and the engine learns that movies are ranked by imdb_score.

Noun modifiers: These include queries where nouns are modified by certain adjectives. The context for these queries includes the adjective and the attribute or filter on which the query is applied. For example, the user maps the string fragment "happy customers" to the database query "customer name sort by amount booked". The engine learns that the happy customers have high amount booked.

2. Date Disambiguations: Input queries usually have a lot of context around which date column should be picked for a given query. For example, the user adds in the query: Who created the most tickets in 2018? For this query, the verb "created" specifies that the user is looking to filter on the Created Date column. The inference engine can learn that "tickets are created according to the Created Date" column.

3. Subject, Object Relationships: In English queries, usually the verb relates the Noun and the Object. For example, the user may ask the question: Who created the most tickets? This query can be refined to "top creator_id sort by unique count ticket_id". For this example, the verb "created" can be used to distinguish that the subject of the query is "creator_id". The inference that the engine would learn is that "creator_id creates tickets". Other examples include, directors direct movies, assignees are assigned tickets etc.

4. Aggregate Disambiguation: Identifying/understanding how certain measures or attributes should be aggregated can be ambiguous. For example, the word "total" when used with "amount booked" and "accounts" results in different aggregations. While "total" with "amount booked" should result in "sum", "total" with "accounts" should result in "unique count". These rules can be learnt from the input string and the corresponding database query that the user selects or otherwise approves.

5. Attribute Qualifier: In general the datasets on which the users are creating queries usually consist of fact tables joined to certain dimension tables. One of the problems that our resolution algorithms have is that it becomes difficult very difficult to pick the right column that defines the entity dimension. For example, consider the dataset Sales Master. It has the Accounts as the underlying dimension table. The table consists of the following columns:
  a. Account
  b. Account Region
  c. Account Owner
  d. Account Tier
  e. Account Id The users may trigger the following queries:
Show me the name of all the accounts.
Show me all the states associated with accounts.
Show me all the ids of accounts.

Quite often the modifier (name, states, ids) can be used to disambiguate the right column (account, account region, account identifier). Some of the learnings are implicit. For example, the column account denotes the account's name, the column account 6. Contains Disambiguation: Quite often the user's dataset has certain columns that have higher probability of them being used as filters. Consider the product name column in the Retail Dataset. Some of the interesting workflows include the users looking at the revenue numbers for different types of products. Some examples of the queries include:

a. What were the total sales of Nike products?
b. What were the total sales of cars products compared to bikes?

However, the data in the column product name consists of:
Nike GSW #30 Curry Jersey,
Nike LAL #2 Ball Jersey,
Nike HOU #13 Harden Jersey,
Nike NE #12 Brady Jersey The above distribution of the dataset may be characteristic of many of retail datasets. It would make it easier for the users to be able to trigger queries on the product qualifiers.

The inference that the engine can learn is the probability of a certain column being a good candidate for Contains. The engine learns this by keeping a contains probability score for each column. This score gets updated everytime that a contains query is fired on the engine. There are two characteristics that can be used to detect the probability of contains:

The column to which the contains filter belongs.
The word which triggered the contains filter.
  i. Qualifying word used to determine which attribute should be picked. For example:
    "list of opportunities"→"opportunities name"
    "Ids of opportunities"→"opportunities identifiers"
  c. Filter Templates For example, Opportunities (are) in (Opportunities) Region.
  d. Null Hypothesis
  i. Learning table stop words.
    "List out all types of industry in Sales."
  ii. Learning modifiers with low semantic knowledge.
Tracking high IDF words that are skipped in the output query.
  e. Generalization to high confidence patterns: Recording inferences from patterns that have been successfully fired in the past. The entities that constitute the patterns can be then used to lookup missing entities.
  f. Language constructs
  g. Syntax Tree based inference detection: Total loan count last year.

We will go through the disambiguation mechanism used for each category in the following section.

7. Context of Inference: Defines the context in which the inference has been made and can be reused.

8. Key Pair: The key associated for which the inference is made.

9. Resolution: The value associated with the inference. Here, the inference category is "Superlative Sort" and the context is "column=genre". The key used is "best" and the resolution is "top movies sort by imdb score".

Answering Natural Language Questions

Some implementations include a method and/or a system for answering natural language analytical questions from a relational database. For example, a system may include a server configured for:
  a. translating natural language questions to database queries;
  b. translating spoken question into database queries;
  c. identifying relevant data base tables to answer a particular question;
  d. generating a natural language description of a database query;
  e. generating the right visualization for the question;
  f. Summarizing the results of database query for quick consumption by a human being;
  g. understanding ambiguities in the question and generating appropriate options for a user to choose;

h. a confidence score to know how well we understood the question;

i. auto-completions to help formulate the question; and j. a learning system that can: (i) Prompt user to enter domain knowledge when appropriate, (ii) Remember knowledge provided by the user, (iii) apply that feedback to all future queries (crowdsourcing knowledge), and (iv) learn from user queries such as subject-verb-object relationships or superlative-measure relationships.

For example, a system may include a user interface for:

a. accepting a spoken or typed natural language question into a search bar and getting the right answer for it.

b. visualizing the answer in an intuitive way c. auto-completion for guiding the user towards answerable questions d. conversational interface to fill the missing information in the question e. an interface for user to understand parsed question and modify it appropriately; and f. an interface for users to teach the system domain knowledge necessary to answer these questions.

Query Translation

Some implementations include translation of a string (e.g., including natural language text) into a database query. For example, in order to generate a database query from a natural language question or command multiple stages of transformation may be implemented. The following diagram describes an example workflow for query translation.

Figure 11:
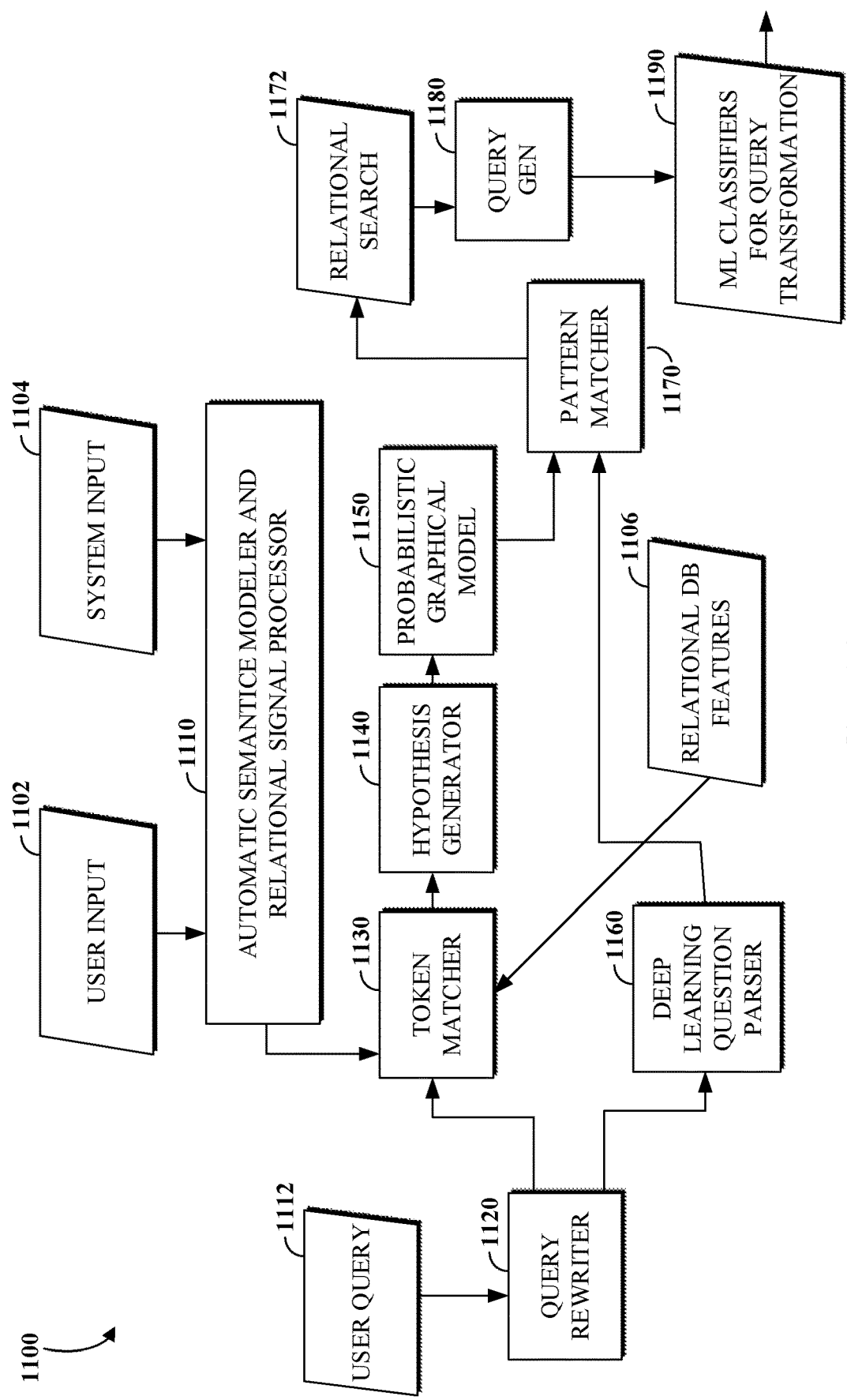
FIG. 11 is block diagram illustrating an example of a system for generating a database query based on a string.

FIG. 11 is block diagram illustrating an example of a system 1100 for generating a database query based on a string. The system 1100 includes an automatic sematic modeler an relational signal processor 1110 that takes user input 1102 (e.g., Domain Dictionary, Stopwords, Word Mappings, Unsupported keywords, user interface Feedback Loop, Subj-Verb-Obj mappings, and/or Word embedding models) and system input 1104 (e.g., Data, Metadata, Dictionaries, Stop Words, Word net, Semantic Dependency, Parser, Unsupported keywords, and Geo entities) as input and determines one or more indices (e.g., indices of Keywords, Metadata, Entity types, Synonyms, Data, Dates, Numbers, Cardinality, Date Patterns, and Verbosity), which may be utilized by a token matcher 1130. The token matcher 1130 may also take relational database features 1106 (e.g., column names vs. data values: Attribute vs measure, Prefix vs substring vs exact, Num of words, Unique counts, Word connectivity, and/or N-gram models) as input. For example, the token matcher 1130 may perform stemming and/or lemmatization and/or may utilize a data dictionary to match fragments of a string from a user, which may have been rewritten by a Query rewriter 1120, to tokens of a relational database.

1. The system 1100 includes a Query Rewriter 1120: This component rewrites the query based on past transformations of the query learned through machine learning algorithms. The learning algorithm learns from multiple queries that lead to the same result. It also learns from user sessions when users do same pair of queries subsequently. For example, if lot of users ask for "revenue averages over month" and then follow it up with "average revenue over month" We learn that "<column><average> can be rewritten as "average <column>".

2. The system 1100 includes a Token Matcher 1130: We match each possible n-gram (consecutive n words for various values of n) with column names, data values, keywords, ordinals and mathematical operators. We have classifiers that generate features from each of these matches and then scorers that score the matches based on the features. Some of the inputs that go into these classifiers and match scorers are: (a.) domain data dictionary, (b.) previous user interactions, (c.) word embedding models, (d.) data types (numeric, text, date etc), (e.) column types (measures or aggregates), (f.) geo based lexicon, time based lexicon, (g.) statistics around word usage in general literature, (h.) statistics around word usage database, (i.) word root of the search text (e.g., stemming and lemmatization), (j.) overlap between search text and matching token, (k.) span of the match (e.g., how many words does the token match), and (l.) Entity type: by sampling values from each column, we classify these columns into a set of entity classes: (i.) Person, (ii.) Place, (iii.) Time/Date, (iv.) Money, (v.) Organization, (vi.) Product, (vii.) Other.

These classifications may be used to add specific matches. For example, who matches all person columns.

3. The system 1100 includes a Deep Neural Net Parser 1160: a deep neural network on a body of questions that gives us: (a.) Parts of Speech Tags, (b.) Semantic Dependencies, (c.) Aggregation, Grouping, Filtering intent. In this stage, inference on user's sentence may be used to get a prediction for the above.

4. Intent detection: Using signals from match and signals from the neural network, the actual intent of the question (e.g., which specific entity the question is about) may be inferred. Based on this intent we decide which parts of the question should be kept and which parts should be dropped. For example, if the question is "which director directed movies with higher imdb score than 8.0", and the intent detector says that "director" is the intent, then we ignore "movies" in the query.

5. Negative Match Signals: An important part of the translation is knowing which part of the user input to ignore. For example, if someone asks a question "who made titanic", the word "made" is also the name of a movie. But the question is not about that particular movie. Various signals may be considered to decide if something should not be used. For example:

(a.) Part-of-speech of the word. For example, verbs and prepositions are often not relevant to the query.

(b.) How frequent is this word: very frequent words tend to be something that can be safely ignored.

(c.) Neighboring parts of speech: A sequence of Verb-Preposition-Noun is usually a signal that we can ignore the word.

(d.) How many other strings belong in the same class. If there are too many other strings in the same class then it may mean we are referring to something very specific. The English grammar has a way of addressing very specific things as opposed to very generic things. Classifiers may be built for detecting that.

6. Knowledge Crawler: it may be important to know how certain words are used. For example, if someone asks "who bought the most toys" that may imply that "who" is actually referring to a customer. This is because often the subject of verb "bought" is usually a customer. Similarly, if the question is "what did john buy" then we know that "what" refers to products because usually the object of "buy" is usually a product. For example, this knowledge may gathered by parsing a known corpus for a database of Subject-Verb-Object triplets.

Similarly, a "best product" could mean best by product revenue and "Longest movie" means "movie by longest duration". For example, a web crawler may be used to download documents and then learn these kinds of relationships from the text. A database of subject-verb-object relationships may be used to match the wh-word (who, what, which, where, etc.) and modify scores of other matches if an appropriate verb is found.

7. The system 1100 includes a probabilistic graphical model 1150: We build a graphical model where each match for a token is represented with a node in the graph. We add an edge from each node to another node that matches the text right after. Probability of transition from one node to next set of nodes may be estimated, and each edge may be labeled with the corresponding probability.

For example, these probabilities may be a function of: (a.) Prior probabilities of each type of token (e.g., frequency in language, (b.) Bigram frequency (e.g., how often the token before the edge and the token after the edge co-occur together), (c.) Class Bigram frequency (e.g., how often any token in the same class as previous token is followed by any token in the same class as the following token). Using this graphical model, we compute the highest probability N (N=100) paths from the start to end. This represents N possible sequences of tokens that could construct a query. Each of these sequences may be called a hypothesis.

Figure 12:
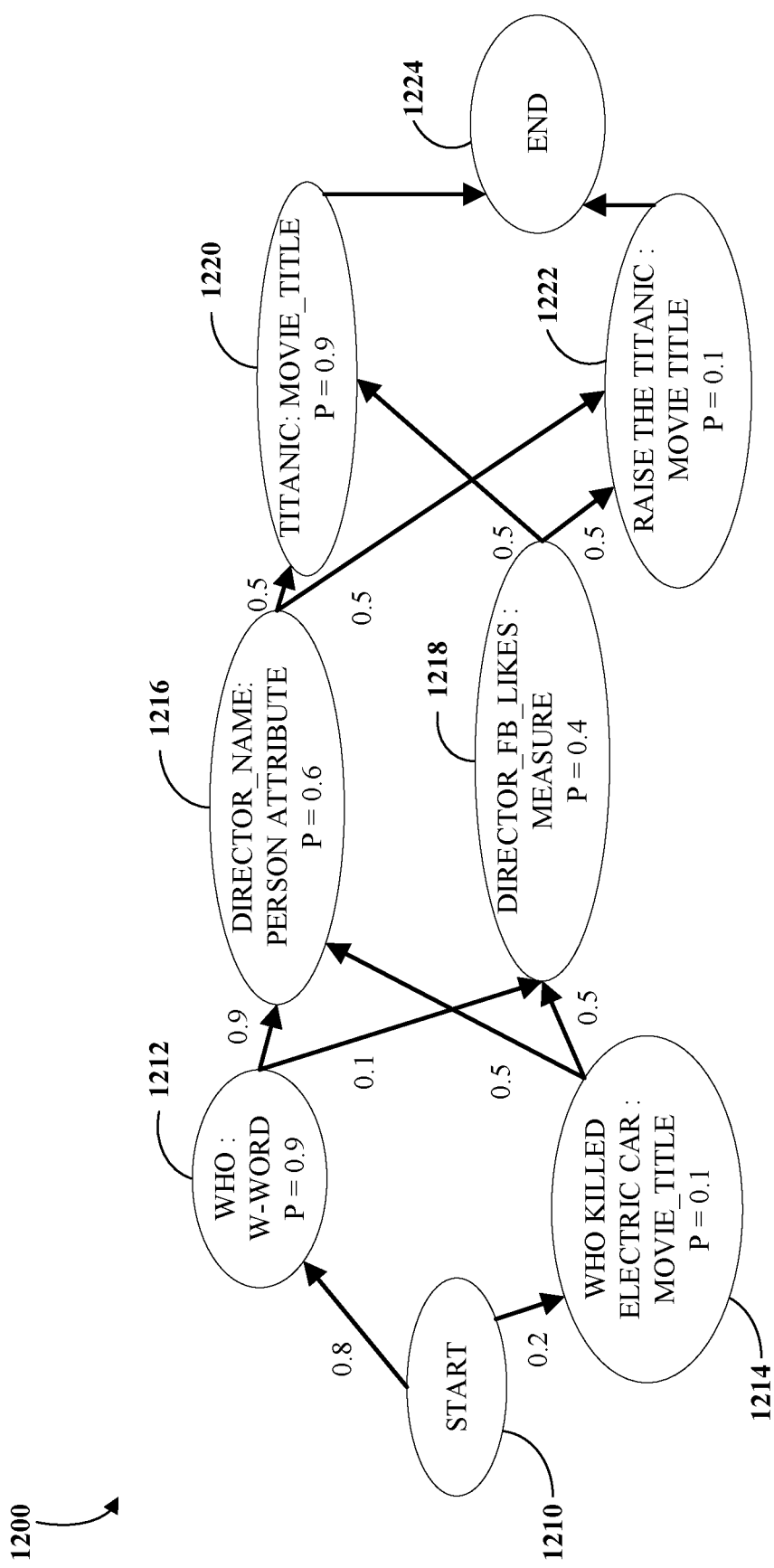
FIG. 12 is a graph illustrating an example of a probabilistic graphical model used for generating a database query based on a string.

FIG. 12 is a graph illustrating an example of a probabilistic graphical model 1200 used for generating a database query based on a string. The probabilistic graphical model 1200 includes a start node 1210; nodes (1212, 1214, 1216, 1218, 1220, and 1222) representing respective tokens that have been matched to fragments (e.g., a sequence of one or more words) of a string; and an end node 1224. The edges connecting the nodes (1212, 1214, 1216, 1218, 1220, and 1222) represent a relationship between the corresponding matched sentence fragments of the two nodes, where the fragment for the node at the start of directed edge occurs immediately before the fragment associated with the node at the end of the direct edge. For example, the start node 1210 may be connected by edges to all nodes corresponding to fragments that include the first word of the string. For example, the end node 1224 may be connected by edges to all nodes corresponding to fragments that include the last word of the string. Thus, paths through this directed graph from the start node 1210 to the end node 1224 may correspond to sequences of nodes that span the string. These paths may be used to generate candidate database queries as sequences of tokens corresponding to a sequence of nodes (1212, 1214, 1216, 1218, 1220, and/or 1222) along one of these paths. The directed edges may be assigned weights based on matching scores and/or natural language syntax data (e.g., part-of-speech tags or syntax trees) for the words of the string. In some implementations, these edge weights may be used to determine scores for paths or groups of paths and select a subset of all possible paths for use in generating candidate database queries.

For example, this probabilistic graphical model approach may be used to build a node from each match that we find in the matching phase of a database query determination for a string. These nodes are assigned some prior probabilities based on the relative match scores. In some implementations, scores are normalized so that they add up to 1.0 and they may be treated as probabilities. Then edges may be added between the nodes. For example, an edge may be added from node S to node T iff, the input text that matches T immediately comes after the input text that matches S. In some implementations, conditional probabilities may be assigned to the edges representing state transitions, which says that given that we are at State S, what is the probability that the next node will be T. So, all the probabilities across all nodes going out from S may add up to 1.

Transition probabilities may be part of the language model that predicts the probability of seeing a token of a certain type after having seen a sequence of tokens. In some implementations these transition probabilities are initialized to start with uniform transition probabilities or have it governed by unigram distribution. The transition probabilities may then be adjusted to bias these for specific sequences that are observed frequently in training data sets.

Once the graph is generated, we may extract the most likely K paths from start to end and that gives us highest ranked candidates. For example, if the question is "who directed titanic?", the graph depicted in FIG. 12 may be built. For example, consider the node probabilities:

Who: matches w-word who as exact while the value match is a substring. So the w-word may be given a higher prior.

Directed: covers lesser fraction of "director_fb_likes" so it may be given slightly less than 0.5 prior.

Titanic: Exact match gets higher prior probability (0.9) than a substring match.

Now let us look at transition probabilities:

Start→who: A sentence is much more likely to start with a w-word than a value.

who→directed: who is much more likely to be followed by a person attribute than a measure.

Directed→titanic: Here since both the destination nodes are a Value node, they may be assigned equal probability.

Based on this graph, the most likely path goes through:

Who (w-word)→director_name→titanic.

This approach may be most effective where good estimates of transition probabilities are available.

8. The system 1100 includes a Pattern Matcher 1170: In some implementations, a set of patterns created manually by engineers and another set of patterns that are learned using machine learning. These patterns may include:

(a.) A set of constraints on tokens such as sequence pattern where, certain classes of tokens must occur in sequence, or loose pattern, where certain classes of tokens must occur close to each other (e.g., independent of order), or tree patterns (e.g., a set of tokens must follow a given structure in the semantic parsing. Some examples include: (i.) Sequence pattern: Which <value><attribute>, e.g., "which asian movie" (ii.) Loose pattern: {<superlative>, <measure><attribute>}, (e.g., movie with best imdb score. (iii.) Tree pattern: <Subject>→<verb>←<Object>, e.g., "who directed titanic"

(b.) A score adjustment (c.) A query generation instruction.

(d.) We attach matching patterns to corresponding hypothesis and adjust their score accordingly. At the end of the flow, using the highest scored hypothesis, we generate a query and that is where query generation instructions are used.

9. The system 1100 includes Relational Query Generation 1180. In relational query generation phase takes the highest scoring hypothesis, corresponding to matched patterns, and then generates a relational query. In some implementations, a query generation engine may then be used to translate relational database query into a SQL query. An example of a query generation engine is described in U.S. Pat. No. 9,405,794 which is herein incorporated by reference in its entirety.

10. The system 1100 includes Query Transformation Classifiers 1190: A set of machine learned models may be used for making final adjustments to the query as needed in some circumstances. Some examples include:

(a.) A query with a "top 10" phrase should have a measure to sort on. If it is not there, we add the most popular measure to sort on.

(b.) If there is a "Count Distinct" operation on a column for which only one unique value is allowed because of a filter, we can convert "count distinct" into "count".

For example, these rules may be learned by finding common user refinements to the query.

Natural Language Query Generation

In some implementations, after we are done with translating a natural language query into SQL, we translate SQL to a natural language question. This is intended to communicate back to the user how we interpreted their question so that the user can iterate and refine the questions.

Figure 13:
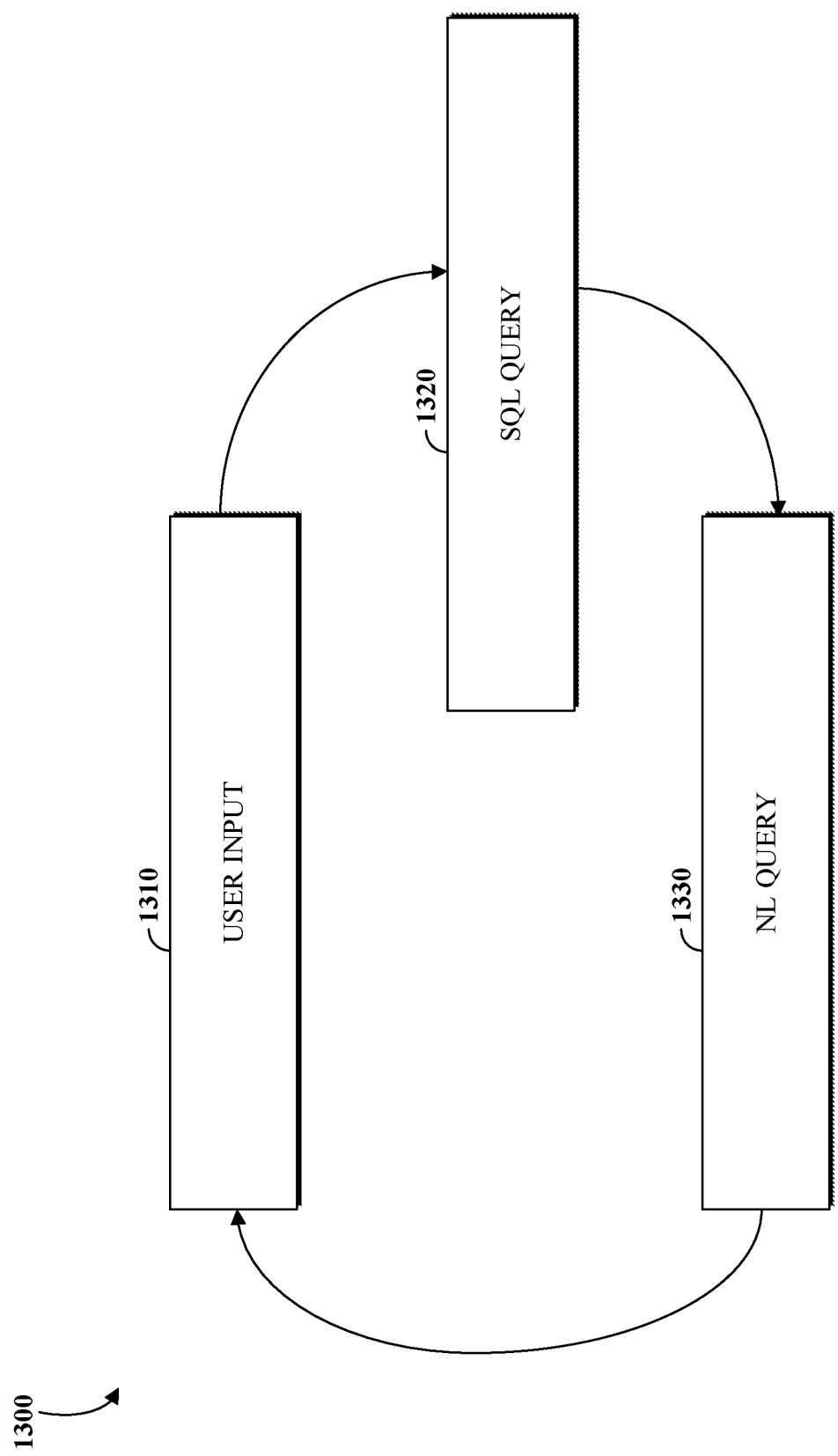
FIG. 13 is an illustration an example of a technique for generating a database query based on a user input.

FIG. 13 is an illustration an example of a technique 1300 for generating a database query based on a user input. The technique 1300 includes receiving 1310 user input regarding a query via a user interface; converting 1320 the user input into an SQL query; and generating and presenting 1330 a natural language representation of the SQL query in the user interface. More user input may be received 1310 in response to the presented 1330 natural language representation of the SQL query. This additional user input may be converted 1320 to a modification of the SQL query, and the cycle can continue to refine the SQL query based on user input. Presenting 1330 the natural language representations may facilitate user understanding of the SQL query and improve the feedback loop. The SQL query may then provide more relevant and/or useful results when it is used to access data in a database.

For example, in order to generate the natural language query (NLQ) we may break the SQL query into 4 sections:
1. Measures being aggregated
2. Attributes being used for group by
3. Filters
4. Sorting A decision tree for each section may be used that figures out how to present each section. This decision tree may pick the appropriate order for different phrases, prepositions to combine phrases, and pluralization for tokens and templates for each phrase.

Visualization Generation

The system may infer what is an appropriate visualization and data summary works best with the query. For example:
1. Some queries may have explicit visualization. For example, "give me a pie chart for revenue distribution by category" or "trend for revenue".
2. Some queries require specific summary. For example, with "best products by revenue" we show top 10 products, but we also create a large tile that highlights the very first top product.
3. Any query looking for a distribution, if the X axis has <10 cardinality, we show a pie chart otherwise a bar graph.

Understanding Ambiguities

Often, it is hard for the matching algorithms to tell which token is the most appropriate match for a given set of words. For example, if the question is "revenue by region" region could map to either a "customer region" or a "store region". In such cases we want to show the user both options and have them make a choice. However, we do not want to ask too many questions to the users, so we assign a significance score to each ambiguity and then only show the ambiguities that crossed a threshold, and in the descending order of significance score. For example, here are the types of disambiguation:

1. Multiple matches: e.g., region could mean "Customer region" or "Store region".
2. Implicit superlative:, e.g, best movie could mean "highest imdb score" or "highest gross"
3. Date filter:, e.g., "last 3 months" could mean last 3 months based on creation date or end date.
4. Unmatched disambiguation: e.g., in "sales by state" we may not have a match for "state".

In some implementations, the scores for each ambiguity are normalized to get probabilities for each possible match and then compute the entropy associated with each ambiguity. For example, ambiguities may be rank based on entropy. For text with no matches, a collection of patterns may be used to identity the important words in the query. If the word has no match, it may be considered as the most important disambiguation.

Auto Completion

In order to help the user formulate useful queries, we provide auto-completions (type-ahead suggestions). For example, the suggestions may fall in two categories:
1. Single token suggestions: these suggestions are for a single token towards the end of the sentence, we take up to 3 words back to look for single token matches. We also use the patterns to rank matches.
2. Full query completion: We save queries used in the past that the users had a positive interaction with (for example, drilling further or pressing the like button). We use these queries to suggest full queries if the share a prefix, with a saved query.

Learning

A user interface may provide several avenues for users to teach the system about the question language, such as:
1. Disambiguation: As users tell the system what it means to say "best" in the context of "product", it learns that.
2. When a user presses "Like" or "Dislike" button it learns whether to reinforce or demote the decisions made to get current mapping
3. When a user maps a word to a token, it is remembered for future usage.
4. From the structure of questions asked we learn n-gram frequency, subj-verb-obj relationships, superlative-measure pairs.

User Interface

Figure 14:
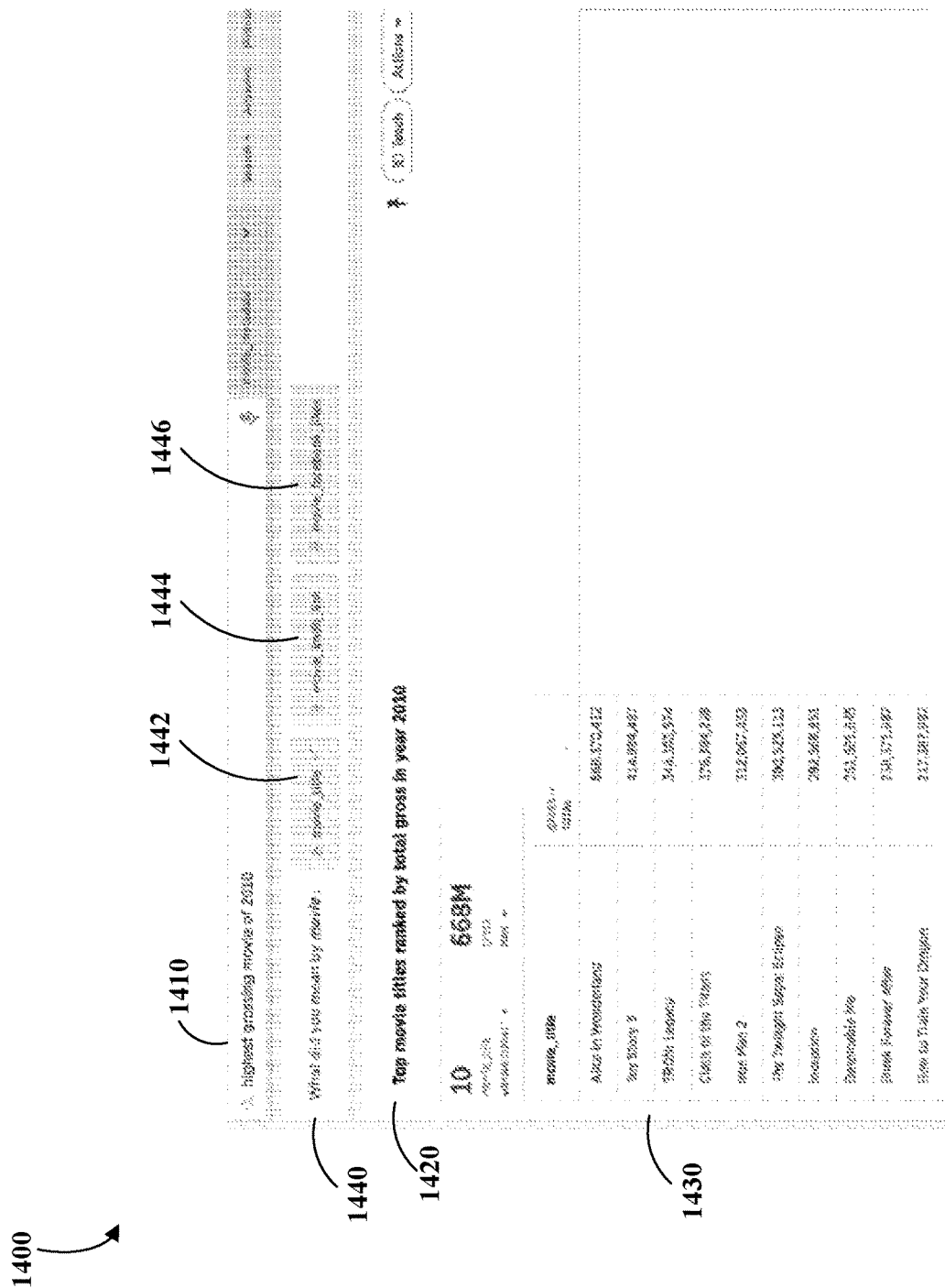
FIG. 14 is diagram of an example of a display region generated for presenting a user interface to facilitate search of one or more databases that prompts a user to disambiguate a term to select a token for a database query.

FIGS. 13-14 illustrate examples of display regions of a user interface that facilitates user feedback regarding database queries.

FIG. 14 is diagram of an example of a display region 1400 generated for presenting a user interface to facilitate search of one or more databases that prompts a user to disambiguate a term to select a token for a database query. The display region 1400 includes a search bar 1410; a query presentation pane 1420; a search results pane 1430; a disambiguation prompt 1440; and token icons (1442, 1444, and 1446) presenting text representations of suggested alternative tokens. For example, a user may enter a string (e.g., including a natural langue question) in the search bar 1410, and a database query may be generated based on the string. A text representation of the database query may be presented in the query presentation pane 1420. For example, a token of the database query may be a less certain portion of the translation. For example, a token of the query may be associated with a relatively low token match score during a translation process. The user may be prompted to disambiguate a fragment (e.g., a sequence of one or more words) of the string that is associated (e.g., by a lineage map) with the uncertain token, by presenting the disambiguation prompt 1440 as a portion of the display region 1400. The disambiguation prompt 1440 may be presented along with the token icons (1442, 1444, and 1446) presenting text representations of suggested alternative tokens. The user may then select a token icon (1442, 1444, or 1446) to indicate which token should be associated with the fragment. This information may then be used to update the database query and/or the search results, which may be presented in the search results pane 1430.

Figure 15:
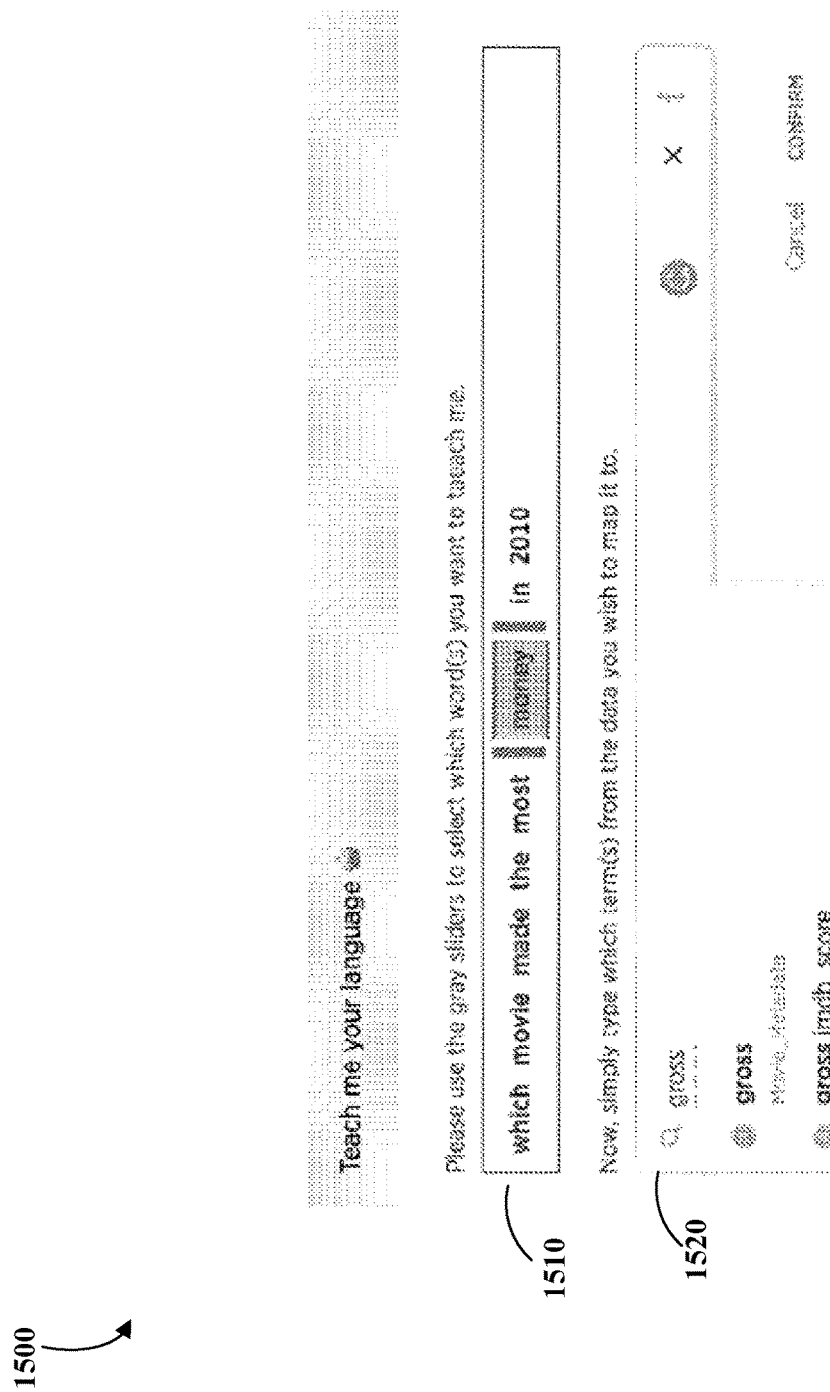
FIG. 15 is diagram of an example of a display region generated for presenting a user interface to facilitate search of one or more databases that prompts a user to teach interface about their language usage.

FIG. 15 is diagram of an example of a display region 1500 generated for presenting a user interface to facilitate search of one or more databases that prompts a user to teach interface about their language usage. The display region 1500 includes a search bar 1510 and drop-down menu 1520. The search bar 1510 may include text that has been entered by a user. The search bar 1510 include grey slider icons that a user can moved within the search bar 1510 in order to select a fragment (e.g., a sequence of one or more words) of the text. The drop-down menu 1520 may then present suggested alternative tokens that may correspond to the selected fragment. The user may select a suggested alternative token from the list in the drop-down menu 1520 to provide an indication that the selected token is associated with the selected fragment in the current context (e.g., context may include a current database worksheet, and/or a current user identifier). For, example, the display region 1500 may enable a user to teach a system providing a database interface the meanings of words in a context.

Suggestions

For example, it may be important for users to be able to get context sensitive suggestions from the system because:

1. Often the users are not familiar with the data that does or does not exist in the system
2. It helps users not make a spelling mistake
3. If we can direct users towards syntax that we understand, that helps us with accurately answering the question.

For example, an approach to address this issue may be two fold:

1. We generate suggestions without any context if the user has typed enough that the possibilities have been reduced to <5. For example, if someone types "calif" suggesting "california" may be a safe bet regardless of context.
2. If one of our sequence patterns can be matched, we can use the context to guess what type of token to expect next. In these cases, we can use show suggestions even if the user has not provided enough text for the token.

In some implementations, suggestions are not presented unless the probability of the suggestion being taken is estimated to be above a certain threshold (e.g., 0.1). For example, Usage Based Ranking (UBR) may be taken into account while estimating probabilities. Suggestions may get more tricky when a user is editing their input in the middle. Some implementations may consider context both forward and backwards.

Feedback

Having a dialog with the users so that users can help the system disambiguate or learn new concepts is may greatly improve a system providing a database interface. For example, feedback may come in four flavors:

Disambiguation: This is the case where what the user typed may be mapped to different tokens and it is not clear which one to use. This can be resolved by prompting the user. For example, "movie" may map to "movie_title" or "movie_fb_liles". We can prompt the user to resolve it for us. This resolved value can also be stored as part of the metadata to be used later on.

Explicit Question: In some cases, when we run into strings that we do not understand but we think the word is important, we should prompt the user of confusion. Here we may ask the user to map the phrase to another column or an expression. For example, profit=revenue−cost. This requires us to examine the probability that given the word (and its IDF), its context, we think this has relevant information for the query, but we do not understand.

User Contributed Metadata: We will also allow user to initiate the flow by highlighting a part of query text and the mapping it to either an existing column or a formula. This allows us to learn synonyms and metadata in crowdsourced manner.

Implicit feedback: As users type questions, select prefered interpretations, we can learn a few things from this:

Associations: we learn auto generated associations that work or don't work.

New associations: We can learn from the use of new language. For example, "movie with longest duration" tells us that longest maps to duration. So in future, of someone just asks about "longest movie" we know that longest maps to duration.

Transition probabilities: user typed questions may be used to learn better transition probabilities.

Inference Data Structures

A primary data structure that used to support storage and lookup may be an Inference Store. Objectives of a key-value store include:

Support storage and lookup of key-value pairs.

Support generalization of the key space (so that search over partial feature space is also supported). For example, the Inference Store should be able to answer the following questions:

What are all the sorting entities used for the "Movies Table"?

What are all the sorting entities used with the word "best"?

What are all the sorting entities used with the entity "best" & attribute "movie"?

Support for ranking of the inferences stored in the index. Some of the features that are needed to rank the inferences stored in the index include:

Users who created the inference

Number of features in the feature space that matched in the lookup

Number of queries which had the evidence of the inference

Figure 16:
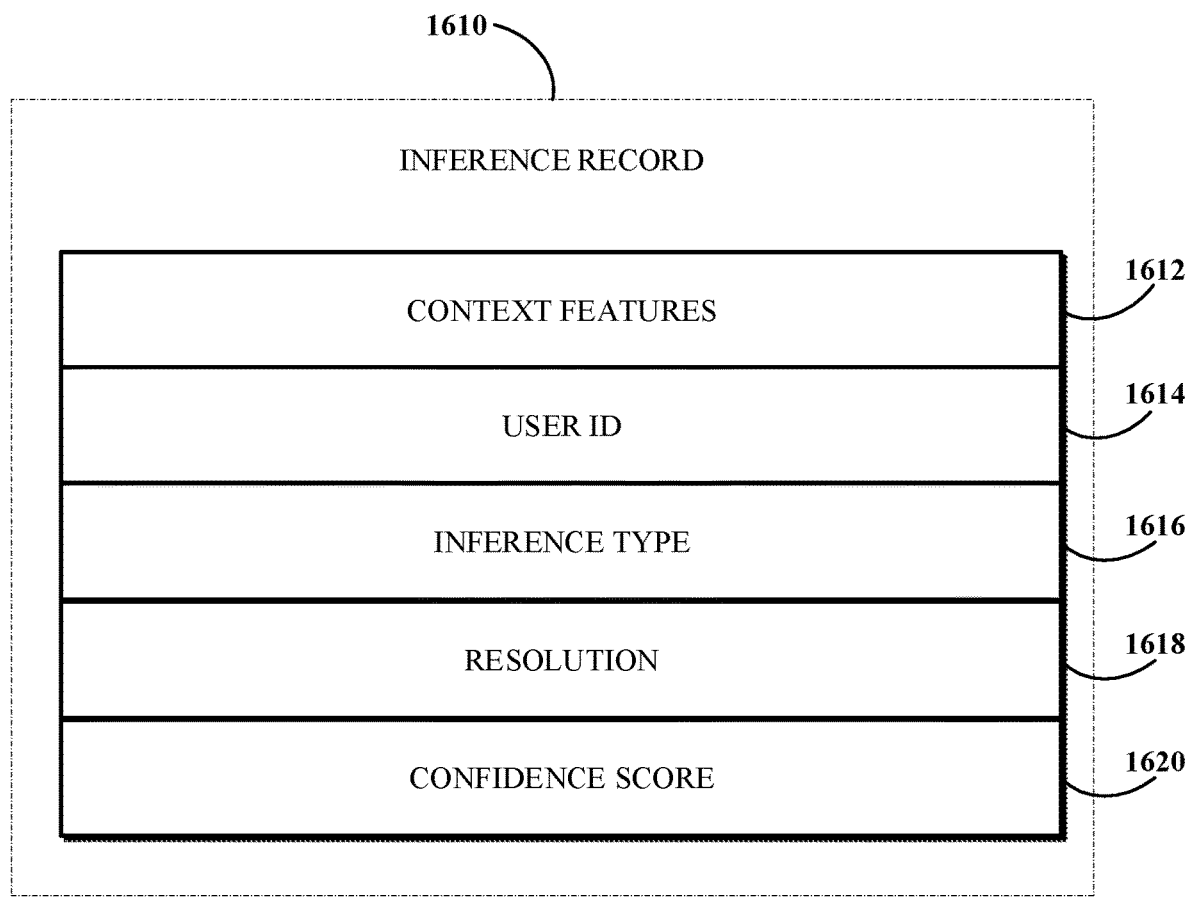
FIG. 16 is a memory map showing an example format for an inference record that is used to facilitate generation of queries based on strings.

FIG. 16 is a memory map showing an example format for an inference record 1610 that is used to facilitate generation of queries based on strings. The inference record 1610 may be stored in an inference store. For example, the inference record may be stored in a memory (e.g., the static memory 1920 or the low-latency memory 1930). The inference record includes context features 1612, which may be matched with the context features of a current string and corresponding database query to determine whether the inference represented by the inference record 1610 should be applied to the current database query. The inference record 1610 includes a user identifier 1614, which may be used limit the application of the inference to a particular user or group users. For example, the user identifier 1614 may identify the user or group of users that provided the input from which this inference was derived (e.g., using the technique 900 of FIG. 9). The inference record 1610 includes an inference type 1616 that specifies what type of instance this record represents (e.g., superlative disambiguations or date disambiguations). The inference record 1610 includes a resolution 1618. For example, the resolution 1618 may include a sequence of tokens of a database syntax. For example, the resolution 1618 may be used to modify a database query when the inference is applied. The inference record 1610 includes a confidence score 1620. For example, the confidence score 1620 may be used to select the inference and/or determine whether the inference will be applied to current database query.

Figure 17:
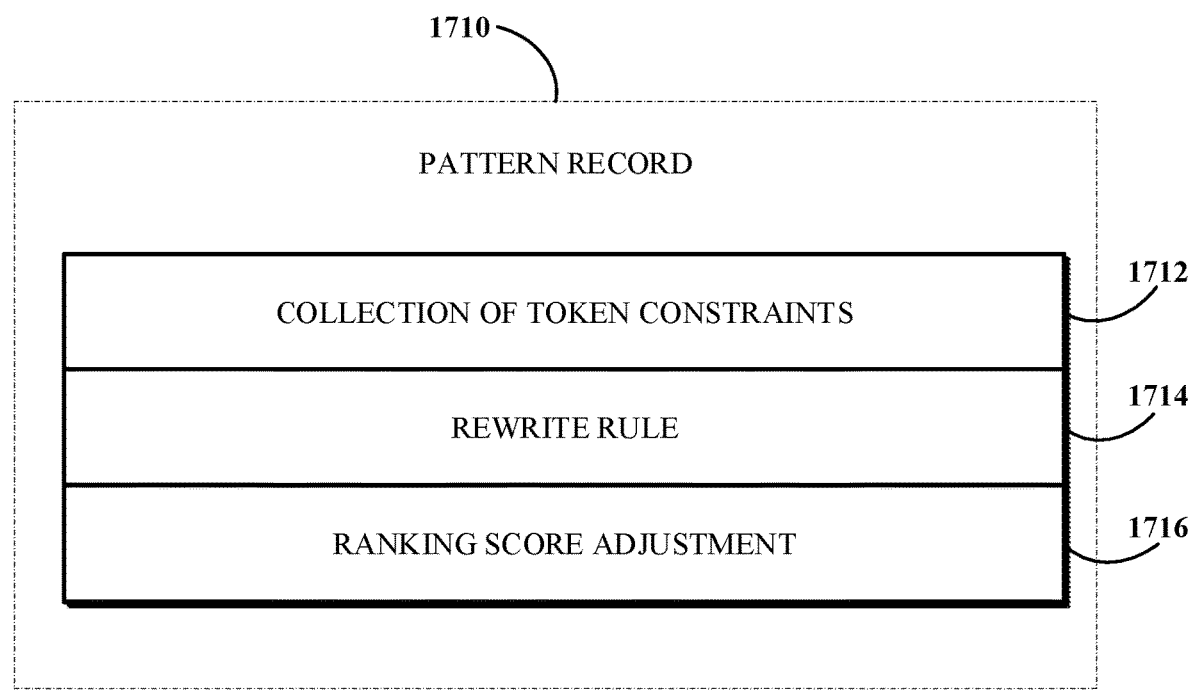
FIG. 17 is a memory map showing an example format for a pattern record that is used to facilitate generation of queries based on strings.

FIG. 17 is a memory map showing an example format for a pattern record 1710 that is used to facilitate generation of queries based on strings. The pattern record 1710 may be stored in a memory (e.g., the static memory 1920 or the low-latency memory 1930). For example, the pattern record 1710 may be accessed during pattern matching phase (e.g., as described in relation to the operation 540) of database query determination. The pattern record 1710 includes a collection of token constraints 1712, which may be used to determine whether a current candidate database query matches the pattern represented by the pattern record 1710. For example, the collection of token constraints 1712 data structure may include a list of token constraints, which may be in ordered list in some implementations. The pattern record 1710 includes a rewrite rule, which may specify a modification to be applied to a candidate database query that matches the pattern. The pattern record 1710 includes a ranking score adjustment 1716. For example, the ranking score adjustment 1716 may include an offset to be added to a ranking score for a candidate database query that satisfies the collection of token constraints 1712 and thus matches the pattern. For example, the pattern record 1710 may be generated using the technique 700 of FIG. 7. For example, the pattern record 1710 may be used as part of the technique 800 of FIG. 8.

Figure 18:
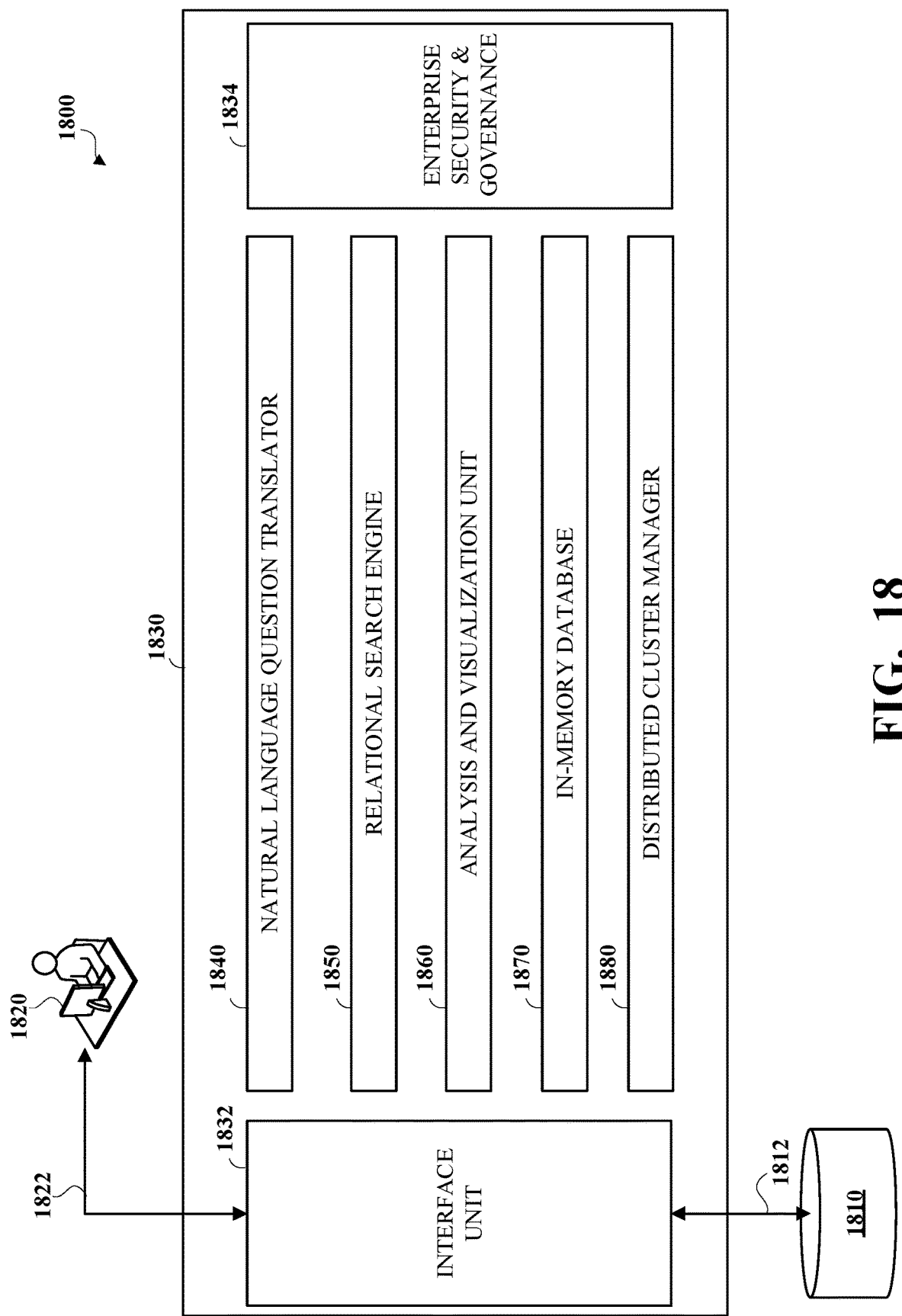
FIG. 18 is block diagram illustrating an example of an architecture for providing a search interface for databases that generates a database query based on a string.

FIG. 18 is block diagram illustrating an example of a system 1800 for providing a search interface for databases that generates a database query based on a string. The system 1800 includes an external data source 1810 (e.g., a relational database), a user device 1820; and a database analysis server 1830. For example, system 1800 may be implemented in an enterprise computing environment, where external data source 1810 is an existing database or databases in the enterprise computing environment and the database analysis server 1830 is implemented in one or more servers or using one or more cloud computing providers.

The external data source 1810 may be a structured database system, such as a relational database operating in a relational database management system (RDBMS), which may be an enterprise database. In some embodiments, the external data source 1810 may be an unstructured data source. The external data source 1810 may be implemented on a computing device, such as the computing device 1900 shown in FIG. 19, which may be a server. In some embodiments, the external data source 1810 may be stored on a static data storage device, such as a hard disk. Other external data sources may be used. Although one external data source 1810 is shown for simplicity, multiple external data sources may be used.

The external data source 1810 may communicate with the database analysis server 1830 via an electronic communication medium 1812, which may be a wired or wireless electronic communication medium. For example, the electronic communication medium 1812 may include a local area network (LAN), a wide area network (WAN), a fiber channel network, the Internet, or a combination thereof. The external data source 1810 may include data or content, such as sales data, revenue data, profit data, tax data, shipping data, safety data, sports data, health data, weather data, or the like, or any other data, or combination of data, that may be generated by or associated with a user, an organization, or an enterprise and stored in a database system. For simplicity and clarity, data stored in or received from the external data source 1810 may be referred to herein as enterprise data.

Figure 19:
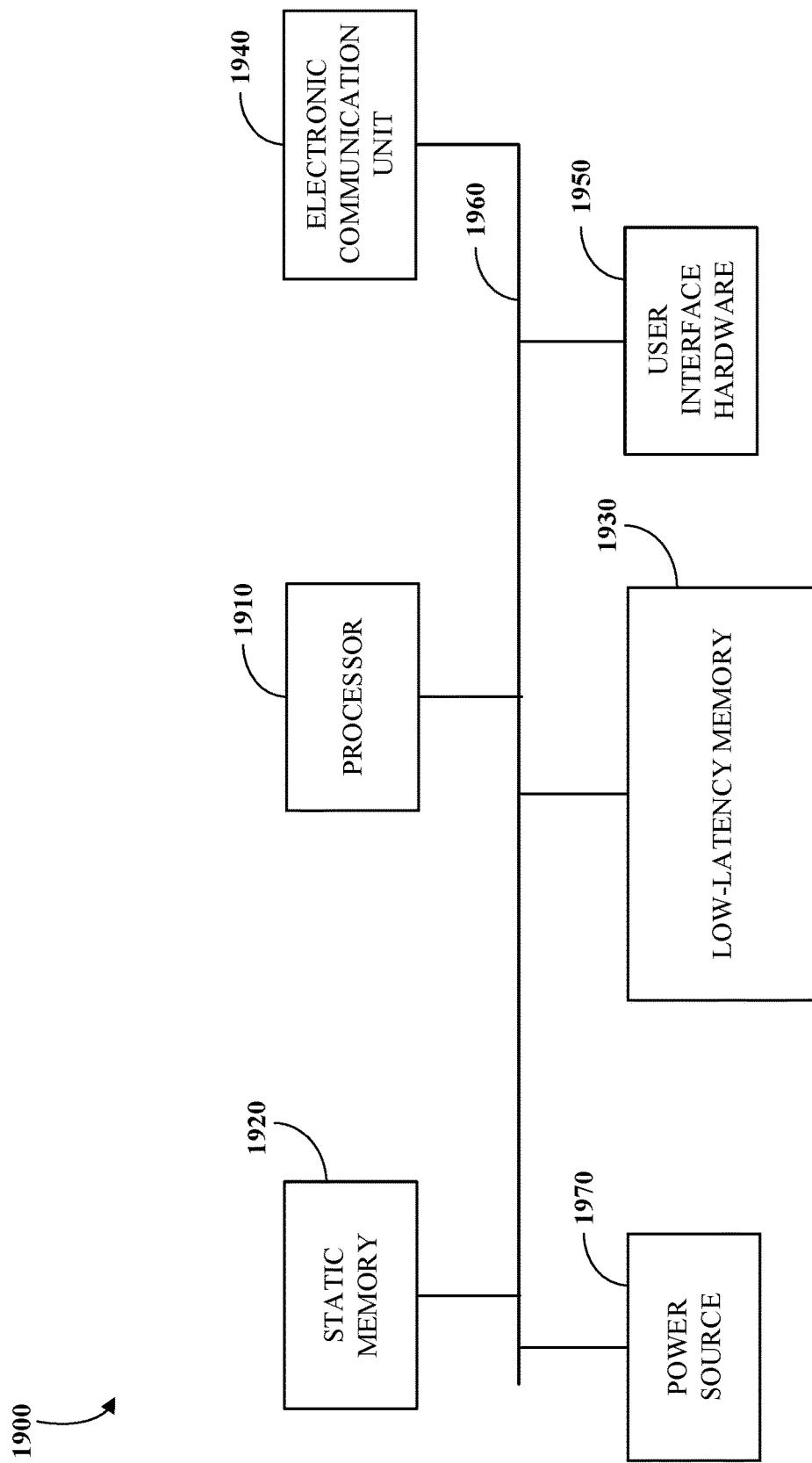
FIG. 19 is a block diagram of an example of a computing device.

The user device 1820 may be a computing device, such as the computing device 1900 shown in FIG. 19. Although one user device 1820 is shown for simplicity, multiple user devices may be used. A user may use the user device 1820 to access the database analysis server 1830. The user device 1820 may comprise a personal computer, computer terminal, mobile device, smart phone, electronic notebook, or the like, or any combination thereof. The user device 1820 may communicate with the database analysis server 1830 via an electronic communication medium 1822, which may be a wired or wireless electronic communication medium. For example, the electronic communication medium 1822 may include a LAN, a WAN, a fiber channel network, the Internet, or a combination thereof.

The database analysis server 1830 may be implemented on a computing device, such as by using one or more of the computing device 1900 shown in FIG. 19. For example, the database analysis server 1830 may be implemented using one or more server devices. In some embodiments, the database analysis server 1830 may be implemented as one or more logical devices in a cloud-based configuration optimized for automatic database analysis. The database analysis server 1830 may store and maintain low-latency data in a low-latency memory device, such as the low-latency memory 1930 shown in FIG. 19, or any other type of data storage medium with relatively fast (low-latency) data access, organized in a low-latency data structure.

As shown in FIG. 18, the database analysis server 1830 includes a database analysis interface unit 1832, an enterprise security and governance unit 1834, a natural language question translator unit 1840, a relational search engine unit 1850, an analysis and visualization unit 1860, an in-memory database 1870, and a distributed cluster manager 1880. Although not expressly shown in FIG. 18, the database analysis interface unit 1832, the enterprise security and governance unit 1834, the analysis and visualization unit 1860, the relational search engine unit 1850, the in-memory database 1870, and the distributed cluster manager 1880 may communicate via an electronic communication medium, such as a computer bus or network. Although the database analysis server 1830 is shown as a single unit, the database analysis interface unit 1832, the enterprise security and governance unit 1834, the natural language question translator unit 1840, the relational search engine unit 1850, the analysis and visualization unit 1860, the in-memory database 1870, and the distributed cluster manager 1880 may be implemented in multiple operatively connected physical units. In some embodiments, one or more of the database analysis interface unit 1832, the enterprise security and governance unit 1834, the natural language question translator unit 1840, the relational search engine unit 1850, the analysis and visualization unit 1860, the in-memory database 1870, and the distributed cluster manager 1880 may be implemented using multiple physical or logical units in a distributed configuration.

The database analysis interface unit 1832 may interface or communicate with one or more external devices or systems, such as the external data source 1810, the user device 1820, or both, via one or more electronic communication mediums, such as the electronic communication medium 1812 or the electronic communication medium 1822. The database analysis interface unit 1832 may implement an application programming interface (API), which may monitor, receive, or both, input signals or messages from the external devices and systems, process received signals or messages, transmit corresponding signals or messages to one or more of the enterprise security and governance unit 1834, the natural language question translator unit 1840, the relational search engine unit 1850, the analysis and visualization unit 1860, the in-memory database 1870, and the distributed cluster manager 1880 receive output signals or messages from one or more of the enterprise security and governance unit 1834, the natural language question translator unit 1840, the relational search engine unit 1850, the analysis and visualization unit 1860, the in-memory database 1870, and the distributed cluster manager 1880, and output, such as transmit or send, the output messages or signals to respective external devices or systems 1810, 1820. The database analysis interface unit 1832 may implement one or more data connectors, which may transfer data between, for example, the low-latency data structure and the external data source 1810, which may include altering, formatting, evaluating, or manipulating the data.

The database analysis interface unit 1832 may receive, or otherwise access, enterprise data from the external data source 1810 and may represent the enterprise data as low-latency data in the low-latency data structure (data population). The database analysis interface unit 1832 may represent the enterprise data from the external data source 1810 as low-latency data in the low-latency data structure.

The data may be organized as tables and columns in the in-memory database 1870 and may be accessed using a structured query language. The data may include values, such as quantifiable numeric values (such as integer or floating-point values), and non-quantifiable values (such as text or image data). Quantifiable data, such as numeric values indicating sizes, amounts, degrees, or the like, may be referred to herein as measures. Non-quantifiable data, such as text value indicating names and descriptions, may be referred to herein as attributes. The data may be organized in tables having rows and columns. A table may organize or group respective aspects of the data. For example, a 'Planets' table may include a list of planets. A table may include one or more columns. A column may describe the characteristics of a discrete aspect of the data in the table. For example, the 'Planets' table may include a 'Planet ID' column, which may describe a numeric value, and a 'Planet' column, which may describe a text value. A record or row of the table may include a respective value corresponding to each column of the table. A column defined as including quantifiable, or numeric, measures may be referred to herein as a measure column. A measure may be a property on which calculations (e.g., sum, count, average, minimum, maximum) may be made. A column defined as including non-quantifiable attributes may be referred to herein as an attribute column. An attribute may be a specification that defines a property of an object. For example, attributes may include text, identifiers, timestamps, or the like. The database analysis interface unit 1832 may consume and/or generate metadata that identifies one or more parameters or relationships for the data, such as based on the enterprise data, and may include the generated metadata in the low-latency data stored in the low-latency data structure. For example, the database analysis interface unit 1832 may identify characteristics of the data such as, attributes, measures, values, unique identifiers, tags, links, column and row keys, or the like, and may include metadata representing the identified characteristics in the low-latency data stored in the low-latency data structure. For example, characteristics of data can automatically be determined by consuming the schema in which the data is stored. Such an analysis can include automatically identifying links or relationships between columns, identifying the meaning of columns (e.g., using column names) and identifying commonly used terms in values (e.g., by indexing values and counting their occurrences).

Distinctly identifiable data in the low-latency data stored in the low-latency data structure may be referred to herein as a data portion. For example, the low-latency data stored in the low-latency data structure may be referred to herein as a data portion, a table from the low-latency data stored in the low-latency data structure may be referred to herein as a data portion, a column from the low-latency data stored in the low-latency data structure may be referred to herein as a data portion, a row or record from the low-latency data stored in the low-latency data structure may be referred to herein as a data portion, a value from the low-latency data stored in the low-latency data structure may be referred to herein as a data portion, a relationship defined in the low-latency data stored in the low-latency data structure may be referred to herein as a data portion, metadata describing the low-latency data stored in the low-latency data structure may be referred to herein as a data portion, or any other distinctly identifiable data, or combination thereof, from the low-latency data stored in the low-latency data structure may be referred to herein as a data portion.

The database analysis interface unit 1832 may automatically generate one or more tokens based on the low-latency data, or based on the enterprise data, such as in accordance with data population. A token may be a word, phrase, character, set of characters, symbol, combination of symbols, or the like. A token may represent a data portion in the low-latency data stored in the low-latency data structure. For example, the database analysis interface unit 1832 may automatically generate a token representing the attributes, the measures, the tables, the columns, the values, unique identifiers, tags, links, keys, or any other data portion, or combination of data portions, or a portion thereof. For example, database analysis interface unit 1832 may generate the token "planet" based on a column of data containing planet names and may generate respective tokens for the planet names in the column. The tokens may be included, such as stored, in the low-latency data stored in the low-latency data structure. The database analysis interface unit 1832 may classify the tokens, which may include storing token classification data in association with the tokens. For example, a token may be classified as an attribute token, a measure token, a value token, or the like.

The database analysis interface unit 1832 may generate a user interface, or one or more portions thereof, for the system 1800 (automatic database analysis interface user interface or user interface). For example, the database analysis interface unit 1832 may generate instructions for rendering, or otherwise presenting, the user interface, or one or more portions thereof and may transmit, or otherwise make available, the instructions for rendering, or otherwise presenting, the user interface, or one or more portions thereof to the user device 1820, for viewing by a user of the user device 1820. For example, the database analysis server 1830 may present the user interface in electronic communication messages (e.g., messages of a web application) transmitted, using the database analysis interface unit 1832, to a user who receives and views the user interface using the user device 1820.

For example, the user interface transmitted by the database analysis interface 1832 may include the display region 110 of FIG. 1. For example, the user interface transmitted by the database analysis interface 1832 may include an unstructured search string user input element. The user device 1820 may display the unstructured search string user input element. The user device 1820 may receive input, such as user input, corresponding to the unstructured search string user input element. The user device 1820 may transmit, or otherwise make available, the unstructured search string user input to the database analysis interface unit 1832. The user interface may include other user interface elements and the user device 1820 may transmit, or otherwise make available, other user input data to the database analysis interface unit 1832.

The database analysis interface unit 1832 may obtain the user input data, such as the unstructured search string, from the user device 1820. The database analysis interface unit 1832 may transmit, or otherwise make available, the user input data to the enterprise security and governance unit 1834, the natural language question translator unit 1840, the relational search engine unit 1850, the analysis and visualization unit 1860, the in-memory database 1870, and the distributed cluster manager 1880, or a combination thereof.

In some embodiments, database analysis interface unit 1832 may obtain the unstructured search string user input may as a sequence of individual characters or symbols, and the database analysis interface unit 1832 may sequentially transmit, or otherwise make available, each character or symbol of the user input data to the enterprise security and governance unit 1834, the natural language question translator unit 1840, the relational search engine unit 1850, the analysis and visualization unit 1860, the in-memory database 1870, and the distributed cluster manager 1880, or a combination thereof.

In some embodiments, database analysis interface unit 1832 may obtain the unstructured search string user input may as a sequence of individual characters or symbols, the database analysis interface unit 1832 may aggregate the sequence of individual characters or symbols, and may sequentially transmit, or otherwise make available, a current aggregation of the received user input data to the enterprise security and governance unit 1834, the natural language question translator unit 1840, the relational search engine unit 1850, the analysis and visualization unit 1860, the in-memory database 1870, and the distributed cluster manager 1880, or a combination thereof, in response to receiving each respective character or symbol from the sequence.

The enterprise security and governance unit 1834 controls the output to the user from queries based on access rights held by the user. For example, a user may not have access to particular columns or data values in the data. The enterprise security and governance unit 1834 can operate to prevent the return or visualization of insights or result sets to the user that the user does not have permission to view. The enterprise security and governance unit 1834 may apply security at a metadata level through access to columns, tables, or at a data level through row level security. Insights may be based on what the user is authorized to see.

The natural language question translator unit 1840 may be configured to take a string (e.g., natural language text including a question or command) and determine a database query based on the string. For example, the natural language question translator unit 1840 may be configured to implement the technique 500 of FIG. 5.

The analysis and visualization unit 1860 may automatically identify one or more insights, which may be data other than data expressly requested by a user, and which may be identified and prioritized, or both, based on probabilistic utility.

The relational search engine unit 1850 may index the tokens, for example using an inverted index data structure. Indexing the tokens may include generating or maintaining index data structures corresponding to the tokens that are optimized for data retrieval operations. For example, a global index may be maintained across columns to index all of the tokens in the database.

The relational search engine unit 1850 may implement one or more finite state machines. A finite state machines may model or represent a defined set of states and a defined set of transitions between the states. A state may represent a condition of the system represented by the finite state machine at a defined temporal point. A finite state machine may transition from a state (current state) to a subsequent state in response to input. A transition may define one or more actions or operations that the relational search engine unit 1850 may implement.

For example, a finite state machine may represent a current set of received user input data. The relational search engine unit 1850 may generate or instantiate the received user input finite state machine. Instantiating the received user input finite state machine may include entering an empty state, indicating the absence of received user input. The relational search engine unit 1850 may initiate or execute an operation, such as an entry operation, corresponding to the empty state in response to entering the empty state. Subsequently, the relational search engine unit 1850 may receive user input data, and the received user input finite state machine may transition from the empty state to a state corresponding to the received user input data. In some embodiments, the relational search engine unit 1850 may initiate one or more queries in response to transitioning to or from a respective state of a finite state machine.

The relational search engine unit 1850 may instantiate, or generate, one or more search objects. The relational search engine unit 1850 may initiates a search query by sending a search object to a search constructor (not explicitly shown in FIG. 18). For example, the search constructor may be implemented as part of the analysis and visualization unit 1860, as part of the relational search engine unit, or as a separate unit of the database analysis server 1830. The relational search engine unit 1850 may instantiate, generate, or modify one or more search objects in response to finite state machine transitions. For example, the relational search engine unit 1850 may instantiate a search object in response to a first transition of a finite state machine. The relational search engine unit 1850 may include a first search object instruction in the search object in response to a second transition of the finite state machine. The relational search engine unit 1850 may send the search object including the first search object instruction to the search constructor in response to the second transition of the finite state machine. The relational search engine unit 1850 may include a second search object instruction in the search object in response to a third transition of the finite state machine. The relational search engine unit 1850 may send the search object including the search object instruction, or a combination of the first search object instruction and the second search object instruction, to the search constructor in response to the third transition of the finite state machine. The search object instructions may be represented using any annotation, instruction, text, message, list, pseudo-code, comment, or the like, or any combination thereof that may be converted, transcoded, or translated into structured search instructions for retrieving data from the low-latency data. Translation from a search object instruction to a structured search may be executed against an in-memory database. For example, an unstructured search may be translated to a structured search.

The search constructor may generate, execute, or both, one or more structured search instructions. In some embodiments, the search constructor may generate the structured search instructions using a defined structured data access language, which may be similar to Structured Query Language (SQL), except as described herein or otherwise clear from context. Executing the structured search instructions may include transmitting the structured search instructions to the in-memory database 1870. The search constructor may otherwise control the in-memory database 1870, such as to maintain or modify the low-latency data structure, which may include, for example, joining columns or tables in the low-latency data structure, or aggregating, such as summing, one or more data portions, such as measures, in the low-latency data. The search constructor may receive data responsive to executed structured search instructions, such as from the in-memory database 1870. For simplicity and clarity, a discrete set of structured search instructions may be referred to herein as a query. The search constructor may obtain, or otherwise access, results data, such as from the in-memory database 1870, indicating the data resulting from executing the query on the low-latency data.

Although not shown separately in FIG. 18, the search constructor may include a data visualization unit. In some embodiments, the data visualization unit may be a distinct unit, separate from the search constructor. In some embodiments, the interface unit 1832 may include a user interface unit, and the data visualization unit may be included in the user interface unit.

The data visualization unit, the interface unit 1832, or a combination thereof, may generate a user interface, or one or more portions thereof. For example, data visualization unit, the interface unit 1832, or a combination thereof, may obtain the results data indicating the data resulting from executing the query on the low-latency data and may generate user interface elements representing the results data.

The in-memory database 1870 may receive structured search instructions (queries), such as from the search constructor, and may access, manipulate, retrieve, or any combination thereof, the low-latency data from the low-latency data structure in accordance with, or in response to, the structured search instructions, which may include executing the structured search instructions.

Although shown as a single unit in FIG. 18, the in-memory database 1870 may be implemented in a distributed configuration. For example, the in-memory database 1870 may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The in-memory database 1870 may identify an in-memory database instance as a query coordinator. The query coordinator may generate a query plan based on the received structured search instructions. The query plan may include query execution instructions for executing the received query by the one or more of the in-memory database instances. The query coordinator may distribute, or otherwise make available, the respective portions of the query execution instructions to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining intermediate results data from, one or more other in-memory database instances, in addition to, or instead of, obtaining the intermediate results data from the low-latency data.

The in-memory database 1870 may output, or otherwise make available, the results data to the search constructor.

The distributed cluster manager 1880 manages the operative configuration of the system 1800, including the configuration and distribution of one or more of the database analysis interface unit 1832, the enterprise security and governance unit 1834, the natural language question translator unit 1840, the relational search engine unit 1850, the analysis and visualization unit 1860, and the in-memory database 1870 in a distributed configuration. For example, the distributed cluster manager 1880 may instantiate one or more of the database analysis interface unit 1832, the enterprise security and governance unit 1834, the natural language question translator unit 1840, the relational search engine unit 1850, the analysis and visualization unit 1860, and the in-memory database 1870 on one or more physical devices or may allocate one or more resources, such as processors, to one or more of the database analysis interface unit 1832, the enterprise security and governance unit 1834, the natural language question translator unit 1840, the relational search engine unit 1850, the analysis and visualization unit 1860, and the in-memory database 1870.

The distributed cluster manager 1880 may generate and maintain automatic database analysis system configuration data, such as in one or more tables, identifying the operative configuration of the system 1800. For example, the distributed cluster manager 1880 may automatically update the automatic database analysis system configuration data in response to an operative configuration event, such as a change in availability or performance for a physical or logical unit of the system 1800. One or more of the database analysis interface unit 1832, the enterprise security and governance unit 1834, the natural language question translator unit 1840, the relational search engine unit 1850, the analysis and visualization unit 1860, and the in-memory database 1870 may access the automatic database analysis system configuration data, such as to identify intercommunication parameters or paths.

FIG. 19 is a block diagram of an example of a computing device 1900. One or more aspects, features, or elements of natural language question answering systems may be implemented using the computing device 1900. The computing device 1900 includes a processor 1910, static memory 1920, low-latency memory 1930, an electronic communication unit 1940, user interface hardware 1950, a bus 1960, and a power source 1970. Although shown as a single unit, any one or more element of the computing device 1900 may be integrated into any number of separate physical units. For example, the low-latency memory 1930 and the processor 1910 may be integrated in a first physical unit and the user interface hardware 1950 may be integrated in a second physical unit. Although not shown in FIG. 19, the computing device 1900 may include other units, or elements, such as an enclosure or one or more sensors.

The computing device 1900 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1910 may include any device or combination of devices capable of manipulating or processing a signal or other information, including optical processors, quantum processors, molecular processors, or a combination thereof. The processor 1910 may be a central processing unit (CPU), such as a microprocessor, and may include one or more processing units, which may respectively include one or more processing cores. The processor 1910 may include multiple interconnected processors. For example, the multiple processors may be hardwired or networked, including wirelessly networked. In some implementations, the operations of the processor 1910 may be distributed across multiple physical devices or units that may be coupled directly or across a network. In some implementations, the processor 1910 may include a cache, or cache memory, for internal storage of operating data or instructions. The processor 1910 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1910 may be operatively coupled with the static memory 1920, the low-latency memory 1930, the electronic communication unit 1940, the user interface hardware 1950, the bus 1960, the power source 1970, or any combination thereof. The processor may execute, which may include controlling the static memory 1920, the low-latency memory 1930, the electronic communication unit 1940, the user interface hardware 1950, the bus 1960, the power source 1970, or any combination thereof to execute, instructions, programs, code, applications, or the like, which may include executing one or more aspects of an operating system, and which may include executing one or more instructions to perform one or more aspects, features, or elements described herein, alone or in combination with one or more other processors.

The static memory 1920 is coupled to the processor 1910 via the bus 1960 and may include non-volatile memory, such as a disk drive, or any form of non-volatile memory capable of persistent electronic information storage, such as in the absence of an active power supply. Although shown as a single block in FIG. 19, the static memory 1920 may be implemented as multiple logical or physical units.

The static memory 1920 may store executable instructions or data, such as application data, an operating system, or a combination thereof, for access by the processor 1910. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 1930 is coupled to the processor 1910 via the bus 1960 and may include any storage medium with low-latency data access including, for example, DRAM modules such as DDR SDRAM, Phase-Change Memory (PCM), flash memory, or a solid-state drive. Although shown as a single block in FIG. 19, the low-latency memory 1930 may be implemented as multiple logical or physical units.

The low-latency memory 1930 may store executable instructions or data, such as application data for low-latency access by the processor 1910. The executable instructions may include, for example, one or more application programs, that may be executed by the processor 1910. The executable instructions may be organized into programmable modules or algorithms, functional programs, codes, code segments, and/or combinations thereof to perform various functions described herein. For example, the executable instructions may include instructions to identify a column of utility, generate an exploration query based on a search query, generate an insight based on a result of the exploration query, and transmit an insight for display on a user device. An exploration query may be based on an analysis of lower level data of a hierarchically structured data based on probabilistic utility. The lower level data may be referred to as a drill path. A drill path may be a type of exploration query for grouping by a column of utility. An exploration query may be automatically generated by identifying and prioritizing the lower level data based on probabilistic utility. Analyzing an exploration query may include refining attributes to identify utility data by identifying columns (i.e., groups of attributes) and further analyzing those columns by automatically identifying and prioritizing the data based on probabilistic utility to automatically generate a data set for each exploration query. The generated data set may be referred to as an exploration result set.

The low-latency memory 1930 may be used to store data that is analyzed or processed using the systems or methods described herein. For example, storage of some or all data in low-latency memory 1930 instead of static memory 1920 may improve the execution speed of the systems and methods described herein by permitting access to data more quickly by an order of magnitude or greater (e.g., nanoseconds instead of microseconds).

The electronic communication unit 1940 is coupled to the processor 1910 via the bus 1960. The electronic communication unit 1940 may include one or more transceivers. The electronic communication unit 1940 may, for example, provide a connection or link to a network via a network interface. The network interface may be a wired network interface, such as Ethernet, or a wireless network interface. For example, the computing device 1900 may communicate with other devices via the electronic communication unit 1940 and the network interface using one or more network protocols, such as Ethernet, Transmission Control Protocol/Internet Protocol (TCP/IP), power line communication (PLC), WiFi, infrared, ultra violet (UV), visible light, fiber optic, wire line, general packet radio service (GPRS), Global System for Mobile communications (GSM), code-division multiple access (CDMA), or other suitable protocols.

The user interface hardware 1950 may include any unit capable of interfacing with a human user, such as a virtual or physical keypad, a touchpad, a display, a touch display, a speaker, a microphone, a video camera, a sensor, a printer, or any combination thereof. For example, the user interface hardware 1950 may be used to view and interact with a user interface (e.g., webpage) that is received using the electronic communication unit 1940 after being presented by a remote server in network communications messages. The user interface hardware 1950 may include a display; a positional input device, such as a mouse, touchpad, touchscreen, or the like; a keyboard; or any other human and machine interface device. The user interface hardware 1950 may be coupled to the processor 1910 via the bus 1960. In some implementations, the user interface hardware 1950 can include a display, which can be a liquid crystal display (LCD), a cathode-ray tube (CRT), a light emitting diode (LED) display, an organic light emitting diode (OLED) display, an active matrix organic light emitting diode (AMOLED), or other suitable display. In some implementations, the user interface hardware 1950 may be part of another computing device (not shown).

The bus 1960 is coupled to the static memory 1920, the low-latency memory 1930, the electronic communication unit 1940, the user interface hardware 1950, and the power source 1970. Although a single bus is shown in FIG. 19, the bus 1960 may include multiple buses, which may be connected, such as via bridges, controllers, or adapters.

The power source 1970 provides energy to operate the computing device 1900. The power source 1970 may be a general-purpose alternating-current (AC) electric power supply, or power supply interface, such as an interface to a household power source. In some implementations, the power source 1970 may be a single use battery or a rechargeable battery to allow the computing device 1900 to operate independently of an external power distribution system. For example, the power source 1970 may include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 1900.

Usage-Based Scoring in Text Interpretation

This section describes how the usage characteristics of a database interface (e.g., hosted by a cluster) may be used to improve text interpretation.

Learning from Database Interface Usage

Because there may be uncertainty in the tokens determined based on text by a database interface, additional indications and/or user feedback may be used as sources of usage data that can be used to determine future database queries based on future text strings. In some implementations, explicit user feedback is a source of usage data. In this approach, explicit signals from the user are used to derive the usage characteristics of data/metadata. Given a set of matches, between words of a string and tokens, that are used to generate a query, the following cases indicate high confidence in the generated matches: generated query liked by the user; and matches that are derived from explicit refinements from the user.

When a generated query liked by the user, all the matches in the query may be assumed to be meaningful to the user. For example, for the user string "Which is the best movie in 2015?", the search query "top movie_title sort by imdb_score release date=2015" may be generated/interpreted. An indication that the user liked the resulting search query (e.g., a user interaction with a 'like' icon in the database interface), may indicate usage, such as, columns movie_title, imdb_score, release date encode useful information about the data, and the date range 2015 (release date) has meaning for the user. The indication that the user liked the resulting search query may also indicate inferences, such as, the inference that the best movies are sorted by imdb_score, and the inference that the match (movie_title) on the word (movie) is a good match.

Matches that are derived from explicit refinements from the user may also provide usage data. While the user may not actively indicate whether the generated query as a whole was meaningful or not, the user may indicate parts of the text string that should be mapped to a specific token in the query. In some implementations, the usage derived from these parts may be given a higher weight since these have been explicitly indicated by the user. For example, for the string "Show me the best movie in 2015", the generated query "top movie_title sort by movie title release date 2015" may not be what the user is looking for. The user may refine "best" to "sort by imdb_score" using the database interface. For example, the refinement can be used to infer column (imdb_score) is meaningful to the user, and the inference that the best movies are sorted by imdb_score.

Using explicit user feedback as a source for usage data may provide an advantage of having high confidence on the signals to be used to learn the usage. However explicit user feedback signals may occur with low frequency, and so relying solely on explicit user feedback may result in a low learning rate.

In some implementations, implicit user feedback is a source of usage data. Implicit signals from the queries triggered by the users may be used in order to improve the learning rate of the usage distribution. For example, text strings entered by a user that have an exact representation in a database query syntax can be considered correct and used to infer the distribution of the data/metadata usage from it. For example, tokens of a database syntax that have an exact match in a user entered string may be used as usage data. The strings entered by the users may encapsulate sufficient information about the distribution of usage of the underlying data. In some implementations, only non-ambiguous exact matches are used to derive the characteristics about the usage of the data/metadata. For example, metadata, such as non-ambiguous exact matches on the column names tend to be less noisy and can be used to track the column usage. The characteristics of matches on data may have different properties. Even exact matches may be noisy and can introduce noise when deriving their usage properties. An example of this is as following: On a travel dataset, the user string "How much have I spent on all travel types this year and last year?" results in a noisy match on the word "all travel types" from the column "Marketing Supplier Name".

Scoring with Usage

While the context of a string may be of primary importance in picking the right match for a word from a collection of candidates, usage data can also be used in selecting tokens of a corresponding query. For example, usage data may facilitate exact match arbitration.

For example, usage data may facilitate proximal non-exact candidate arbitration. In scenarios where multiple match candidates are in the same proximity of the search text, the candidates with the higher usage may be favored. For example, for the string "List of all the movies", there may be multiple candidate tokens (movie_imdb_link, movie_title) for the word "movie". Furthermore, the scores for both the matches may be sufficiently close to be indistinguishable. It may make sense for the match on "movie_title" to be used in generating the query since it has been most heavily used.

For example, usage data may facilitate null candidate identification. Given the usage distribution of the metadata/data the probability of an entity's usage can be inferred. Tokens that have a weak match in the string and very low probability of usage are good candidates of being dropped from the query. Instead, they may be shown as suggestions in a refinements panel. For example, for the string "what are my top hotels in london", the database interface system may pick "hotels in" as a spurious match in "Supplier Name". The following characteristics indicate that "hotels in" as a weak match: (1) higher probability of an attribute after the word "top"; and (2) the column "Supplier Name" has a very high cardinality and therefore low probability of hitting a highly confident match.

For example, usage data may facilitate picking the right operator modifying entities. Some of the decisions that are taken during the course of query generation can be made statistically based on the past usage. Examples include picking the aggregation when on the metadata (attribute/measure), and picking the bucketing on a date column.

In some implementations, the contribution of a usage score to a ranking score used for selection among options to generate a database query based on a string may be adjusted based on the state of the usage data. For example, a usage data weighting scheme may be based on the following observations. The usage of a database interface system may closely reflect the steady state distribution after a certain threshold on the number of queries has been achieved. The more the system is used, the closer the usage numbers would reflect the reality. In case the larger the variance is between the head and the tail of the distribution of usage, the lesser would be the error rate from the usage contribution. This means that the contribution from the usage scores can be assigned a higher weight in cases where the usage is skewed.

Figure 20:
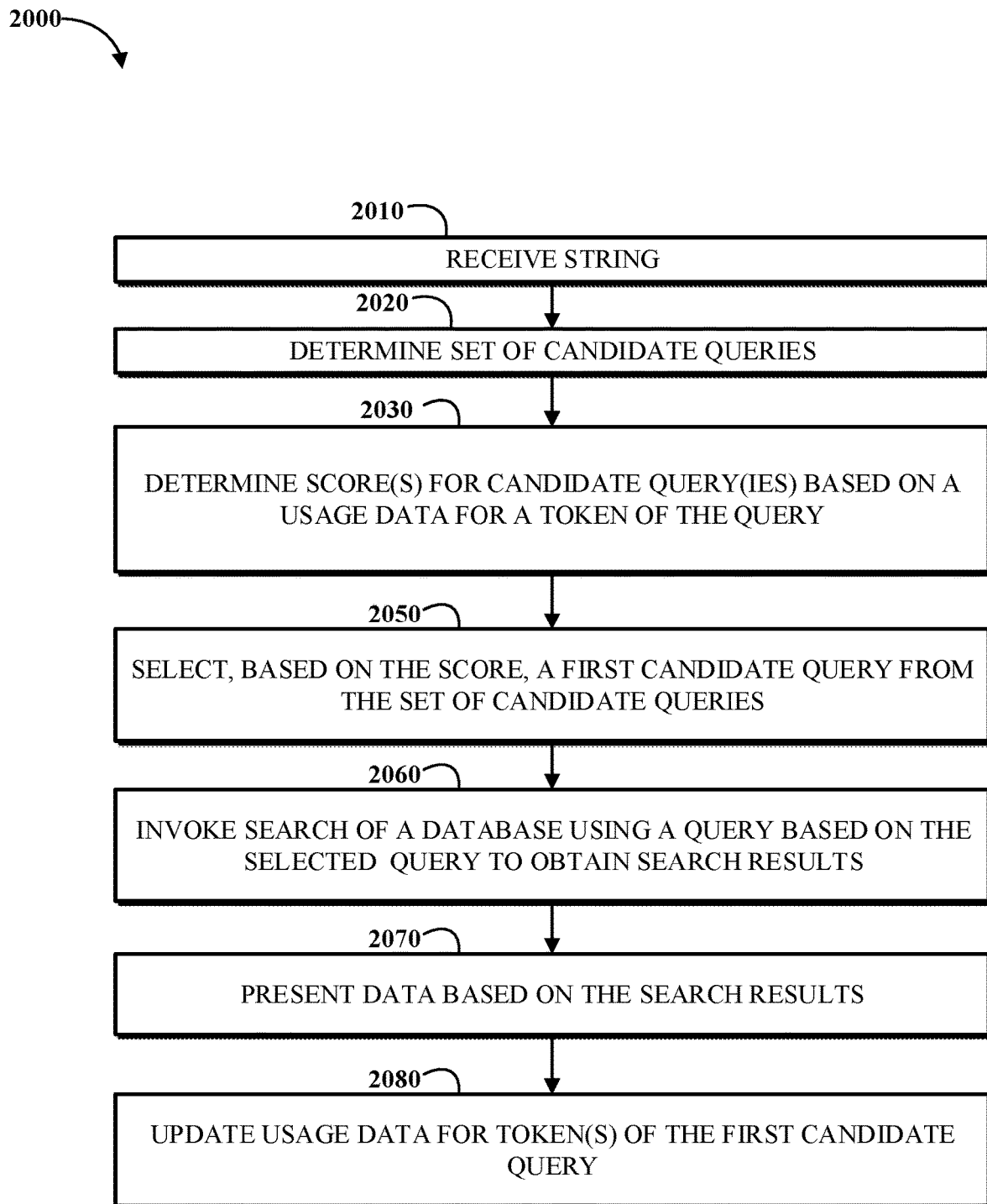
FIG. 20 is a flowchart illustrating an example of a technique for providing a search interface for databases that generates a database query based on a string.

FIG. 20 is a flowchart illustrating an example of a technique 2000 for providing a search interface for databases that generates a database query based on a string. The technique 2000 includes receiving 2010 a string entered via a user interface; determining 2020 a set of candidate database queries, each including a respective sequence of tokens of a database syntax, based on the string; determining 2030 a score for a first candidate database query from the set of candidate database queries, wherein the score is based on a usage data for a token of the respective sequence of tokens of the first candidate database query; selecting 2050, based on the score, the first candidate database query from the set of candidate database queries; invoking 2060 a search of the database using a query based on the first candidate database query to obtain search results; presenting 2070 data based on the search results in the user interface; and updating 2080 the usage data for the token. For example, the technique 2000 may be implemented by the database analysis server 1830 of FIG. 18. For example, the technique 2000 may be implemented using the computing device 1900 of FIG. 19.

The technique 2000 includes receiving 2010 a string entered via a user interface. For example, the string may include text in a natural language (e.g., English or Chinese). For example, the text of the string may represent a question or a command for a database analysis system (e.g., a system including the database analysis server 1830). For example, the string may be received 2010 by a server that is presenting a user interface (e.g., a webpage) to a user who is located at a remote location via communication messages over an electronic communications network (e.g., a wide area network). For example, the user interface may include the display region 110 of FIG. 1. For example, the string may be received 2010 by a server presenting the display region 110 when a user types in the search bar 120 and causes a message including the string to be transmitted to the server. For example, a user may have entered the string in the user interface (e.g., a web page) by typing (e.g., using a keyboard) or by speaking (e.g., using a microphone and speech recognition module).

The technique 2000 includes determining 2020 a set of candidate database queries, each including a respective sequence of tokens of a database syntax, based on the string. For example, determining 2020 the candidate database queries may include matching fragments (e.g., including one or more words) of the string to tokens of the database syntax to which they could relate, and then generating candidate queries as permutations of matched tokens with corresponding sentence fragments that span the string. For example, a set of tokens of the database syntax may be searched for matches to a fragment of the string, where the set of tokens may include tokens representing metadata from a metadata index (e.g., database column names and their synonyms and associations), tokens representing data in a data index (e.g., cells in the columns of a database containing strings), tokens representing keywords and operators of the database syntax, and tokens representing constants. In some implementations, matches between a fragment of the string and text of a token may be exact, partial, phonetic, stemmed, or based on abbreviations or known associations. In some implementations, all spanning permutations of matched tokens are generated as candidate database queries. In some implementations, dynamic programming is used to select a subset of the possible spanning permutations of matched tokens for generation as candidate database queries. For example, techniques described in relation to the technique 500 of FIG. 5 may be used to determine 2020 the set of candidate database queries based on the string. The resulting candidate database queries in the set of candidate queries may include respective sequences of tokens of the database syntax.

The technique 2000 includes determining 2030 a score for a first candidate database query from the set of candidate database queries. The score is based on a usage data for a token of the respective sequence of tokens of the first candidate database query. The usage data may reflect frequency and/or recency of user interactions with a token or an n-gram of tokens in a database interface. The usage data may be collected for individual users and/or aggregated across multiple users or groups of users. In some implementations, the usage data may be stored in a table of key-value pairs. For example, the usage data may be retrieved from a usage data structure using the token as a key to retrieve one or more values corresponding to the token. For example, the usage data may be retrieved from a usage data structure using an n-gram of tokens including the token as a key to retrieve one or more values corresponding to the token. For example, the usage data may include an indication of how often the token has been used in a window of time. In some implementations, the usage data includes multiple counters of occurrences of the token in respective time intervals spanning a window of time. For example, the score may be determined 2030 as a weighted average of the multiple counters. In some implementations, counters corresponding to more recent time intervals may be weighted more heavily than counters corresponding to less recent time intervals.

The technique 2000 includes selecting 2050, based on the score, the first candidate database query from the set of candidate database queries. For example, a ranking score for the first candidate database query may be determined based on the score. This ranking score may be compared to ranking scores for other candidate database queries from the set of candidate database queries and/or to a threshold, and, based on these comparisons, the first candidate database query may be selected 2050.

The technique 2000 includes invoking 2060 a search of the database using a query based on the first candidate database query to obtain search results. The first candidate database query, including the sequence of tokens of the database syntax, may specify a logical set of operations for accessing and/or processing data available in one or more databases. In some implementations, the search is invoked 2060 by transmitting (e.g., via an electronic communications network) a request or command message including the query based on the selected 2050 database query to an external database server that in turn executes a search specified by the query on the database and returns the search results. In some implementations, the search is invoked 2060 by executing a search specified by the query on the database, which may have data stored or cached locally (e.g., in high-speed volatile memory), to generate the search results locally. For example, the query may be encoded in the same format as the first candidate database query. In some implementations, the query may be encoded in different format than the first candidate database query in order to match the syntax requirements of a database server managing the database (e.g., an external database or a locally stored database). For example, the query may be in the SQL query format, and may be determined based on the sequence of tokens of the database syntax of the first candidate database query. For example, the query may be in another query format supported by a local or remote database server, and may be determined based on the sequence of tokens of the database syntax of the first candidate database query. In some implementations, the first candidate database query is modified by applying an inference (e.g., as described in relation to the operation 560 of FIG. 6), and the query used to search the database is based on this modified version of the first candidate query. For example, search results may include raw data (e.g., a table of search hits) retrieved from the database and/or summary data (e.g., aggregations or plots) determined by processing data accessed in the database.

The technique 2000 includes presenting 2070 data based on the search results in the user interface. For example, raw data, summary data, and/or plots or charts of the search results may be presented 2070 in the user interface (e.g. a webpage). In some implementations, a summary and/or visual formatting of the data may be determined based on a configuration record (e.g., including user preferences) of the user interface and/or the search results by a machine learning module (e.g., including a neural network) that is trained to identify relevant aspects of data in the context of one or more databases and use cases, and select an appropriate display format. For example, data based on the search results may be presented 2070 in the search results pane 150 of FIG. 1. For example, the data based on the search results may be presented 2070 by transmitting the data as part of the user interface in messages sent via an electronic communications network (e.g., as part of a websocket over a wide area network). In some implementations, the data based on the search results may be presented 2070 in signals passed to a directly connected display for viewing by a user co-located with a computing device implementing the technique 2000.

The technique 2000 includes updating 2080 the usage data for one or more tokens of the first candidate database query. The usage data may be updated 2080 based on explicit or implicit feedback from a user collected by a user interface. For example, the usage data for the token may be updated 2080 based on a user interaction with a like icon in the user interface while the user interface includes representations of the string and the first candidate database query. For example, the usage data for the token may be updated 2080 based on feedback data concerning the first candidate database query received via the user interface that is used to modify the first candidate database query (e.g., as described in relation to FIG. 2). For example, the usage data for the token may be updated 2080 based on an exact match between the token and one or more words of the string. For example, the usage data for the token may be updated 2080 based on an exact match between the string and a database query. For example, the usage data may be updated 2080 by incrementing a counter associated with a token or an n-gram of tokens. In some implementations, an updated 2080 counter may be associated with a current time interval.

A first implementation is a method for providing a search interface for databases that includes receiving, via a user interface, an indication that a string entered via the user interface matches a database query, wherein the database query includes a sequence of tokens of a database syntax; responsive to the indication, determining a pattern based on the string and the database query, wherein the pattern includes a collection of token constraints, a rewrite rule that maps one or more input tokens to a sequence of output tokens, and a ranking score adjustment that can be applied to a ranking score for a candidate database query; and storing the pattern. The indication may be based on a user interaction with a like icon in the user interface while the user interface includes representations of the string and the database query. The indication may include feedback data concerning the database query received via the user interface that was used to modify the database query. The indication may include receiving the string via the user interface in response to a prompt presented in the user interface, wherein the prompt requested a natural language translation of the database query. The collection of token constraints may be a sequence of token constraints. The string may be a first string, the method may further include: receiving a second string entered via the user interface; determining a set of candidate database queries, each including a respective sequence of tokens of the database syntax, based on the second string; checking whether a first candidate database query from the set of candidate database queries satisfies the collection of token constraints of the pattern; responsive to satisfaction of the collection of token constraints of the pattern, modifying the first candidate database query using the rewrite rule of the pattern, and adjusting a ranking score of the first candidate database query based on the ranking score adjustment of the pattern; selecting, based on the adjusted ranking score, the first candidate database query from the set of candidate database queries; invoking a search of the database using a query based on the first candidate database query to obtain search results; and presenting data based on the search results in the user interface.

A second implementation is a method for providing a search interface for databases that includes receiving a string entered via a user interface; determining a database query, including a sequence of tokens of a database syntax, based on the string, wherein determining the database query includes applying natural language processing to the string; presenting, via the user interface, respective text representations for tokens in the sequence of tokens; receiving feedback data concerning the database query via the user interface; modifying the database query based on the feedback data; invoking a search of a database using a query based on the modified database query to obtain search results; and presenting data based on the search results in the user interface. The feedback data may include a selection, which was made using a menu of the user interface, of a token from a list of suggested alternatives for a token of the database query. The method of the second implementation may include extracting an inference pattern from the string and the database query; classifying the inference pattern to determine an inference type; determining a resolution, wherein the resolution includes one or more tokens of the database syntax; identifying a set of context features for the inference pattern, wherein the set of context features includes words from the string and tokens from the database query; determining a confidence score based on the set of context features; and storing an inference record in an inference store, wherein the inference record includes the set of context features, the resolution, and the confidence score. The confidence score may be determined based in part upon the feedback data. The confidence score may be determined based in part upon receiving a feedback representing user interaction with a like icon in the user interface while the user interface includes representations of the string and the database query. The method of the second implementation may include maintaining a contains probability score associated with a column of the database, wherein the contains probability score is based on a count of times the column has been used to filter data with a contains query; and using the contains probability score for the column to determine the resolution. The method of the second implementation may include identifying a current set of context features for the database query, wherein the current set of context features includes words from the string and tokens from the database query; selecting a first inference record from an inference store based on comparison of the current set of context features to context features of inference records in the inference store; and modifying the database query using a resolution of the first inference record to obtain an inferred database query, wherein the resolution includes one or more tokens of the database syntax, and wherein the query is based on the inferred database query. The first inference record may include a confidence score and the first inference record may be selected based on the confidence score. The current set of context features may include part-of-speech tags for words of the string, and the method of the second implementation may include comparing the part-of-speech tags of the current set of context features to part-of-speech tags of inference records in the inference store, wherein the first inference record is selected based on a match of part-of-speech tags of the first inference record to the part-of-speech tags of the current set of context features. The method of the second implementation may include receiving, via the user interface, an indication that the string matches the database query; responsive to the indication, determining a pattern based on the string and the database query, wherein the pattern includes a collection of token constraints, a rewrite rule that maps one or more input tokens to a sequence of output tokens, and a ranking score adjustment that can be applied to a ranking score for a candidate database query; and storing the pattern. The indication may be based on a user interaction with a like icon in the user interface while the user interface includes representations of the string and the database query. The indication may include the feedback data. The collection of token constraints may be a sequence of token constraints. The method of the second implementation may include checking whether the database query satisfies a collection of token constraints of a pattern, wherein the pattern includes the collection of token constraints, a rewrite rule that maps one or more input tokens to a sequence of output tokens, and a ranking score adjustment that can be applied to a ranking score for a candidate database query; and responsive to satisfaction of the collection of token constraints of the pattern, modifying the database query using the rewrite rule of the pattern, and adjusting a ranking score of the database query based on the ranking score adjustment of the pattern; and selecting, based on the adjusted ranking score, the database query from a set of candidate database queries.

A third implementation is a method that includes determining a set of candidate database queries, each including a respective sequence of tokens of a database syntax, based on a string; determining a first score for a first candidate database query from the set of candidate database queries, wherein the first score is based on a match between one or more words of the string and a token of the respective sequence of tokens of the first candidate database query; determining a second score for the first candidate database query, wherein the second score is based on natural language syntax data determined for words of the string; selecting, based on the first score and the second score, the first candidate database query from the set of candidate database queries; and invoking a search of the database using a query based on the first candidate database query to obtain search results. The method of the third implementation may include extracting an inference pattern from the string and the first candidate database query; classifying the inference pattern to determine an inference type; determining a resolution, wherein the resolution includes one or more tokens of the database syntax; identifying a set of context features for the inference pattern, wherein the set of context features includes words from the string and tokens from the first candidate database query; determining a confidence score based on the set of context features; and storing an inference record in an inference store, wherein the inference record includes the set of context features, the resolution, and the confidence score. The confidence score may be determined based in part upon receiving feedback via a user interface that was used modify the first candidate database query. The confidence score may be determined based in part upon receiving a feedback representing user interaction with a like icon in a user interface while the user interface includes representations of the string and the first candidate database query. The method of the third implementation may include maintaining a contains probability score associated with a column of the database, wherein the contains probability score is based on a count of times the column has been used to filter data with a contains query; and using the contains probability score for the column to determine the resolution. The method of the third implementation may include identifying a current set of context features for the first candidate database query, wherein the current set of context features includes words from the string and tokens from the first candidate database query; selecting a first inference record from an inference store based on comparison of the current set of context features to context features of inference records in the inference store; and modifying the first candidate database query using a resolution of the first inference record to obtain an inferred database query, wherein the resolution includes one or more tokens of the database syntax, and wherein the query is based on the inferred database query. The first inference record may include a confidence score and the first inference record may be selected based on the confidence score. The current set of context features include part-of-speech tags for words of the string, and the method of the third implementation may include comparing the part-of-speech tags of the current set of context features to part-of-speech tags of inference records in the inference store, wherein the first inference record is selected based on a match of part-of-speech tags of the first inference record to the part-of-speech tags of the current set of context features. The method of the third implementation may include receiving an indication that the string matches the first candidate database query; responsive to the indication, determining a pattern based on the string and the first candidate database query, wherein the pattern includes a collection of token constraints, a rewrite rule that maps one or more input tokens to a sequence of output tokens, and a ranking score adjustment that can be applied to a ranking score for a candidate database query; and storing the pattern. The indication may be based on a user interaction with a like icon in a user interface while the user interface includes representations of the string and the first candidate database query. The indication may include user feedback data concerning the database query that was used to modify the first candidate database query. The collection of token constraints may be a sequence of token constraints. The method of the third implementation may include checking whether the first candidate database query from the set of candidate database queries satisfies a collection of token constraints of a pattern, wherein the pattern includes the collection of token constraints, a rewrite rule that maps one or more input tokens to a sequence of output tokens, and a ranking score adjustment that can be applied to a ranking score for a candidate database query; and, responsive to satisfaction of the collection of token constraints of the pattern, modifying the first candidate database query using the rewrite rule of the pattern, and adjusting the second score based on the ranking score adjustment of the pattern. The first score may be determined based on a first inverse document frequency of an unmatched word of the string and a second inverse document frequency of a matched word of the string. The method of the third implementation may include presenting, via a user interface, respective text representations for tokens in the sequence of tokens; receiving feedback data concerning the first candidate database query via the user interface; modifying the first candidate database query based on the feedback data; invoking a search of a database using a query based on the modified first candidate database query to obtain modified search results; and presenting data based on the modified search results in the user interface.

A fourth implementation is a method that includes extracting an inference pattern from a string and a database query, wherein the database query includes a sequence of tokens of a database syntax; classifying the inference pattern to determine an inference type; determining a resolution, wherein the resolution includes one or more tokens of a database syntax; identifying a set of context features for the inference pattern, wherein the set of context features includes words from the string and tokens from the database query; determining a confidence score based on the set of context features; and storing an inference record in an inference store, wherein the inference record includes the set of context features, the resolution, and the confidence score. The confidence score may be determined based in part upon receiving feedback via a user interface that was used modify the database query. The confidence score may be determined based in part upon receiving a feedback representing user interaction with a like icon in a user interface while the user interface includes representations of the string and the database query. The method of the fourth implementation may include maintaining a contains probability score associated with a column of a relational database, wherein the contains probability score is based on a count of times the column has been used to filter data with a contains query; and using the contains probability score for the column to determine the resolution.

A fifth implementation is a method that includes identifying a current set of context features for a database query that is associated with a string, wherein the database query includes a sequence of tokens of a database syntax, and the current set of context features includes words from the string and tokens from the database query; selecting a first inference record from an inference store based on comparison of the current set of context features to context features of inference records in the inference store; modifying the database query using a resolution of the first inference record to obtain an inferred database query, wherein the resolution includes one or more tokens of the database syntax; and invoking a search of the database using a query based on the inferred database query to obtain search results. The first inference record may include a confidence score and the first inference record may be selected based on the confidence score. The current set of context features may include part-of-speech tags for words of the string, and the method of the fifth implementation may include comparing the part-of-speech tags of the current set of context features to part-of-speech tags of inference records in the inference store, wherein the first inference record is selected based on a match of part-of-speech tags of the first inference record to the part-of-speech tags of the current set of context features.

A sixth implementation is a method for providing a search interface for databases that includes receiving a string entered via a user interface; determining a set of candidate database queries, each including a respective sequence of tokens of a database syntax, based on the string; determining a score for a first candidate database query from the set of candidate database queries, wherein the score is based on a usage data for a token of the respective sequence of tokens of the first candidate database query; selecting, based on the score, the first candidate database query from the set of candidate database queries; invoking a search of the database using a query based on the first candidate database query to obtain search results; and presenting data based on the search results in the user interface. The usage data may be retrieved from a usage data structure using the token as a key to retrieve one or more values corresponding to the token. The usage data may include an indication of how often the token has been used in a window of time. The usage data may include multiple counters of occurrences of the token in respective time intervals spanning a window of time. The score may be determined as a weighted average of the multiple counters, wherein counters corresponding to more recent time intervals are weighted more heavily than counters corresponding to less recent time intervals. The method of the sixth implementation may include updating the usage data for the token based on a user interaction with a like icon in the user interface while the user interface includes representations of the string and the first candidate database query. The method of the sixth implementation may include updating the usage data for the token based on feedback data concerning the first candidate database query received via the user interface that is used to modify the first candidate database query. The method of the sixth implementation may include updating the usage data for the token based on an exact match between the token and one or more words of the string. The method of the sixth implementation may include updating the usage data for the token based on an exact match between the string and a database query.

A seventh implementation is a method for providing a search interface for databases that includes receiving a string entered via a user interface; determining a set of candidate database queries, each including a respective sequence of tokens of a database syntax, based on the string; determining a first score for a first candidate database query from the set of candidate database queries, wherein the first score is based on a match between one or more words of the string and a token of the respective sequence of tokens of the first candidate database query; determining a second score for the first candidate database query, wherein the second score is based on natural language syntax data determined for words of the string; selecting, based on the first score and the second score, the first candidate database query from the set of candidate database queries; invoking a search of the database using a query based on the first candidate database query to obtain search results; and presenting the search results in the user interface. The method of the seventh implementation may include extracting an inference pattern from the string and the first candidate database query; classifying the inference pattern to determine an inference type; determining a resolution, wherein the resolution includes one or more tokens of the database syntax; identifying a set of context features for the inference pattern, wherein the set of context features includes words from the string and tokens from the first candidate database query; determining a confidence score based on the set of context features; and storing an inference record in an inference store, wherein the inference record includes the set of context features, the resolution, and the confidence score. The confidence score may be determined based in part upon receiving feedback via the user interface that was used modify the first candidate database query. The confidence score may be determined based in part upon receiving a feedback representing user interaction with a like icon in the user interface while the user interface includes representations of the string and the first candidate database query. The method of the seventh implementation may include maintaining a contains probability score associated with a column of the database, wherein the contains probability score is based on a count of times the column has been used to filter data with a contains query; and using the contains probability score for the column to determine the resolution. The method of the seventh implementation may include identifying a current set of context features for the first candidate database query, wherein the current set of context features includes words from the string and tokens from the first candidate database query; selecting a first inference record from an inference store based on comparison of the current set of context features to context features of inference records in the inference store; and modifying the first candidate database query using a resolution of the first inference record to obtain an inferred database query, wherein the resolution includes one or more tokens of the database syntax, and wherein the query is based on the inferred database query. The first inference record may include a confidence score and the first inference record may be selected based on the confidence score. The current set of context features may include part-of-speech tags for words of the string, and the method of the seventh implementation may include comparing the part-of-speech tags of the current set of context features to part-of-speech tags of inference records in the inference store, wherein the first inference record is selected based on a match of part-of-speech tags of the first inference record to the part-of-speech tags of the current set of context features. The method of the seventh implementation may include receiving, via the user interface, an indication that the string matches the first candidate database query; responsive to the indication, determining a pattern based on the string and the first candidate database query, wherein the pattern includes a collection of token constraints, a rewrite rule that maps one or more input tokens to a sequence of output tokens, and a ranking score adjustment that can be applied to a ranking score for a candidate database query; and storing the pattern. The indication may be based on a user interaction with a like icon in the user interface while the user interface includes representations of the string and the first candidate database query. The indication may include feedback data concerning the database query received via the user interface that was used to modify the first candidate database query. The collection of token constraints may be a sequence of token constraints. The method of the seventh implementation may include checking whether the first candidate database query from the set of candidate database queries satisfies a collection of token constraints of a pattern, wherein the pattern includes the collection of token constraints, a rewrite rule that maps one or more input tokens to a sequence of output tokens, and a ranking score adjustment that can be applied to a ranking score for a candidate database query; and responsive to satisfaction of the collection of token constraints of the pattern, modifying the first candidate database query using the rewrite rule of the pattern, and adjusting the second score based on the ranking score adjustment of the pattern. The first score may be determined based on a first inverse document frequency of an unmatched word of the string and a second inverse document frequency of a matched word of the string. The method of the seventh implementation may include presenting, via the user interface, respective text representations for tokens in the sequence of tokens; receiving feedback data concerning the first candidate database query via the user interface; modifying the first candidate database query based on the feedback data; invoking a search of a database using a query based on the modified first candidate database query to obtain modified search results; and presenting data based on the modified search results in the user interface. The first score may be determined based on usage data for the token of the respective sequence of tokens of the first candidate database query.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:
1. A method comprising:
 determining a set of candidate database queries, each including a respective sequence of tokens of a database syntax, based on a string;
 determining a first score for a first candidate database query from the set of candidate database queries, wherein the first score is based on a match between one or more words of the string and a token of the respective sequence of tokens of the first candidate database query;

determining a second score for the first candidate database query, wherein the second score is based on natural language syntax data determined for words of the string;

selecting, based on the first score and the second score, the first candidate database query from the set of candidate database queries; and invoking a search of the database using a query based on the first candidate database query to obtain search results.

2. The method of claim 1, comprising:

extracting an inference pattern from the string and the first candidate database query;

classifying the inference pattern to determine an inference type;

determining a resolution, wherein the resolution includes one or more tokens of the database syntax;

identifying a set of context features for the inference pattern, wherein the set of context features includes words from the string and tokens from the first candidate database query;

determining a confidence score based on the set of context features; and storing an inference record in an inference store, wherein the inference record includes the set of context features, the resolution, and the confidence score.

3. The method of claim 2, wherein the confidence score is determined based in part upon receiving feedback via a user interface that was used modify the first candidate database query.

4. The method of claim 2, wherein the confidence score is determined based in part upon receiving a feedback representing user interaction with a like icon in a user interface while the user interface includes representations of the string and the first candidate database query.

5. The method of claim 2, comprising:

maintaining a contains probability score associated with a column of the database, wherein the contains probability score is based on a count of times the column has been used to filter data with a contains query; and using the contains probability score for the column to determine the resolution.

6. The method of claim 1, comprising:

identifying a current set of context features for the first candidate database query, wherein the current set of context features includes words from the string and tokens from the first candidate database query;

selecting a first inference record from an inference store based on comparison of the current set of context features to context features of inference records in the inference store; and modifying the first candidate database query using a resolution of the first inference record to obtain an inferred database query, wherein the resolution includes one or more tokens of the database syntax, and wherein the query is based on the inferred database query.

7. The method of claim 6, wherein the first inference record includes a confidence score and the first inference record is selected based on the confidence score.

8. The method of claim 6, wherein the current set of context features include part-of-speech tags for words of the string, and comprising:

comparing the part-of-speech tags of the current set of context features to part-of-speech tags of inference records in the inference store, wherein the first inference record is selected based on a match of part-of-speech tags of the first inference record to the part-of-speech tags of the current set of context features.

9. The method of claim 1, comprising:

receiving an indication that the string matches the first candidate database query;

responsive to the indication, determining a pattern based on the string and the first candidate database query, wherein the pattern includes a collection of token constraints, a rewrite rule that maps one or more input tokens to a sequence of output tokens, and a ranking score adjustment that can be applied to a ranking score for a candidate database query; and storing the pattern.

10. The method of claim 9, wherein the indication is based on a user interaction with a like icon in a user interface while the user interface includes representations of the string and the first candidate database query.

11. The method of claim 9, wherein the indication includes user feedback data concerning the database query that was used to modify the first candidate database query.

12. The method of claim 9, wherein the collection of token constraints is a sequence of token constraints.

13. The method of claim 1, comprising:

checking whether the first candidate database query from the set of candidate database queries satisfies a collection of token constraints of a pattern, wherein the pattern includes the collection of token constraints, a rewrite rule that maps one or more input tokens to a sequence of output tokens, and a ranking score adjustment that can be applied to a ranking score for a candidate database query; and responsive to satisfaction of the collection of token constraints of the pattern, modifying the first candidate database query using the rewrite rule of the pattern, and adjusting the second score based on the ranking score adjustment of the pattern.

14. The method of claim 1, wherein the first score is determined based on a first inverse document frequency of an unmatched word of the string and a second inverse document frequency of a matched word of the string.

15. The method of claim 1, comprising:

presenting, via a user interface, respective text representations for tokens in the sequence of tokens;

receiving feedback data concerning the first candidate database query via the user interface;

modifying the first candidate database query based on the feedback data;

invoking a search of a database using a query based on the modified first candidate database query to obtain modified search results; and presenting data based on the modified search results in the user interface.

16. The method of claim 1, wherein the first score is determined based on usage data for the token of the respective sequence of tokens of the first candidate database query.

17. A system for providing a search interface for databases, comprising:

a network interface, a processor, and a memory, wherein the memory stores instructions executable by the processor to:

determine a set of candidate database queries, each including a respective sequence of tokens of a database syntax, based on a string;

determine a first score for a first candidate database query from the set of candidate database queries, wherein the first score is based on a match between one or more words of the string and a token of the respective sequence of tokens of the first candidate database query;

determine a second score for the first candidate database query, wherein the second score is based on natural language syntax data determined for words of the string;

select, based on the first score and the second score, the first candidate database query from the set of candidate database queries; and invoke a search of the database using a query based on the first candidate database query to obtain search results.

18. The system of claim 17, wherein the first score is determined based on usage data for the token of the respective sequence of tokens of the first candidate database query.

19. A non-transitory computer-readable storage medium that includes instructions that, when executed by a processor, facilitate performance of operations comprising:

determining a set of candidate database queries, each including a respective sequence of tokens of a database syntax, based on a string;

determining a first score for a first candidate database query from the set of candidate database queries, wherein the first score is based on a match between one or more words of the string and a token of the respective sequence of tokens of the first candidate database query;

determining a second score for the first candidate database query, wherein the second score is based on natural language syntax data determined for words of the string;

selecting, based on the first score and the second score, the first candidate database query from the set of candidate database queries; and invoking a search of the database using a query based on the first candidate database query to obtain search results.

20. The non-transitory computer-readable storage medium of claim 19, wherein the first score is determined based on usage data for the token of the respective sequence of tokens of the first candidate database query.

* * * * *